(12) United States Patent
Laborczfalvi et al.

(10) Patent No.: US 8,117,559 B2
(45) Date of Patent: Feb. 14, 2012

(54) METHOD AND APPARATUS FOR VIRTUALIZING WINDOW INFORMATION

(75) Inventors: Lee George Laborczfalvi, Wollstonecraft (AU); Anil Roychoudhry, Woodcroft (AU); Andrew Gerard Borzycki, Lane Cove (AU); Huai Chiun Chin, Glenwood (AU); Richard James Mazzaferri, Mooney Mooney (AU)

(73) Assignee: Citrix Systems, Inc., Fort Lauderdale, FL (US)

( * ) Notice: Subject to any disclaimer, the term of this patent is extended or adjusted under 35 U.S.C. 154(b) by 1526 days.

(21) Appl. No.: 10/711,733

(22) Filed: Sep. 30, 2004

(65) Prior Publication Data

US 2006/0090171 A1    Apr. 27, 2006

(51) Int. Cl.
*G06F 3/048* (2006.01)
(52) U.S. Cl. .................. 715/781; 715/783
(58) Field of Classification Search .......... 715/783, 715/781, 806
See application file for complete search history.

(56) References Cited

U.S. PATENT DOCUMENTS

| | | | |
|---|---|---|---|
| 4,253,145 A | 2/1981 | Goldberg | |
| 5,067,072 A | 11/1991 | Talati et al. | |
| 5,384,911 A | 1/1995 | Bloomfield | |
| 5,430,878 A | 7/1995 | Straub et al. | |
| 5,515,495 A * | 5/1996 | Ikemoto | 715/835 |
| 5,632,002 A * | 5/1997 | Hashimoto et al. | 704/231 |
| 5,668,958 A | 9/1997 | Bendert et al. | |
| 5,765,192 A | 6/1998 | Berliner | |
| 5,781,720 A * | 7/1998 | Parker et al. | 714/38 |
| 5,784,057 A * | 7/1998 | Alimpich et al. | 715/781 |
| 5,819,034 A | 10/1998 | Joseph et al. | |
| 5,819,044 A | 10/1998 | Kawabe et al. | |
| 5,838,910 A | 11/1998 | Domenikos et al. | 395/200.33 |
| 5,838,916 A | 11/1998 | Domenikos et al. | 395/200.49 |
| 5,856,826 A * | 1/1999 | Craycroft | 715/788 |
| 5,915,085 A | 6/1999 | Koved | 395/186 |
| 6,023,721 A | 2/2000 | Cummings | |
| 6,047,312 A | 4/2000 | Brooks et al. | |
| 6,065,043 A | 5/2000 | Domenikos et al. | 709/203 |
| 6,073,076 A | 6/2000 | Crowley et al. | |
| 6,115,741 A | 9/2000 | Domenikos et al. | 709/217 |
| 6,144,377 A * | 11/2000 | Oppermann et al. | 715/744 |
| 6,144,992 A | 11/2000 | Turpin et al. | 709/208 |

(Continued)

FOREIGN PATENT DOCUMENTS

AU    2329797    10/1997

(Continued)

OTHER PUBLICATIONS

U.S. Appl. No. 09/527,188, Greschler.

(Continued)

*Primary Examiner* — Omar Abdul-Ali
(74) *Attorney, Agent, or Firm* — Foley & Lardner LLP; John D. Lanza

(57) ABSTRACT

A method and apparatus for virtualizing access to windows includes a hooking mechanism, a window name virtualization engine, and an operating system interface. A request relating to a window from a process executing in the context of a user account is received, the request including a virtual window name. A determination is made for a literal name for the window, using a scope-specific identifier. A request is issued to the operating system including the determined literal window name. A window handle is associated with the determined virtual window name.

28 Claims, 24 Drawing Sheets

U.S. PATENT DOCUMENTS

| | | | |
|---|---|---|---|
| 6,161,126 A | 12/2000 | Wies et al. | |
| 6,161,139 A | 12/2000 | Win et al. | |
| 6,199,753 B1 | 3/2001 | Tracy et al. | |
| 6,240,442 B1 | 5/2001 | Domenikos et al. | 709/203 |
| 6,272,556 B1 | 8/2001 | Gish | |
| 6,272,632 B1 | 8/2001 | Carman et al. | |
| 6,275,942 B1 | 8/2001 | Bernhard et al. | |
| 6,292,827 B1 | 9/2001 | Raz | 709/217 |
| 6,304,893 B1 | 10/2001 | Gish | |
| 6,311,221 B1 | 10/2001 | Raz et al. | 709/231 |
| 6,314,417 B1 | 11/2001 | Bennett et al. | |
| 6,321,219 B1 | 11/2001 | Gainer et al. | |
| 6,339,595 B1 | 1/2002 | Rekhter et al. | |
| 6,370,687 B1 | 4/2002 | Shimura | |
| 6,374,402 B1 | 4/2002 | Schmeidler et al. | 717/11 |
| 6,385,766 B1 | 5/2002 | Doran, Jr. et al. | |
| 6,385,768 B1 | 5/2002 | Ziebell | |
| 6,438,600 B1 | 8/2002 | Greenfield et al. | |
| 6,453,334 B1 | 9/2002 | Vinson et al. | 709/203 |
| 6,510,466 B1 | 1/2003 | Cox et al. | |
| 6,516,315 B1 | 2/2003 | Gupta | |
| 6,519,643 B1 | 2/2003 | Foulkes et al. | |
| 6,526,056 B1 | 2/2003 | Rekhter et al. | |
| 6,550,012 B1 | 4/2003 | Villa et al. | |
| 6,553,377 B1 | 4/2003 | Eschelbeck et al. | |
| 6,557,168 B1 | 4/2003 | Czajkowski | |
| 6,567,974 B1 | 5/2003 | Czajkowski | |
| 6,574,618 B2 | 6/2003 | Eylon et al. | 707/1 |
| 6,597,366 B1 | 7/2003 | Bennett et al. | |
| 6,598,125 B2 | 7/2003 | Romm | 711/133 |
| 6,606,663 B1 | 8/2003 | Liao et al. | |
| 6,691,232 B1 | 2/2004 | Wood et al. | |
| 6,714,979 B1 | 3/2004 | Brandt et al. | |
| 6,724,875 B1 | 4/2004 | Adams et al. | |
| 6,735,601 B1 | 5/2004 | Subrahmanyam | |
| 6,757,894 B2 | 6/2004 | Eylon et al. | 717/177 |
| 6,763,370 B1 | 7/2004 | Schmeidler et al. | 709/203 |
| 6,766,457 B1 | 7/2004 | Baisley | |
| 6,772,350 B1 | 8/2004 | Belani et al. | |
| 6,779,179 B1 | 8/2004 | Romm et al. | 717/178 |
| 6,826,624 B1 | 11/2004 | Fell, Jr. | |
| 6,851,114 B1 | 2/2005 | Czajkowski | |
| 6,854,009 B1 | 2/2005 | Hughes | 709/220 |
| 6,880,002 B2 | 4/2005 | Hirschfeld et al. | |
| 6,889,222 B1 | 5/2005 | Zhao | |
| 6,889,249 B2 | 5/2005 | Miloushev et al. | |
| 6,901,586 B1 | 5/2005 | Czajkowski | |
| 6,918,113 B2 | 7/2005 | Patel et al. | 717/178 |
| 6,928,464 B2 | 8/2005 | Appiah et al. | |
| 6,928,469 B1 | 8/2005 | Duursma et al. | |
| 6,938,096 B1 | 8/2005 | Greschler et al. | 709/239 |
| 6,938,247 B2 | 8/2005 | Czajkowski | |
| 6,952,714 B2 | 10/2005 | Peart | |
| 6,959,320 B2 | 10/2005 | Shah et al. | 709/203 |
| 6,966,060 B1 | 11/2005 | Young et al. | |
| 7,017,188 B1 | 3/2006 | Schmeidler et al. | 726/26 |
| 7,027,051 B2 | 4/2006 | Alford, Jr. et al. | |
| 7,028,305 B2 | 4/2006 | Schaefer | 709/328 |
| 7,065,637 B1 | 6/2006 | Nanja | |
| 7,085,755 B2 * | 8/2006 | Bluhm et al. | 1/1 |
| 7,092,987 B2 | 8/2006 | Brittingham et al. | |
| 7,103,625 B1 | 9/2006 | Hipp et al. | |
| 7,117,243 B2 | 10/2006 | Peart | |
| 7,162,724 B2 | 1/2007 | Blaser et al. | |
| 7,200,632 B1 | 4/2007 | Greschler et al. | |
| 7,203,941 B2 * | 4/2007 | Demsey et al. | 718/1 |
| 7,206,819 B2 | 4/2007 | Schmidt | |
| 7,213,153 B2 | 5/2007 | Hollander et al. | |
| 7,213,247 B1 | 5/2007 | Wilner et al. | |
| 7,293,267 B1 | 11/2007 | Fresko | |
| 7,305,658 B1 | 12/2007 | Hamilton et al. | |
| 7,330,872 B2 | 2/2008 | Peart et al. | |
| 7,380,039 B2 | 5/2008 | Miloushev et al. | |
| 7,383,328 B2 | 6/2008 | Iyoki | |
| 7,409,405 B1 | 8/2008 | Masinter et al. | |
| 7,461,144 B1 | 12/2008 | Beloussov et al. | |
| 7,484,245 B1 | 1/2009 | Friedman et al. | |
| 7,526,774 B1 | 4/2009 | Beck et al. | |
| 2001/0011254 A1 | 8/2001 | Clark | |
| 2001/0014892 A1 | 8/2001 | Gaither et al. | |
| 2001/0034736 A1 | 10/2001 | Eylon et al. | |
| 2001/0037399 A1 | 11/2001 | Eylon et al. | |
| 2001/0037400 A1 | 11/2001 | Raz et al. | |
| 2001/0044850 A1 | 11/2001 | Raz et al. | |
| 2001/0047386 A1 | 11/2001 | Domenikos et al. | |
| 2001/0047406 A1 | 11/2001 | Araujo et al. | |
| 2002/0010808 A1 | 1/2002 | Wiggins et al. | |
| 2002/0019972 A1 | 2/2002 | Grier et al. | |
| 2002/0042833 A1 | 4/2002 | Hendler et al. | |
| 2002/0059425 A1 | 5/2002 | Belfiore et al. | |
| 2002/0065919 A1 | 5/2002 | Taylor et al. | |
| 2002/0078168 A1 | 6/2002 | Christfort et al. | |
| 2002/0078203 A1 | 6/2002 | Greschler et al. | |
| 2002/0080170 A1 | 6/2002 | Goldberg et al. | |
| 2002/0083183 A1 | 6/2002 | Pujare et al. | |
| 2002/0087717 A1 | 7/2002 | Artzi et al. | |
| 2002/0087883 A1 | 7/2002 | Wohlgemuth et al. | |
| 2002/0091763 A1 | 7/2002 | Shah et al. | |
| 2002/0095479 A1 | 7/2002 | Schmidt | |
| 2002/0138640 A1 | 9/2002 | Raz et al. | |
| 2002/0156911 A1 | 10/2002 | Croman et al. | |
| 2002/0161908 A1 | 10/2002 | Benitez et al. | |
| 2002/0174215 A1 | 11/2002 | Schaefer | |
| 2002/0193985 A1 | 12/2002 | Park | |
| 2002/0194010 A1 | 12/2002 | Bergler et al. | |
| 2002/0199180 A1 | 12/2002 | Donaldson et al. | |
| 2003/0004882 A1 | 1/2003 | Holler et al. | |
| 2003/0009538 A1 | 1/2003 | Shah et al. | |
| 2003/0056112 A1 | 3/2003 | Vinson et al. | |
| 2003/0069923 A1 | 4/2003 | Peart | |
| 2003/0069924 A1 | 4/2003 | Peart et al. | |
| 2003/0088866 A1 | 5/2003 | Boldon et al. | |
| 2003/0101292 A1 | 5/2003 | Fisher et al. | |
| 2003/0115458 A1 | 6/2003 | Song | |
| 2003/0140160 A1 | 7/2003 | Raz et al. | |
| 2003/0149685 A1 | 8/2003 | Trossman et al. | |
| 2003/0167463 A1 | 9/2003 | Munsil et al. | |
| 2003/0191867 A1 | 10/2003 | Czajkowski | |
| 2003/0233489 A1 | 12/2003 | Blaser et al. | |
| 2003/0233490 A1 | 12/2003 | Blaser et al. | |
| 2003/0233544 A1 | 12/2003 | Erlingsson | |
| 2003/0233647 A1 | 12/2003 | Blaser et al. | |
| 2004/0044643 A1 | 3/2004 | deVries et al. | |
| 2004/0045016 A1 | 3/2004 | Romm et al. | |
| 2004/0078591 A1 | 4/2004 | Teixeira et al. | |
| 2004/0128250 A1 | 7/2004 | Fox et al. | |
| 2004/0128346 A1 | 7/2004 | Melamed et al. | |
| 2004/0230971 A1 | 11/2004 | Rachman et al. | |
| 2004/0236777 A1 | 11/2004 | Pardikar et al. | |
| 2004/0249937 A1 | 12/2004 | Tachihara et al. | |
| 2004/0255048 A1 | 12/2004 | Lev Ran et al. | |
| 2004/0268361 A1 | 12/2004 | Schaefer | |
| 2005/0010670 A1 | 1/2005 | Greschler et al. | |
| 2005/0010924 A1 | 1/2005 | Hipp et al. | |
| 2005/0010927 A1 | 1/2005 | Stern et al. | |
| 2005/0021613 A1 | 1/2005 | Schmeidler et al. | |
| 2005/0039190 A1 | 2/2005 | Rees et al. | |
| 2005/0050084 A1 | 3/2005 | Atm | |
| 2005/0065937 A1 | 3/2005 | Degenaro et al. | |
| 2005/0080906 A1 | 4/2005 | Pedersen | |
| 2005/0091214 A1 | 4/2005 | Probert et al. | |
| 2005/0091511 A1 | 4/2005 | Nave et al. | |
| 2005/0091534 A1 | 4/2005 | Nave et al. | |
| 2005/0091535 A1 | 4/2005 | Kavalam et al. | |
| 2005/0091655 A1 | 4/2005 | Probert et al. | |
| 2005/0091658 A1 | 4/2005 | Kavalam et al. | |
| 2005/0114296 A1 | 5/2005 | Farber et al. | |
| 2005/0114870 A1 | 5/2005 | Song et al. | |
| 2005/0149726 A1 | 7/2005 | Joshi et al. | |
| 2005/0165853 A1 | 7/2005 | Turpin et al. | |
| 2005/0169073 A1 | 8/2005 | Cook et al. | |
| 2005/0172279 A1 | 8/2005 | Cook et al. | |
| 2005/0192921 A1 | 9/2005 | Chaudhuri et al. | |
| 2005/0193139 A1 | 9/2005 | Vinson et al. | |
| 2005/0198239 A1 | 9/2005 | Hughes | |
| 2005/0246704 A1 | 11/2005 | Romm et al. | |
| 2005/0257265 A1 | 11/2005 | Cook et al. | |

| | | | |
|---|---|---|---|
| 2005/0257266 A1 | 11/2005 | Cook et al. | |
| 2005/0262181 A1 | 11/2005 | Schmidt et al. | |
| 2006/0010433 A1 | 1/2006 | Neil | |
| 2006/0020858 A1 | 1/2006 | Schaefer | |
| 2006/0020937 A1 | 1/2006 | Schaefer | |
| 2006/0026602 A1 | 2/2006 | Duplichan | |
| 2006/0031165 A1 | 2/2006 | Nave et al. | |
| 2006/0036570 A1 | 2/2006 | Schaefer et al. | |
| 2006/0037004 A1 | 2/2006 | Long et al. | |
| 2006/0053228 A1 | 3/2006 | Rachman et al. | |
| 2006/0064697 A1 | 3/2006 | Kagi et al. | |
| 2006/0136389 A1 | 6/2006 | Cover et al. | |
| 2006/0257266 A1 | 11/2006 | LeDoux et al. | |
| 2007/0011672 A1 | 1/2007 | Bhide et al. | |
| 2007/0067366 A1 | 3/2007 | Landis | |
| 2008/0016233 A1 | 1/2008 | Schneider | |
| 2008/0222160 A1 | 9/2008 | MacDonald et al. | |

FOREIGN PATENT DOCUMENTS

| | | |
|---|---|---|
| AU | 7564398 | 11/1998 |
| AU | 711280 | 10/1999 |
| AU | 5104699 | 2/2000 |
| AU | 1727200 | 6/2000 |
| AU | 2463700 | 8/2000 |
| AU | 2862500 | 8/2000 |
| AU | 4236100 | 11/2000 |
| AU | 2957501 | 7/2001 |
| AU | 2973701 | 7/2001 |
| AU | 3282501 | 7/2001 |
| AU | 3857201 | 8/2001 |
| AU | 4350201 | 9/2001 |
| AU | 4555401 | 9/2001 |
| AU | 6498901 | 12/2001 |
| AU | 7865401 | 1/2002 |
| AU | 9079601 | 3/2002 |
| AU | 9308701 | 4/2002 |
| AU | 9308801 | 4/2002 |
| AU | 02309834 A2 | 11/2002 |
| AU | 2002309834 | 11/2002 |
| AU | 2003243543 | 12/2003 |
| AU | 2003251504 | 12/2003 |
| AU | 2003251505 | 12/2003 |
| CA | 2248086 | 9/1997 |
| CA | 2361342 | 2/2000 |
| CA | 2351078 | 5/2000 |
| CA | 2427847 | 4/2002 |
| CA | 2427848 | 4/2002 |
| CA | 2465880 | 11/2002 |
| CN | 1185591 | 6/1998 |
| CN | 1354857 | 6/2002 |
| EP | 901655 | 9/1997 |
| EP | 1021782 | 11/1998 |
| EP | 990327 | 12/1998 |
| EP | 1037147 | 5/1999 |
| EP | 1097416 | 2/2000 |
| EP | 1131934 | 5/2000 |
| EP | 1163599 | 8/2000 |
| EP | 1410219 | 11/2001 |
| EP | 1311957 | 1/2002 |
| EP | 1330738 | 4/2002 |
| EP | 1332432 | 4/2002 |
| EP | 1241575 | 9/2002 |
| JP | 2001/502821 | 2/2001 |
| JP | 2002/508907 | 2/2002 |
| JP | 2002/521745 | 7/2002 |
| JP | 2003/527645 | 9/2003 |
| JP | 2003/532166 | 10/2003 |
| JP | 2004/504681 | 2/2004 |
| JP | 2004/533054 | 10/2004 |
| KR | 990003481 | 8/2000 |
| KR | 990068380 | 8/2000 |
| KR | 2000057127 | 9/2000 |
| WO | WO 97/34225 | 9/1997 |
| WO | WO 98/50874 | 11/1998 |
| WO | WO 98/59460 | 12/1998 |
| WO | WO-9960462 A1 | 11/1999 |
| WO | WO 01/00651 | 1/2000 |
| WO | WO 00/05637 | 2/2000 |
| WO | WO 00/62161 | 4/2000 |
| WO | WO 00/62161 A2 | 4/2000 |
| WO | WO 00/30323 | 5/2000 |
| WO | WO 00/30323 A2 | 5/2000 |
| WO | WO 00/43919 | 7/2000 |
| WO | WO 00/43919 A1 | 7/2000 |
| WO | WO 00/45262 | 8/2000 |
| WO | WO 00/46685 | 8/2000 |
| WO | WO 00/46685 A1 | 8/2000 |
| WO | WO 01/25894 | 4/2001 |
| WO | WO 01/53938 | 7/2001 |
| WO | WO 01/53940 | 7/2001 |
| WO | WO 01/54375 | 7/2001 |
| WO | WO-01/55813 | 8/2001 |
| WO | WO 01/61967 | 8/2001 |
| WO | WO 01/67379 | 9/2001 |
| WO | WO 01/69448 | 9/2001 |
| WO | WO 01/69448 A1 | 9/2001 |
| WO | WO 01/90901 | 11/2001 |
| WO | WO 01/95094 | 12/2001 |
| WO | WO 02/23363 | 3/2002 |
| WO | WO 02/23363 A1 | 3/2002 |
| WO | WO 02/27492 | 4/2002 |
| WO | WO 02/27556 | 4/2002 |
| WO | WO 02/093369 | 11/2002 |
| WO | WO 02/093369 A1 | 11/2002 |
| WO | WO 03/029977 | 4/2003 |
| WO | WO 03/107183 | 12/2003 |
| WO | WO 03/107220 | 12/2003 |
| WO | WO 03/107221 | 12/2003 |
| WO | WO 2005/045616 | 5/2005 |
| WO | WO 2005/052762 | 6/2005 |
| WO | WO 2005/059726 | 6/2005 |
| WO | WO 2006/012533 | 2/2006 |
| WO | WO 2006/017388 | 2/2006 |
| WO | WO 2006/020094 | 2/2006 |

OTHER PUBLICATIONS

International Searching Authority, "International Search Report," PCT Application No. PCT/US2005/033994, mailed on Feb. 15, 2006, 5 pgs.

International Searching Authority, "Written Opinion," PCT Application No. PCT/US2005/033994, mailed on Feb. 15, 2006, 8 pgs.

International Searching Authority, "International Search Report," PCT Application No. PCT/US2005/034177, mailed on Feb. 21, 2006, 7 pgs.

International Searching Authority, "Written Opinion," PCT Application No. PCT/US2005/034177, mailed on Feb. 21, 2006, 8 pgs.

International Searching Authority, "International Search Report," PCT Application No. PCT/US2005/034449, mailed on Mar. 3, 2006, 8 pgs.

International Searching Authority, "Written Opinion," PCT Application No. PCT/US2005/034449, mailed on Mar. 3, 2006, 8 pgs.

International Searching Authority, "International Search Report," PCT Application No. PCT/US2005/034178, mailed on Feb. 1, 2006, 5 pgs.

International Searching Authority, "Written Opinion," PCT Application No. PCT/US2005/034178, mailed on Feb. 1, 2006, 4 pgs.

International Searching Authority, "International Search Report," PCT Application No. PCT/US2005/034302, mailed on May 8, 2006, 8 pgs.

International Searching Authority, "Written Opinion," PCT Application No. PCT/US2005/034302, mailed on May 8, 2006, 15 pgs.

Boyd, T., et al., "Process Migration: A Generalized Approach Using a Virtualizing Operating System," Proc. of the 22$^{nd}$ Int'l Conf on Dist. Comp. Sys., 1: 348-355, 2002.

Liang, Z., et al., "Isolated Program Execution: An Application Transparent Approach for Executing Untrusted Programs," Computer Security App. Conf. 182-191, 2003.

Pietrek, M., et al., "Intercepting API Functions in Win32," PC Mag., 13: 307-312, Aug. 11, 1994.

"Taking Command of Windows XP," http://media.wiley.com/product_data/excerpt/34/07645582/0764558234.pdf, 1-11, May 3, 2004.

"Deploying Internet Information Services (IIS) 6.0", Microsoft Windows Server 2003 Development Kit, p. 69, line 25—p. 71, line 8.

Bouras, et al., "Application on Demand System over the Internet", Journal of Network and Computer Applicatio 05, ns, Academic Press, New York, NY, US 28(3):209-232, 2005.
Cowan, et al., "Subdomain: Parsimonious Server Security", Proceeding of the 14th Usenix Systems Administration Conference, pp. 1-20, 2000. URL: http://coblitz.codeen.org:3125/citeseer.ist.psu.edu/cache/papers/cs/20700/http:zSzzSzwww.cse.ogi.eduzSz~crispinzSzsubdomain.pdf/cowan00subdomain.pdf.
Declaration of Non-Establishment of International Search Report, PCT/2005/034178, mailed on Jan. 2, 2006.
European Search Report, 4319MNMms, dated Sep. 25, 2007 in Application No. 07112164.4-2211.
European Search Report, 4324MNMms, dated Jan. 10, 2008 in Application No. 07113091.8-2211.
European Search Report, 4325MNMms, dated Jan. 15, 2008 in Application No. 07113105.6-2211.
International Search Report, PCT/US2006/037602, mailed on May 31, 2007.
Sampemane, et al., "Access control for active spaces", Computer Security Applications Conference, 2002. Proceedings. 18th Annual Dec. 9-13, 2002, Piscataway, NJ, USA, IEEE, pp. 343-352.
Souder, et al., "A tool for securely integrating legacy systems into a distributed environment", Reverse Engineering, 1999, Proceedings. Sixth Working Conference on Atlanta, GA, USA Oct. 6-8, 1999, Los Alamitos, CA, USA, IEEE Comput. Soc., US, pp. 47-55.
U.S. Office Action, dated Aug. 22, 2007, in U.S. Appl. No. 10/711,737.
U.S. Office Action, dated Jan. 11, 2007, in U.S. Appl. No. 10/711,737.
U.S. Office Action, dated Nov. 14, 2007, in U.S. Appl. No. 10/711,734.
U.S. Office Action, dated Dec. 6, 2007, in U.S. Appl. No. 11/246,019.
Written Opinion of International Searching Authority, PCT/US2006/037602, mailed on Sep. 28, 2006.
Zhenkai, et al., "Isolated Program Execution: An Application Transparent Approach for Executing Untrusted Programs", Computer Security Applications Conference, 2003. Proceedings. 19th Annual Dec. 8-12, 2003, Piscataway, NJ, USA, IEEE, Dec. 8, 2003, pp. 182-191.
Boyd et al., "Preemptive module replacement using the virtualizing operating system realizing multi-dimensional software adaptation," Proceedings of the ACM Workshop on Self-Healing, Adapative and self-MANaged Systems (SHAMAN), in conjunction with the 16th Annual ACM International Conference on Supercomputing, (New York, NY), Jun. 2002.
Boyd et al., "Virtualizing Operating Systems for Seamless Distributed Environments," in Proceedings of the IASTED International Conference on Parallel and Distributed Computing and Systems, vol. 2, Nov. 2000, pp. 735-740.
Chinese Office Action, dated May 16, 2008, in Chinese Patent Application No. 200580041055.6.
Chinese Office Action, dated May 23, 2008, in Chinese Patent Application No. 200580041022.1.
Citrix XenApp Application Streaming: http://www.citrix.com/English/ps2/products/subfeature.asp?contentID=163987; printed Feb. 16, 2010.
Czajkowski et al., "A Multi-User Virtual Machine", Proc. of the USENIX 2003 Annual Technical Conference, 2003, pp. 85-98.
EP Search Report, dated Jan. 8, 2008 in Application No. 05800952.3-2211.
EP Search Report, dated Jul. 20, 2007 in Application No. 05800952.3-2211.
EP Search Report, dated May 23, 2008 in Application No. 07112164.4-2211.
EP Search Report, dated May 6, 2008 in Application No. 07112979.5-2211.
EP Search Report, dated May 8, 2008, in Application No. 07112596.7-2211.
Potter et al., "Secure Isolation and Migration of Untrusted Legacy Applications" Computer Science Department, Columbia University, Columbia Technical Report CUCS-005-04, Jan. 2004.
U.S. Office Action, dated Apr. 1, 2009, in U.S. Appl. No. 10/711,732.
U.S. Office Action, dated Apr. 12, 2010, in U.S. Appl. No. 11/231,317.
U.S. Office Action, dated Apr. 16, 2010, in U.S. Appl. No. 11/231,316.
U.S. Office Action, dated Apr. 24, 2009, in U.S. Appl. No. 10/956,723.
U.S. Office Action, dated Apr. 7, 2009, in U.S. Appl. No. 11/231,315.
U.S. Office Action, dated Aug. 12, 2008, in U.S. Appl. No. 10/711,734.
U.S. Office Action, dated Aug. 17, 2009, in U.S. Appl. No. 10/711,734.
U.S. Office Action, dated Aug. 19, 2009, in U.S. Appl. No. 10/711,736.
U.S. Office Action, dated Aug. 31, 2009, in U.S. Appl. No. 10/956,723.
U.S. Office Action, dated Dec. 14, 2009, in U.S. Appl. No. 11/231,284.
U.S. Office Action, dated Dec. 17, 2009, in U.S. Appl. No. 11/231,316.
U.S. Office Action, dated Dec. 19, 2008, in U.S. Appl. No. 10/711,735.
U.S. Office Action, dated Dec. 23, 2008 in U.S. Appl. No. 10/711,737.
U.S. Office Action, dated Feb. 26, 2009, in U.S. Appl. No. 10/711,734.
U.S. Office Action, dated Feb. 4, 2009, in U.S. Appl. No. 10/711,736.
U.S. Office Action, dated Jul. 21, 2009, in U.S. Appl. No. 10/711,735.
U.S. Office Action, dated Jul. 22, 2009, in U.S. Appl. No. 10/711,737.
U.S. Office Action, dated Jun. 10, 2010, in U.S. Appl. No. 11/231,284.
U.S. Office Action, dated Mar. 10, 2010, in U.S. Appl. No. 10/956,723.
U.S. Office Action, dated Mar. 16, 2010, in U.S. Appl. No. 10/711,736.
U.S. Office Action, dated May 28, 2008, in U.S. Appl. No. 10/711,737.
U.S. Office Action, dated Nov. 12, 2008, in U.S. Appl. No. 10/956,723.
U.S. Office Action, dated Oct. 6, 2009, in U.S. Appl. No. 11/231,370.

* cited by examiner

METHOD AND APPARATUS FOR VIRTUALIZING WINDOW INFORMATION

FIELD OF THE INVENTION

The invention relates to managing execution of software applications by computers and, in particular, to methods and apparatus for reducing compatibility and sociability problems between different application programs and between individual users of the same application executed by the same computer system.

BACKGROUND OF THE INVENTION

Computer software application programs, during execution and installation, make use of a variety of native resources provided by the operating system of a computer. A traditional, single-user computer is depicted in FIG. 1A. As shown in FIG. 1A, native resources provided by the operating system 100 may include a file system 102, a registry database 104, and objects 106. The file system 102 provides a mechanism for an application program to open, create, read, copy, modify, and delete data files 150, 152. The data files 150, 152 may be grouped together in a logical hierarchy of directories 160, 162. The registry database 104 stores information regarding hardware physically attached to the computer, which system options have been selected, how computer memory is set up, various items of application-specific data, and what application programs should be present when the operating system 100 is started. As shown in FIG. 1A, the registry database 104 is commonly organized in a logical hierarchy of "keys" 170, 172 which are containers for registry values. The operating system 100 may also provide a number of communication and synchronization objects 106, including semaphores, sections, mutexes, timers, mutants, and pipes. Together, the file system 102, registry database 104, objects 106, and any other native resources made available by the operating system 100 will be referred to throughout this document as the "system layer" 108. The resources provided by the system layer 108 are available to any application or system program 112, 114.

A problem arises, however, when execution or installation of two incompatible application programs 112, 114 is attempted. As shown in FIG. 1A, two application programs, APP1 112 and APP2 114, execute "on top of" the operating system 100, that is, the application programs make use of functions provided by the operating system to access native resources. The application programs are said to be incompatible with one another when they make use of native resources 102, 104, 106 in a mutually exclusive manner either during execution or during the installation process. APP1 112 may require, or attempt to install, a file located by the pathname c:\windows\system32\msvcrt.dll and APP2 114 may require, or attempt to install, a second, different file that is located by the same pathname. In this case, APP1 112 and APP2 114 cannot be executed on the same computer and are said to be incompatible with one another. A similar problem may be encountered for other native resources. This is, at best, inconvenient for a user of the computer who requires installation or execution of both APP1 112 and APP2 114 together in the same operating system 100 environment.

FIG. 1B depicts a multi-user computer system supporting concurrent execution of application programs 112, 114, 112', 114' on behalf of several users. As shown in FIG. 1B, a first instance of APP1 112 and a first instance of APP2 114 are executed in the context of a first user session 110, a second instance of APP1 112' is executed in the context of a second user session 120, and a second instance of APP2 114' is executed in the context of a third user session 130. In this environment, a problem arises if both instances of APP1 112, 112' and both instances of APP2 114, 114' make use of native resources 102, 104, 106 as if only a single user executes the application. For example, the APP1 112 may store application specific data in a registry key 170. When the first instance of APP1 112 executing in the first user context 110 and the second instance of APP1 112' executing in the second user context 120 both attempt to store configuration data to the same registry key 170, incorrect configuration data will be stored for one of the users. A similar problem can occur for other native resources, such as window names and window class information.

The present invention addresses these application program compatibility and sociability problems.

BRIEF SUMMARY OF THE INVENTION

The present invention allows installation and execution of application programs that are incompatible with each other, and incompatible versions of the same application program, on a single computer. In addition, it allows the installation and execution on a multi-user computer of programs that were created for a single-user computer or were created without consideration for issues that arise when executing on a multi-user computer. The methods and apparatus described are applicable to single-user computing environments, which includes environments in which multiple users may use a single computer one after the other, as well as multi-user computing environments, in which multiple users concurrently use a single computer. The present invention virtualizes user and application access to native resources, such as the file system, the registry database, system objects, window classes and window names, without modification of the application programs or the underlying operating system. In addition, virtualized native resources may be stored in native format (that is, virtualized files are stored in the file system, virtualized registry entries are stored in the registry database, etc.) allowing viewing and management of virtualized resources to be accomplished using standard tools and techniques.

In one aspect, the invention relates to a method for virtualizing access to windows. A request relating to a window from a process executing in the context of a user account is received, the request including a virtual window name. A determination is made for a literal name for the window, using a scope-specific identifier. A request is issued to the operating system including the determined literal window name. A window handle is associated with the determined virtual window name.

In one embodiment, the request relating to a window from a process executing in the context of a user account is intercepted. In another embodiment, a rule associated with the virtual window name included in the request is determined and used to determine a literal name for the window. In some embodiments, the virtual window name is stored in a mapping table associated with a window handle.

In another aspect, the invention relates to a method for virtualizing access to windows. A request is received to identify one of a virtual window name and a virtual window class identifier, the request received from a process executing in the context of a user account and including a window handle. It is determined that the window handle is associated with the requested one of the virtual window name and the virtual window class identifier. The determined window information is returned to the requesting process. In one embodiment, the window handle associated with the requested one of the virtual window name and the virtual window class identifier is determined from a mapping table.

In another aspect, the invention relates to an apparatus for virtualizing access to windows. A hooking mechanism receives a request relating to a window from a process executing in the context of a user account, the request including one of a virtual window name and a virtual window class identifier. A window name virtualization engine forms one of a literal name for the window and a literal window class identifier using the one of the virtual window name and the virtual window class identifier received in the request and a scope-specific identifier. An operating system interface issues a request relating to a window, the request including the one of the formed literal name and the formed literal window class identifier for the window.

In one embodiment, the hooking mechanism intercepts a request selected from a group consisting of finding a window, creating a window, enumerating a window, destroying a window, setting a window name, retrieving a window name, retrieving a window class identifier associated with the window, registering a window class, retrieving information about a window class and unregistering a window class. In another embodiment, a mapping table stores an association between a window handle and one of the virtual window name and the virtual window class identifier.

In another aspect, the invention relates to a method for virtualizing access to windows. A request to paint a title bar for a window, the title bar including the window name, is intercepted from a requestor the request including a window handle. The virtual window name associated with the window handle is determined. The title bar of the window is painted using the virtual window name. It is indicated to the requestor that the title bar has been painted.

In yet another aspect, the invention relates to a method for virtualizing access to windows. A request relating to a window class from a process executing in the context of a user account is received, the request including a virtual window class identifier. A literal window class identifier is determined using a scope-specific identifier. A request is issued to the operating system, the request including the determined literal window class identifier.

In one embodiment, a rule associated with the virtual window class identifier included in the request is identified and used to determine a literal window class identifier responsive to the determined rule. In another embodiment, the virtual window class identifier is stored in a mapping table associated with a window handle. In another embodiment, virtual window class identifier replaces the determined literal window class identifier in the response

BRIEF DESCRIPTION OF THE DRAWINGS

The invention is pointed out with particularity in the appended claims. The advantages of the invention described above, as well as further advantages of the invention, may be better understood by reference to the following description taken in conjunction with the accompanying drawings, in which:

Figure 1A:
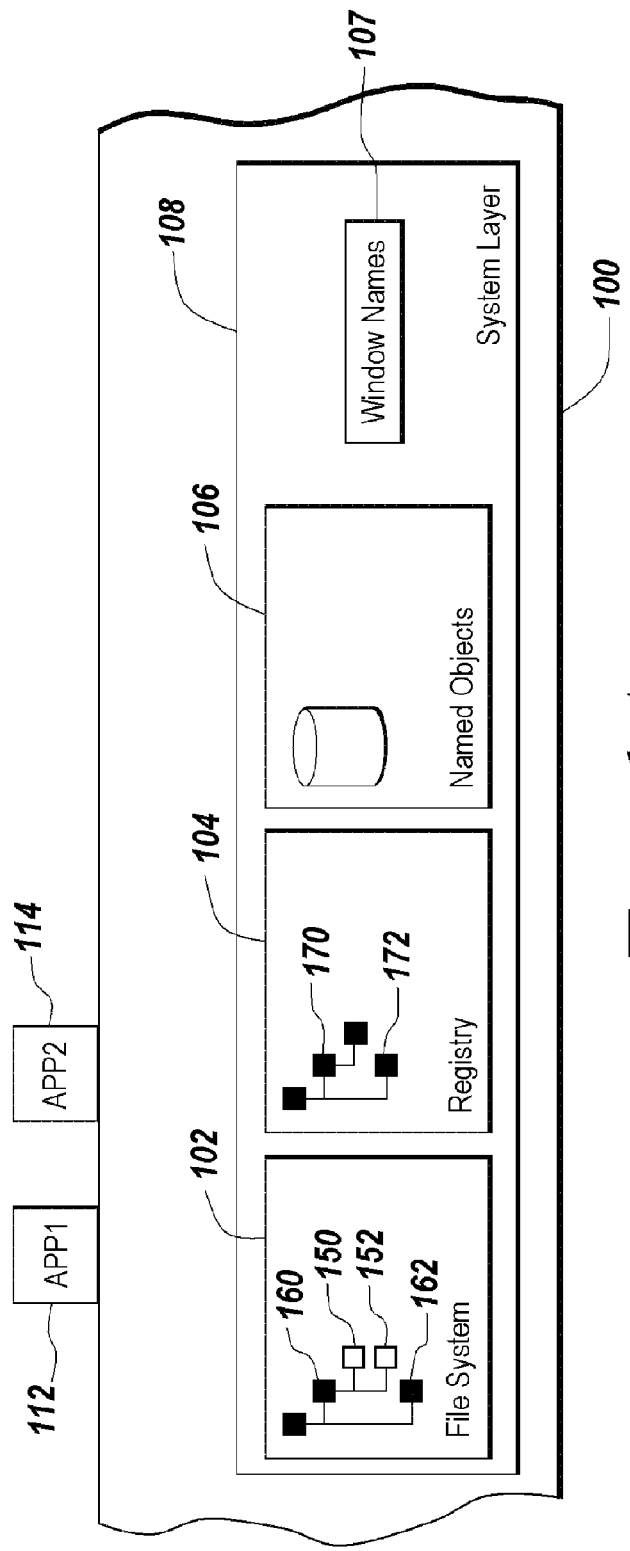
FIG. 1A is a block diagram of a prior art operating system environment supporting execution of two application programs on behalf of a user.
Figure 1B:
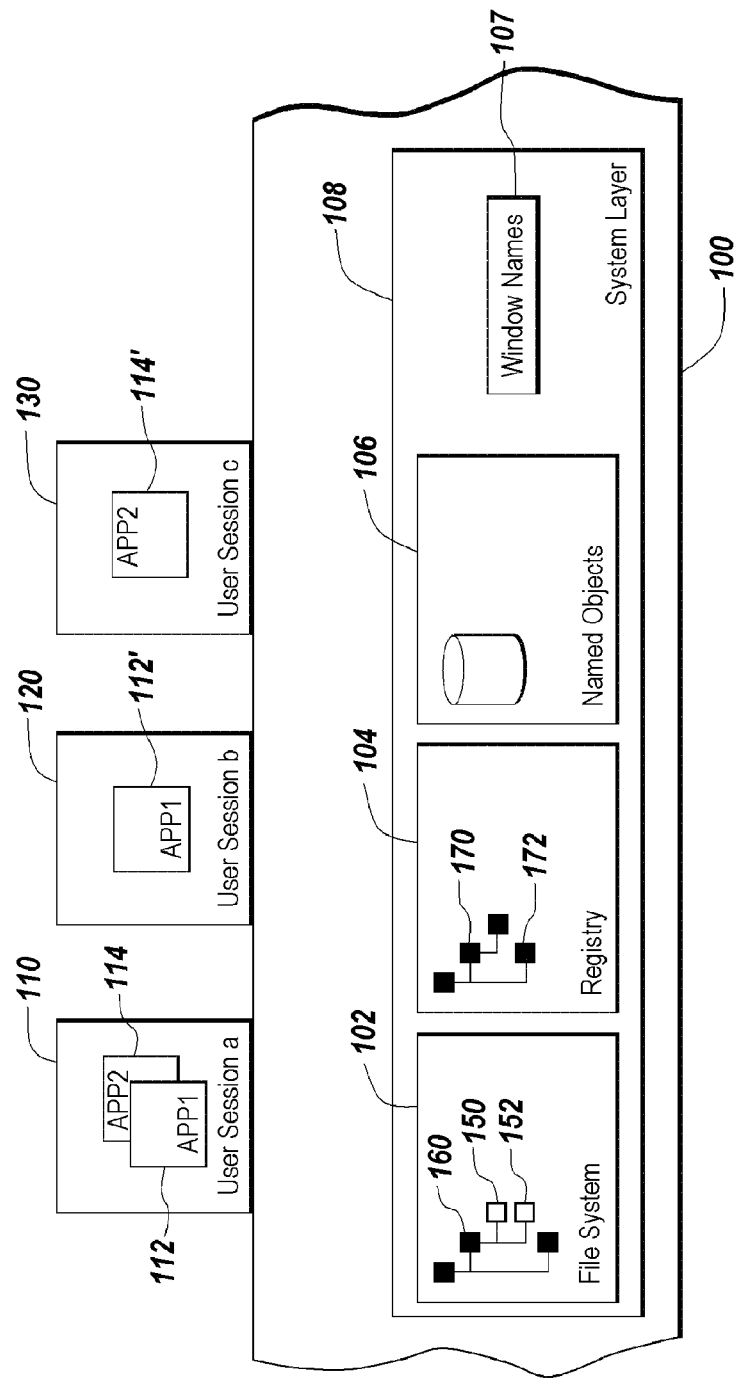
FIG. 1B is a block diagram of a prior art operating system environment supporting concurrent execution of multiple applications on behalf of several users.

INDEX 1.0 Isolation Environment Conceptual Overview
1.1 Application Isolation
1.2 User Isolation 1.3 Aggregate view of native resources
1.4 Association of processes with isolation scopes
1.4.1 Association of out-of-scope processes with isolation scopes
2.0 Virtualization Mechanism Overview
3.0 Installation into an isolation environment
4.0 Execution in an isolation environment
4.1 File system virtualization
4.1.1 File System Open Operations
4.1.2 File System Delete Operations
4.1.3 File System Enumerate Operations
4.1.4 File System Create Operations
4.1.5 Short Filename Management
4.2 Registry virtualization
4.2.1 Registry Open Operations
4.2.2 Registry Delete Operations
4.2.3 Registry Enumerate Operations
4.2.4 Registry Create Operations
4.3 Named object virtualization
4.4 Window name virtualization
4.5 Out-of-process COM server virtualization
4.6 Virtualized file-type association
4.7 Dynamic movement of processes between isolation environments

Figure 2A:
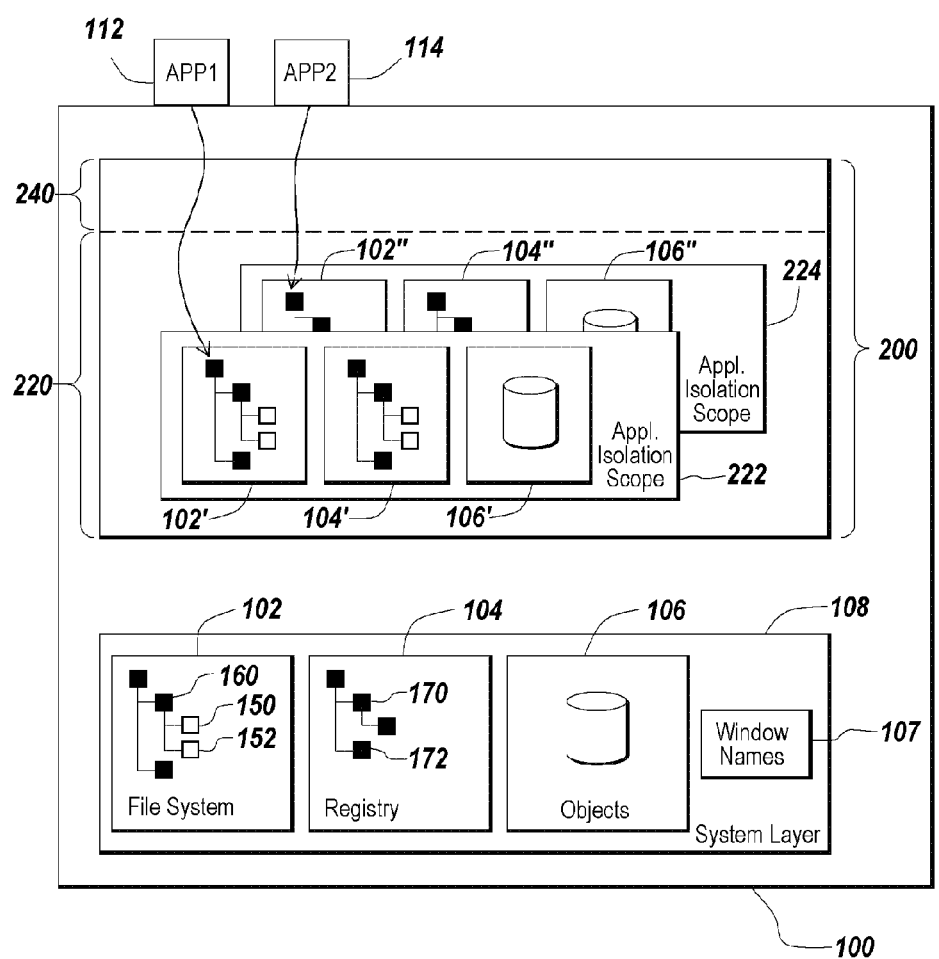
FIG. 2A is a block diagram of an embodiment of a computer system having reduced application program compatibility and sociability problems.

DETAILED DESCRIPTION OF THE INVENTION 1.0 Isolation Environment Conceptual Overview
1.1 Application Isolation Referring now to FIG. 2A, one embodiment of a computer running under control of an operating system 100 that has reduced application compatibility and application sociability problems is shown. The operating system 100 makes available various native resources to application programs 112, 114 via its system layer 108. The view of resources embodied by the system layer 108 will be termed the "system scope". In order to avoid conflicting access to native resources 102, 104, 106, 107 by the application programs 112, 114, an isolation environment 200 is provided. As shown in FIG. 2A, the isolation environment 200 includes an application isolation layer 220 and a user isolation layer 240. Conceptually, the isolation environment 200 provides, via the application isolation layer 220, an application program 112, 114, with a unique view of native resources, such as the file system 102, the registry 104, objects 106, and window names 107. Each isolation layer modifies the view of native resources provided to an application. The modified view of native resources provided by a layer will be referred to as that layer's "isolation scope". As shown in FIG. 2A, the application isolation layer includes two application isolation scopes 222, 224. Scope 222 represents the view of native resources provided to application 112 and scope 224 represents the view of native resources provided to application 114. Thus, in the embodiment shown in FIG. 2A, APP1 112 is provided with a specific view of the file system 102', while APP2 114 is provided with another view of the file system 102" which is specific to it. In some embodiments, the application isolation layer 220 provides a specific view of native resources 102, 104, 106, 107 to each individual application program executing on top of the operating system 100. In other embodiments, application programs 112, 114 may be grouped into sets and, in these embodiments, the application isolation layer 220 provides a specific view of native resources for each set of application programs. Conflicting application programs may be put into separate groups to enhance the compatibility and sociability of applications. In still further embodiments, the applications belonging to a set may be configured by an administrator. In some embodiments, a "passthrough" isolation scope can be defined which corresponds exactly to the system scope. In other words, applications executing within a passthrough isolation scope operate directly on the system scope.

In some embodiments, the application isolation scope is further divided into layered sub-scopes. The main sub-scope contains the base application isolation scope, and additional sub-scopes contain various modifications to this scope that may be visible to multiple executing instances of the application. For example, a sub-scope may contain modifications to the scope that embody a change in the patch level of the application or the installation or removal of additional features. In some embodiments, the set of additional sub-scopes that are made visible to an instance of the executing application is configurable. In some embodiments, that set of visible sub-scopes is the same for all instances of the executing application, regardless of the user on behalf of which the application is executing. In others, the set of visible sub-scopes may vary for different users executing the application. In still other embodiments, various sets of sub-scopes may be defined and the user may have a choice as to which set to use. In some embodiments, sub-scopes may be discarded when no longer needed. In some embodiments, the modifications contained in a set of sub-scopes may be merged together to form a single sub-scope.

1.2 User Isolation

Figure 2B:
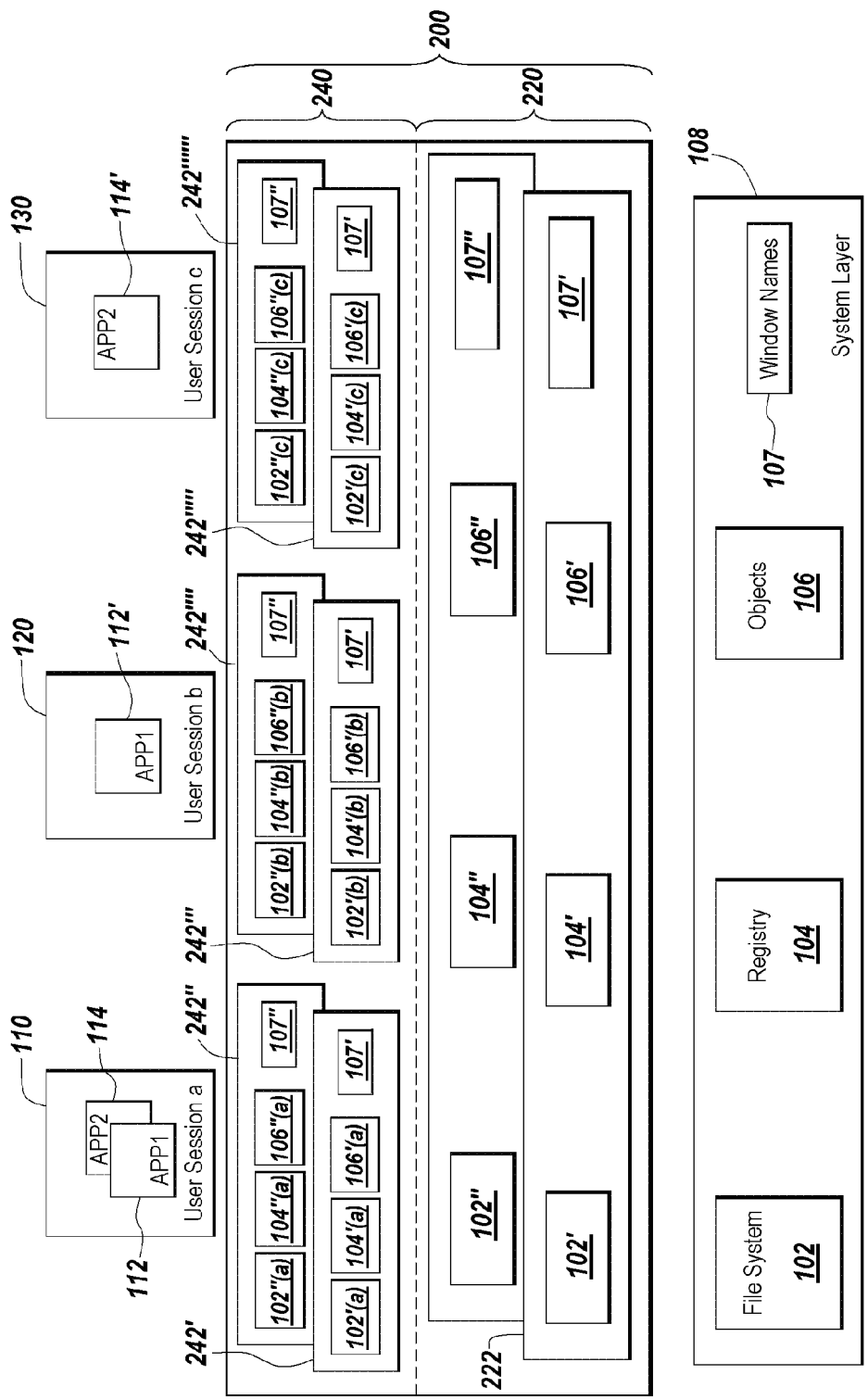
FIG. 2B is a diagram of an embodiment of a computer system having reduced application program compatibility and sociability problems.

Referring now to FIG. 2B, a multi-user computer having reduced application compatibility and application sociability problems is depicted. The multi-user computer includes native resources 102, 104, 106, 107 in the system layer 108, as well as the isolation environment 200 discussed immediately above. The application isolation layer 220 functions as discussed above, providing an application or group of applications with a modified view of native resources. The user isolation layer 240, conceptually, provides an application program 112, 114, with a view of native resources that is further altered based on user identity of the user on whose behalf the application is executed. As shown in FIG. 2B, the user isolation layer 240 may be considered to comprise a number of user isolation scopes 242', 242", 242''', 242'''', 242''''', 242'''''' (generally 242). A user isolation scope 242 provides a user-specific view of application-specific views of native resources. For example, APP1 112 executing in user session 110 on behalf of user "a" is provided with a file system view 102'(a) that is altered or modified by both the user isolation scope 242' and the application isolation scope 222.

Put another way, the user isolation layer 240 alters the view of native resources for each individual user by "layering" a user-specific view modification provided by a user isolation scope 242' "on top of" an application-specific view modification provided by an application isolation scope 222, which is in turn "layered on top of" the system-wide view of native resources provided by the system layer. For example, when the first instance of APP1 112 accesses an entry in the registry database 104, the view of the registry database specific to the first user session and the application 104'(a) is consulted. If the requested registry key is found in the user-specific view of the registry 104'(a), that registry key is returned to APP1 112. If not, the view of the registry database specific to the application 104' is consulted. If the requested registry key is found in the application-specific view of the registry 104', that registry key is returned to APP1 112. If not, then the registry key stored in the registry database 104 in the system layer 108 (i.e. the native registry key) is returned to APP1 112.

In some embodiments, the user isolation layer 240 provides an isolation scope for each individual user. In other embodiments, the user isolation layer 240 provides an isolation scope for a group of users, which may be defined by roles within the organization or may be predetermined by an administrator. In still other embodiments, no user isolation layer 240 is provided. In these embodiments, the view of native resources seen by an application program is that provided by the application isolation layer 220. The isolation environment 200, although described in relation to multi-user computers supporting concurrent execution of application programs by various users, may also be used on single-user computers to address application compatibility and sociability problems resulting from sequential execution of application programs on the same computer system by different users, and those problems resulting from installation and execution of incompatible programs by the same user.

In some embodiments, the user isolation scope is further divided into sub-scopes. The modifications by the user isolation scope to the view presented to an application executing in that scope is the aggregate of the modifications contained within each sub-scope in the scope. Sub-scopes are layered on top of each other, and in the aggregate view modifications to a resource in a higher sub-scope override modifications to the same resource in lower layers.

In some of these embodiments, one or more of these sub-scopes may contain modifications to the view that are specific to the user. In some of these embodiments, one or more sub-scopes may contain modifications to the view that are specific to sets of users, which may be defined by the system administrators or defined as a group of users in the operating system. In some of these embodiments, one of these sub-scopes may contain modifications to the view that are specific to the particular login session, and hence that are discarded when the session ends. In some of these embodiments, changes to native resources by application instances associated with the user isolation scope always affects one of these sub-scopes, and in other embodiments those changes may affect different sub-scopes depending on the particular resource changed.

1.3 Aggregate Views of Native Resources

The conceptual architecture described above allows an application executing on behalf of a user to be presented with an aggregate, or unified, virtualized view of native resources, specific to that combination of application and user. This aggregated view may be referred to as the "virtual scope". The application instance executing on behalf of a user is presented with a single view of native resources reflecting all operative virtualized instances of the native resources. Conceptually this aggregated view consists firstly of the set of native resources provided by the operating system in the system scope, overlaid with the modifications embodied in the application isolation scope applicable to the executing application, further overlaid with the modifications embodied in the user isolation scope applicable to the application executing on behalf of the user. The native resources in the system scope are characterized by being common to all users and applications on the system, except where operating system permissions deny access to specific users or applications. The modifications to the resource view embodied in an application isolation scope are characterized as being common to all instances of applications associated with that application isolation scope. The modifications to the resource view embodied in the user isolation scope are characterized as being common to all applications associated with the applicable application isolation scope that are executing on behalf of the user associated with the user isolation scope.

This concept can be extended to sub-scopes; the modifications to the resource view embodied in a user sub-scope are common to all applications associated with the applicable isolation sub-scope executing on behalf of a user, or group of users, associated with a user isolation sub-scope. Throughout this description it should be understood that whenever general reference is made to "scope," it is intended to also refer to sub-scopes, where those exist.

When an application requests enumeration of a native resource, such as a portion of the file system or registry database, a virtualized enumeration is constructed by first enumerating the "system-scoped" instance of the native resource, that is, the instance found in the system layer, if any. Next, the "application-scoped" instance of the requested resource, that is the instance found in the appropriate application isolation scope, if any, is enumerated. Any enumerated resources encountered in the application isolation scope are added to the view. If the enumerated resource already exists in the view (because it was present in the system scope, as well), it is replaced with the instance of the resource encountered in the application isolation scope. Similarly, the "user-scoped" instance of the requested resource, that is the instance found in the appropriate user isolation scope, if any, is enumerated. Again, any enumerated resources encountered in the user isolation scope are added to the view. If the native resource already exists in the view (because it was present in the system scope or in the appropriate application isolation scope), it is replaced with the instance of the resource encountered in the user isolation scope. In this manner, any enumeration of native resources will properly reflect virtualization of the enumerated native resources. Conceptually the same approach applies to enumerating an isolation scope that comprises multiple sub-scopes. The individual sub-scopes are enumerated, with resources from higher sub-scopes replacing matching instances from lower sub-scopes in the aggregate view.

In other embodiments, enumeration may be performed from the user isolation scope layer down to the system layer, rather than the reverse. In these embodiments, the user isolation scope is enumerated. Then the application isolation scope is enumerated and any resource instances appearing in the application isolation scope that were not enumerated in the user isolation scope are added to the aggregate view that is under construction. A similar process can be repeated for resources appearing only in the system scope.

In still other embodiments, all isolation scopes may be simultaneously enumerated and the respective enumerations combined.

If an application attempts to open an existing instance of a native resource with no intent to modify that resource, the specific instance that is returned to the application is the one that is found in the virtual scope, or equivalently the instance that would appear in the virtualized enumeration of the parent of the requested resource. From the point of view of the isolation environment, the application is said to be requesting to open a "virtual resource", and the particular instance of native resource used to satisfy that request is said to be the "literal resource" corresponding to the requested resource.

If an application executing on behalf of a user attempts to open a resource and indicates that it is doing so with the intent to modify that resource, that application instance is normally given a private copy of that resource to modify, as resources in the application isolation scope and system scope are common to applications executing on behalf of other users. Typically a user-scoped copy of the resource is made, unless the user-scoped instance already exists. The definition of the aggregate view provided by a virtual scope means that the act of copying an application-scoped or system-scoped resource to a user isolation scope does not change the aggregate view provided by the virtual scope for the user and application in question, nor for any other user, nor for any other application instance. Subsequent modifications to the copied resource by the application instance executing on behalf of the user do not affect the aggregate view of any other application instance that does not share the same user isolation scope. In other words, those modifications do not change the aggregate view of native resources for other users, or for application instances not associated with the same application isolation scope.

1.4 Association of Processes with Isolation Scopes

Applications may be installed into a particular isolation scope (described below in more detail). Applications that are installed into an isolation scope are always associated with that scope. Alternatively, applications may be launched into a particular isolation scope, or into a number of isolation scopes. In effect, an application is launched and associated with one or more isolation scopes. The associated isolation scope, or scopes, provide the process with a particular view of native resources. Applications may also be launched into the system scope, that is, they may be associated with no isolation scope. This allows for the selective execution of operating system applications such as Internet Explorer, as well as third party applications, within an isolation environment.

This ability to launch applications within an isolation scope regardless of where the application is installed mitigates application compatibility and sociability issues without requiring a separate installation of the application within the isolation scope. The ability to selectively launch installed applications in different isolation scopes provides the ability to have applications which need helper applications (such as Word, Notepad, etc.) to have those helper applications launched with the same rule sets.

Further, the ability to launch an application within multiple isolated environments allows for better integration between isolated applications and common applications.

Figure 2C:
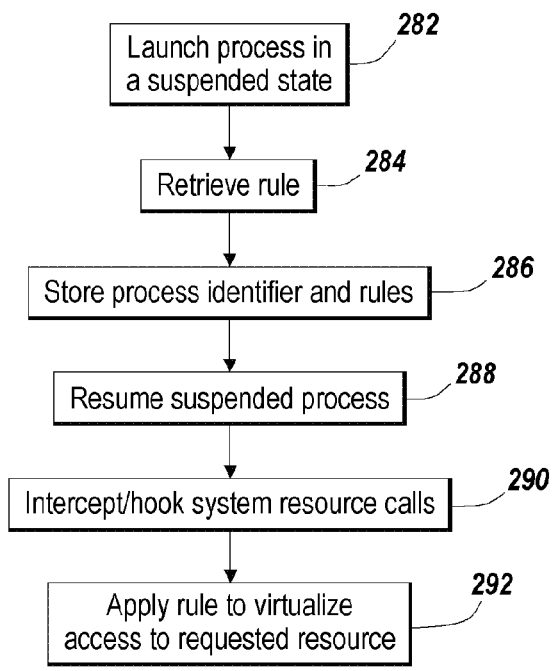
FIG. 2C is a flowchart showing one embodiment of steps taken to associate a process with an isolation scope.

Referring now to FIG. 2C, and in brief overview, a method for associating a process with an isolation scope includes the steps of launching the process in a suspended state (step 282). The rules associated with the desired isolation scope are retrieved (step 284) and an identifier for the process and the retrieved rules are stored in a memory element (step 286) and the suspended process is resumed (step 288). Subsequent calls to access native resources made by the process are intercepted or hooked (step 290) and the rules associated with the process identifier, if any, are used to virtualize access to the requested resource (step 292).

Still referring to FIG. 2C, and in more detail, a process is launched in a suspended state (step 282). In some embodiments, a custom launcher program is used to accomplish this task. In some of these embodiments, the launcher is specifically designed to launch a process into a selected isolation scope. In other embodiments, the launcher accepts as input a specification of the desired isolation scope, for example, by a command line option.

The rules associated with the desired isolation scope are retrieved (step 284). In some embodiments, the rules are retrieved from a persistent storage element, such as a hard disk drive or other solid state memory element. The rules may be stored as a relational database, flat file database, tree-structured database, binary tree structure, or other persistent data structure. In other embodiments, the rules may be stored in a data structure specifically configured to store them.

An identifier for the process, such as a process id (PID), and the retrieved rules are stored in a memory element (step 286). In some embodiments, a kernel mode driver is provided that receives operating system messages concerning new process creation. In these embodiments, the PID and the retrieved rules may be stored in the context of the driver. In other embodiments, a file system filter driver, or mini-filter, is provided that intercepts native resource requests. In these embodiments, the PID and the retrieved rules may be stored in the filter. In other embodiments still, all interception is performed by user-mode hooking and no PID is stored at all. The rules are loaded by the user-mode hooking apparatus during the process initialization, and no other component needs to know the rules that apply to the PID because rule association is performed entirely in-process.

The suspended process is resumed (step 288) and subsequent calls to access native resources made by the process are intercepted or hooked (step 290) and the rules associated with the process identifier, if any, are used to virtualize access to the requested resource (step 292). In some embodiments, a file system filter driver, or mini-filter, intercepts requests to access native resources and determines if the process identifier associated with the intercepted request has been associated with a set of rules. If so, the rules associated with the stored process identifier are used to virtualize the request to access native resources. If not, the request to access native resources is passed through unmodified. In other embodiments, a dynamically-linked library is loaded into the newly-created process and the library loads the isolation rules. In still other embodiments, both kernel mode techniques (hooking, filter driver, mini-filter) and user-mode techniques are used to intercept calls to access native resources. For embodiments in which a file system filter driver stores the rules, the library may load the rules from the file system filter driver.

Processes that are "children" of processes associated with isolation scopes are associated with the isolation scopes of their "parent" process. In some embodiments, this is accomplished by a kernel mode driver notifying the file system filter driver when a child process is created. In these embodiments, the file system filter driver determines if the process identifier of the parent process is associated with an isolation scope. If so, file system filter driver stores an association between the process identifier for the newly-created child process and the isolation scope of the parent process. In other embodiments, the file system filter driver can be called directly from the system without use of a kernel mode driver. In other embodiments, in processes that are associated with isolation scopes, operating system functions that create new processes are hooked or intercepted. When request to create a new process are received from such a process, the association between the new child process and the isolation scope of the parent is stored.

In some embodiments, a scope or sub-scope may be associated with an individual thread instead of an entire process, allowing isolation to be performed on a per-thread basis. In some embodiments, per-thread isolation may be used for Services and COM+ servers.

1.4.1 Associating Out-of-scope Processes with Isolation Scopes

Another aspect of this invention is the ability to associate any application instance with any application isolation scope, regardless of whether the application was installed into that application isolation scope, another application isolation scope or no application isolation scope. Applications which were not installed into a particular application scope can nevertheless be executed on behalf of a user in the context of an application isolation scope and the corresponding user isolation scope, because their native resources are available to them via the aggregated virtual scope formed by the user isolation scope, application isolation scope and system scope. Where it is desired to run an application in an isolation scope, this provides the ability for applications installed directly into the system scope to be run within the isolation scope without requiring a separate installation of the application within the isolation scope. This also provides the ability for applications installed directly into the system scope to be used as helper applications in the context of any isolation scope.

Each application instance, including all of the processes that make up the executing application, is associated with either zero or one application isolation scopes, and by extension exactly zero or one corresponding user isolation scopes. This association is used by the rules engine when determining which rule, if any, to apply to a resource request. The association does not have to be to the application isolation scope that the application was installed into, if any. Many applications that are installed into an isolation scope will not function correctly when running in a different isolation scope or no isolation scope because they cannot find necessary native resources. However, because an isolation scope is an aggregation of resource views including the system scope, an application installed in the system scope can generally function correctly inside any application isolation scope. This means that helper programs, as well as out-of-process COM servers, can be invoked and executed by an application executing on behalf of a user in a particular isolation scope.

In some embodiments, applications that are installed in the system scope are executed in an isolation scope for the purpose of identifying what changes are made to the computer's files and configuration settings as a result of this execution. As all affected files and configuration settings are isolated in the user isolation scope, these files and configuration settings are easily identifiable. In some of these embodiments, this is used in order to report on the changes made to the files and configuration settings by the application. In some embodiments, the files and configuration settings are deleted at the end of the application execution, which effectively ensures that no changes to the computer's files and configuration setting are stored as a result of application execution. In still other embodiments, the files and configuration settings are selectively deleted or not deleted at the end of the application execution, which effectively ensures that only some changes to the computer's files and configuration setting are stored as a result of application execution.

2.0 Virtualization Mechanism Overview

Figure 3A:
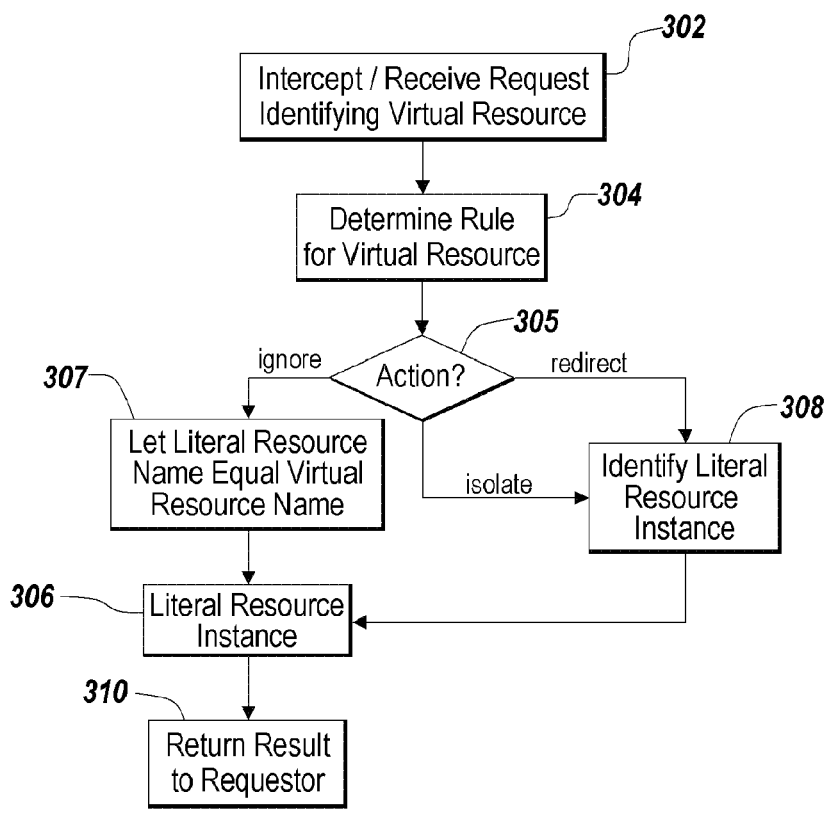
FIG. 3A is a flowchart showing one embodiment of steps taken to virtualize access to native resources in a computer system.

Referring now to FIG. 3A, one embodiment of the steps to be taken to virtualize access to native resources in execute mode, which will be distinguished from install mode below, is shown. In brief overview, a request to access a native resource is intercepted or received (step 302). The request identifies the native resource to which access is sought. The applicable rule regarding how to treat the received access request is determined (step 304). If the rule indicates the request should be ignored, the access request is passed without modification to the system layer (step 306) and the result returned to the requestor (step 310). If the rule indicates that the access request should be either redirected or isolated, the literal instance of the resource that satisfies the request is identified (step 308), a modified or replacement request for the literal resource is passed to the system layer (step 306) and the result is returned to the requestor (step 310).

Still referring to FIG. 3, and in more detail, a request identifying a native resource is intercepted or received (step 302). In some embodiments, requests for native resources are intercepted by "hooking" functions provided by the operating system for applications to make native resource requests. In specific embodiments, this is implemented as a dynamically-linked library that is loaded into the address space of every new process created by the operating system, and which performs hooking during its initialization routine. Loading a DLL into every process may be achieved via a facility provided by the operating system, or alternatively by modifying the executable image's list of DLLs to import, either in the disk file, or in memory as the executable image for the process is loaded from disk. In other embodiments, function hooking is performed by a service, driver or daemon. In other embodiments, executable images, including shared libraries and executable files, provided by the operating system may be modified or patched in order to provide function hooks or to directly embody the logic of this invention. For specific embodiments in which the operating system is a member of the Microsoft WINDOWS family of operating systems, interception may be performed by a kernel mode driver hooking the System Service Dispatch Table. In still other embodiments, the operating system may provide a facility allowing third parties to hook functions that request access to native resources. In some of these embodiments, the operating system may provide this facility via an application programming interface (API) or a debug facility.

In other embodiments, the native resource request is intercepted by a filter in the driver stack or handler stack associated with the native resource. For example, some members of the family of Microsoft WINDOWS operating systems provide the capability to plug a third-party filter driver or mini-filter into the file system driver stack and a file system filter driver or mini-filter may be used to provide the isolation functions described below. In still other embodiments the invention comprises a file system implementation that directly incorporates the logic of this invention. Alternatively, the operating system may be rewritten to directly provide the functions described below. In some embodiments, a combination of some or all of the methods listed above to intercept or receive requests for resources may be simultaneously employed.

In many embodiments, only requests to open an existing native resource or create a new native resource are hooked or intercepted. In these embodiments, the initial access to a native resource is the access that causes the resource to be virtualized. After the initial access, the requesting application program is able to communicate with the operating system concerning the virtualized resource using a handle or pointer or other identifier provided by the operating system that directly identifies the literal resource. In other embodiments, other types of requests to operate on a virtualized native resource are also hooked or intercepted. In some of these embodiments, requests by the application to open or create virtual resources return virtual handles that do not directly identify the literal resource, and the isolation environment is responsible for translating subsequent requests against virtual handles to the corresponding literal resource. In some of those embodiments, additional virtualization operations can be deferred until proven necessary. For example, the operation of providing a private modifiable copy of a resource to an isolation scope can be deferred until a request to change the resource is made, rather than when the resource is opened in a mode that allows subsequent modification.

Once the native resource request is intercepted or received, the applicable rule determining how to treat the particular request is determined (step 304). The most applicable rule may be determined by reference to a rules engine, a database of rules, or a flat file containing rules organized using an appropriate data structure such as a list or a tree structure. In some embodiments, rules are accorded a priority that determines which rule will be regarded as most applicable when two or more rules apply. In some of these embodiments, rule priority is included in the rules themselves or, alternatively, rule priority may be embedded in the data structure used to store the rules, for example, rule priority may be indicated by a rule's position in a tree structure. The determined rule may include additional information regarding how to process the virtualized resource request such as, for example, to which literal resource to redirect the request. In a specific embodiment a rule is a triple comprising a filter field, an action field, and data field. In this embodiment, the filter field includes the filter used to match received native resource requests to determine if the rule is valid for the requested resource name. The action field can be "ignore," "redirect," or "isolate". The data field may be any additional information concerning the action to be taken when the rule is valid, including the function to be used when the rule is valid.

A rule action of "ignore" means the request directly operates on the requested native resource in the system scope. That is, the request is passed unaltered to the system layer 108 (step 306) and the request is fulfilled as if no isolation environment 200 exists. In this case, the isolation environment is said to have a "hole", or the request may be referred to as a "passthrough" request.

If the rule action indicates that the native resource request should be redirected or isolated, then the literal resource that satisfies the request is identified (step 308).

A rule action of "redirect" means that the request directly operates on a system-scoped native resource, albeit a different resource than specified in the request. The literal resource is identified by applying a mapping function specified in, or implied by, the data field of the determined rule to the name of the requested native resource. In the most general case the literal native resource may be located anywhere in the system scope. As a simple example, the rule {prefix_match ("c:\temp\", resource name), REDIRECT, replace_prefix ("c:\temp\", "d:\wutemp\", resource name)} will redirect a requested access to the file c:\temp\examples\d1.txt to the literal file d:\wutemp\examples\d1.txt. The mapping function included in the data field of the rule and the matching function may be further generalized to support complex behaviors by, for example, using regular expressions. Some embodiments may provide the ability to specify mapping functions that locate the literal resource within the user isolation scope or a sub-scope applicable to the application executing on behalf of the user, or the application isolation scope or a sub-scope applicable to the application. Further embodiments may provide the ability to specify mapping functions that locate the literal resource within the application isolation scope applicable to a different application in order to provide a controlled form of interaction between isolated applications. In some particular embodiments, the "redirect" action can be configured to provide behavior equivalent to the "ignore" rule action. In these embodiments, the literal resource is exactly the requested native resource. When this condition is configured, the isolation environment may be said to have a "hole," or the request may be referred to as a "passthrough" request.

A rule action of "isolate" means that the request operates on a literal resource that is identified using the appropriate user isolation scope and application isolation scope. That is, the identifier for the literal resource is determined by modifying the identifier for the requested native resource using the user isolation scope, the application isolation scope, both scopes, or neither scope. The particular literal resource identified depends on the type of access requested and whether instances of the requested native resource already exist in the applicable user isolation scope, the applicable application isolation scope and the system scope.

Figure 3B:
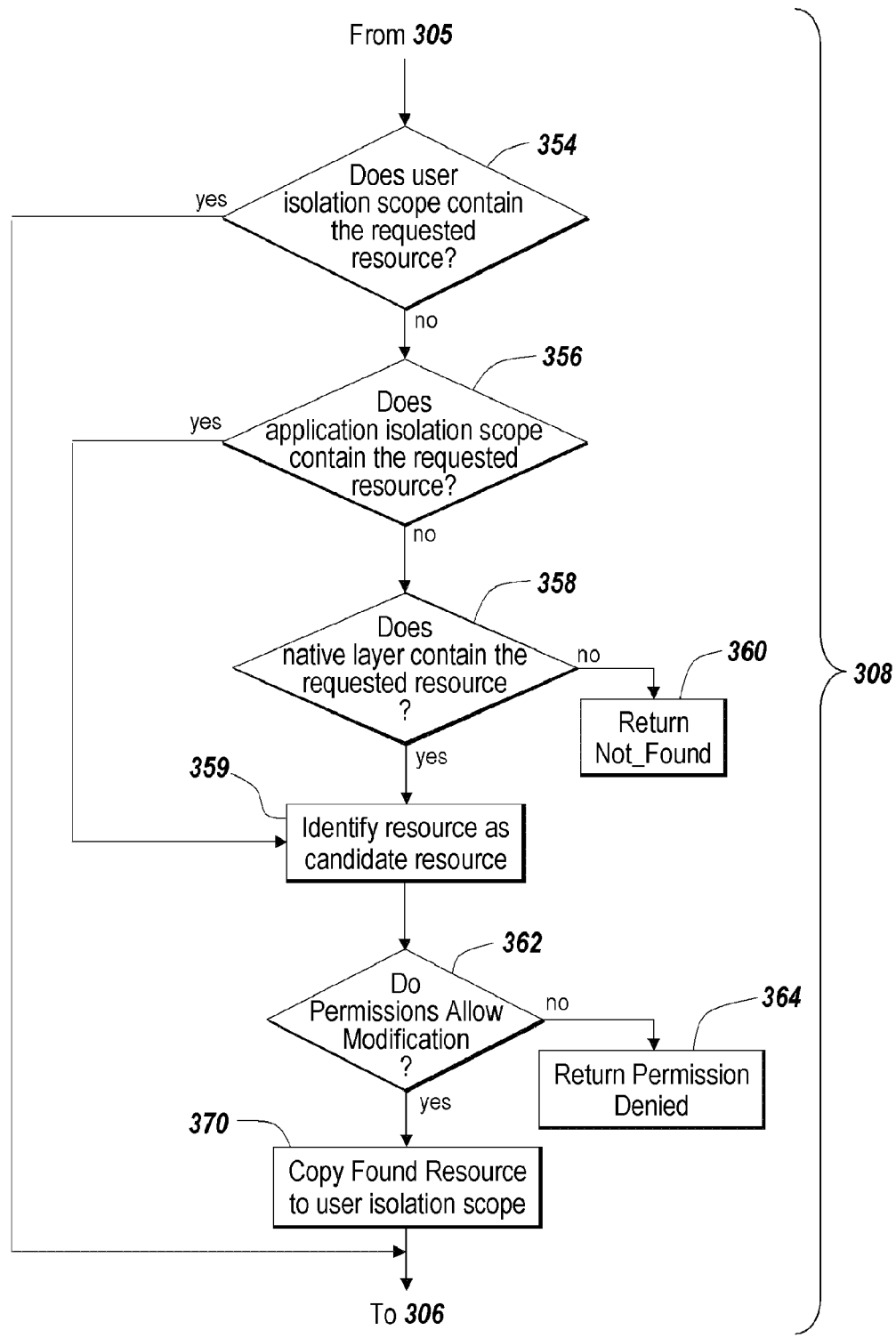
FIG. 3B is a flowchart showing an embodiment of steps taken to identify a replacement instance in execute mode.

FIG. 3B depicts one embodiment of steps taken to identify the literal resource (step 306 in FIG. 3A) when a request to open a native resource is received that indicates the resource is being opened with the intention of modifying it. Briefly, a determination is made whether the user-scoped instance, that is, an instance that exists in an applicable user scope or user sub-scope, of the requested native resource exists (step 354). If so, the user-scoped instance is identified as the literal resource for the request (step 372), and that instance is opened and returned to the requester. If the user-scoped instance does not exist, a determination whether the application-scoped instance of the requested native resource exists is made (step 356). If the application-scoped instance exists, it is identified as the "candidate" resource instance (step 359), and permission data associated with the candidate instance is checked to determine if modification of that instance is allowed (step 362). If no application-scoped instance exists, then a determination is made whether the system-scoped instance of the requested native resource exists (step 358). If it does not, an error condition is returned to the requestor indicating that the requested virtualized resource does not exist in the virtual scope (step 360). However, if the system-scoped resource exists, it is identified as the candidate resource instance (step 361), and permission data associated with the candidate instance is checked to determine if modification of that instance is allowed (step 362). If not, an error condition is returned to the requestor (step 364) indicating that modification of the virtualized resource is not allowed. If the permission data indicates that the candidate resource may be modified, a user-scoped copy of the candidate instance of the native resource is made (step 370), the user-scoped instance is identified as the literal instance for the request (step 372), and is opened and returned to the requester.

Still referring to FIG. 3B, and in more detail, a determination is made whether the user-scoped resource exists, or in other words, whether the requested resource exists in the applicable user scope or sub-scope (step 354). The applicable user scope or sub-scope is the scope associated with the user that is layered on the application isolation scope associated with the application making the request. The user isolation scope or a sub-scope, in the file system case, may be a directory under which all files that exist in the user isolation scope are stored. In some of these embodiments, the directory tree structure under the user isolation directory reflects the path of the requested resource. For example, if the requested file is c:\temp\test.txt and the user isolation scope directory is d:\user1\app1\, then the path to the user-scoped literal file may be d:\user1\app1\c\temp\test.txt. In other embodiments, the path to the user-scoped literal may be defined in a native naming convention. For example, the path to the user-scoped literal file may be d:\user1\app1\device\harddisk1\temp\test.txt. In still other embodiments, the user-scoped files may all be stored in a single directory with names chosen to be unique and a database may be used to store the mapping between the requested file name and the name of the corresponding literal file stored in the directory. In still other embodiments, the contents of the literal files may be stored in a database. In still other embodiments, the native file system provides the facility for a single file to contain multiple independent named "streams", and the contents of the user-scoped files are stored as additional streams of the associated files in the system scope. Alternatively, the literal files may be stored in a custom file system that may be designed to optimize disk usage or other criteria of interest.

If the user-scoped resource instance does not exist, then a determination is made whether the application-scoped resource exists, or in other words whether the requested resource exists in the application isolation scope (step 356). The methods described above are used to make this determination. For example, if the requested file is c:\temp\test.txt and the application isolation scope directory is e:\app1\, then the path to the application-scoped file may be e:\app1\c\temp\test.txt. As above, the path to the application-scoped file may be stored in a native naming convention. The embodiments described above may also apply to the application isolation scope.

If the application-scoped resource does not exist, then a determination is made whether the system-scoped resource exists, or in other words, whether the requested resource exists in the system scope (step 358). For example, if the requested file is c:\temp\test.txt then the path to the system-scoped file is c:\temp\test.txt. If the requested resource does not exist in the system scope, an indication that the requested resource does not exist in the virtual scope is returned to the requestor (step 360).

Whether the candidate resource instance for the requested resource is located in the application isolation scope or in the system scope, a determination is made whether modification of the candidate resource instance is allowed (step 362). For example, the candidate native resource instance may have associated native permission data indicating that modification of the candidate instance is not allowed by that user. Further, the rules engine may include configuration settings instructing the isolation environment to obey or override the native permission data for virtualized copies of resources. In some embodiments, the rules may specify for some virtual resources the scope in which modifications are to occur, for example the system scope or the application isolation scope or a sub-scope, or the user isolation scope or a sub-scope. In some embodiments, the rules engine may specify configuration settings that apply to subsets of the virtualized native resources based on hierarchy or on type of resource accessed. In some of these embodiments, the configuration settings may be specific to each atomic native resource. In another example, the rules engine may include configuration data that prohibits or allows modification of certain classes of files, such as executable code or MIME types or file types as defined by the operating system.

If the determination in step 362 is that modification of the candidate resource instance is not allowed, then an error condition is returned to the requestor indicating that write access to the virtual resource is not allowed (step 364). If the determination in step 362 is that modification of the candidate resource instance is allowed, then the candidate instance is copied to the appropriate user isolation scope or sub-scope (step 370). For embodiments in which the logical hierarchy structure of the requested native resource is maintained in the isolation scopes, copying the candidate instance of the resource to the user isolation scope may require the creation in the user isolation scope of hierarchy placeholders. A hierarchy placeholder is a node that is placed in the hierarchy to correctly locate the copied resource in the isolation scope. A hierarchy placeholder stores no data, is identified as a placeholder node, and "does not exist" in the sense that it cannot be the literal resource returned to a requestor. In some embodiments, the identification of a node as a placeholder node is made by recording the fact in metadata attached to the node, or to the parent of the node, or to some other related entity in the system layer. In other embodiments, a separate repository of placeholder node names is maintained.

In some embodiments, the rules may specify that modifications to particular resources may be made at a particular scope, such as the application isolation scope. In those cases the copy operation in step 370 is expanded to determine whether modification to the candidate resource instance is allowed at the scope or sub-scope in which it is found. If not, the candidate resource instance is copied to the scope or sub-scope in which modification is allowed, which may not always be the user isolation scope, and the new copy is identified as the literal resource instance (step 372). If so, the candidate resource instance is identified as the literal instance (step 372), and is opened and the result returned to the requestor (step 306).

Referring back to FIG. 3A, the literal resource instance, whether located in step 354 or created in step 370, is opened (step 306) and returned to the requestor (step 310). In some embodiments, this is accomplished by issuing an "open" command to the operating system and returning to the requestor the response from the operating system to the "open" command.

If an application executing on behalf of a user deletes a native resource, the aggregated view of native resources presented to that application as the virtual scope must reflect the deletion. A request to delete a resource is a request for a special type of modification, albeit one that modifies the resource by removing its existence entirely. Conceptually a request to delete a resource proceeds in a similar manner to that outlined in FIG. 3A, including the determination of the literal resource as outlined in FIG. 3B. However, step 306 operates differently for isolated resources and for redirected or ignored resources. For redirect and ignore, the literal resource is deleted from the system scope. For isolate, the literal resource is "virtually" deleted, or in other words the fact that it has been deleted is recorded in the user isolation scope. A deleted node contains no data, is identified as deleted, and it and all of its descendants "do not exist". In other words, if it is the resource or the ancestor of a resource that would otherwise satisfy a resource request a "resource not found" error is returned to the requestor. Further details will be outlined in Section 4. In some embodiments, the identification of a node as a deleted node is made by recording the fact in metadata attached to the node, or to the parent of the node, or to some other related entity in the system layer. In other embodiments, a separate repository of deleted node names is maintained, for example, in a separate sub-scope.

3.0 Installation into an Isolation Environment

The application isolation scope described above can be considered as the scope in which associated application instances share resources independently of any user, or equivalently on behalf of all possible users, including the resources that those application instances create. The main class of such resources is the set created when an application is installed onto the operating system. As shown in FIG. 1A, two incompatible applications cannot both be installed into the same system scope, but this problem can be resolved by installing at least one of those applications into an isolation environment.

An isolation scope, or an application instance associated with an isolation scope, can be operated in an "install mode" to support installation of an application. This is in contrast to "execute mode" described below in connection with FIGS. 4-16. In install mode, the application installation program is associated with an application isolation scope and is presumed to be executing on behalf of all users. The application isolation scope acts, for that application instance, as if it were the user isolation scope for "all users", and no user isolation scope is active for that application instance.

Figure 3C:
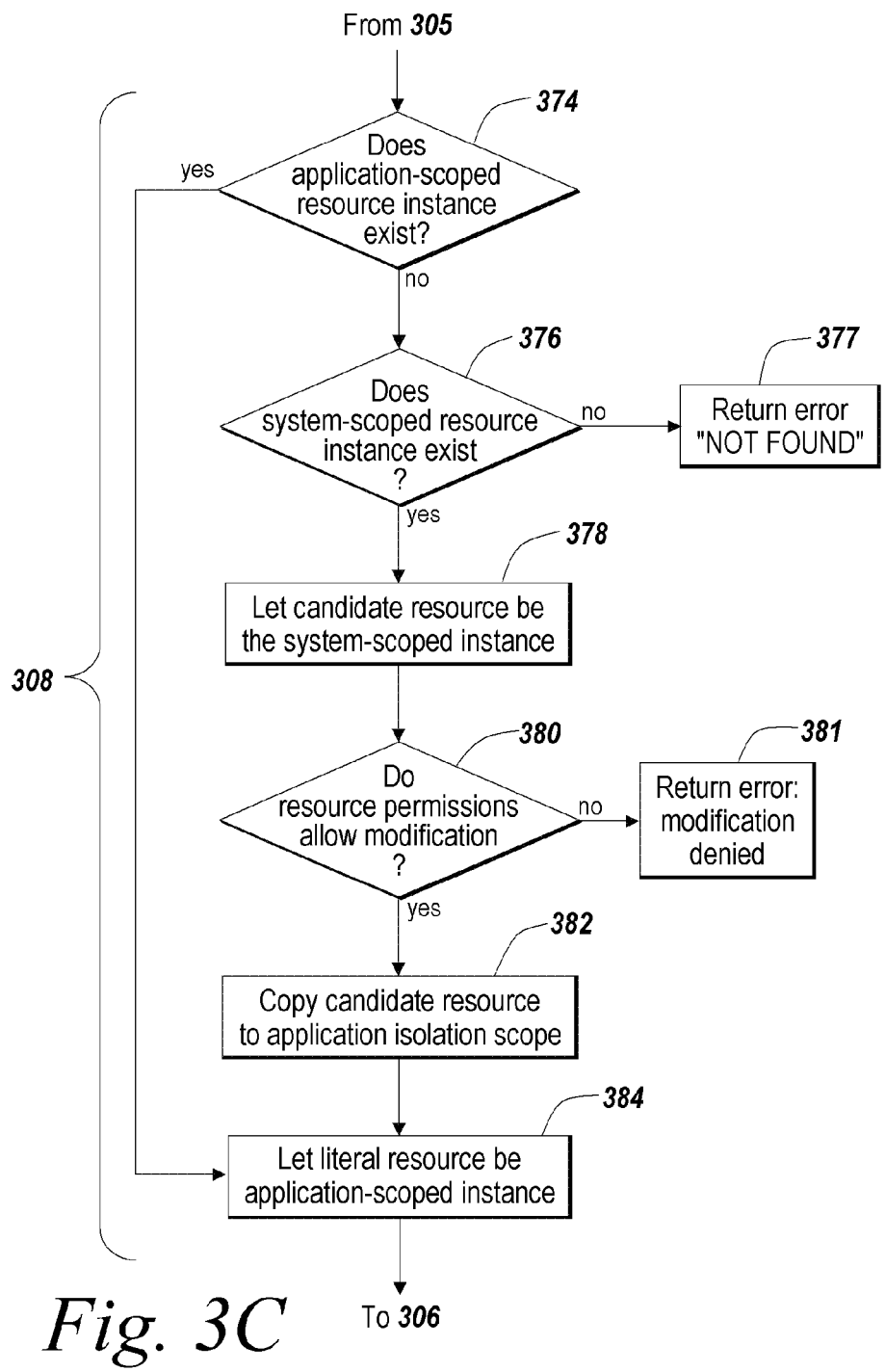
FIG. 3C is a flowchart depicting one embodiment of steps taken in install mode to identify a literal resource when a request to open a native resource is received that indicates the resource is being opened with the intention of modifying it.

FIG. 3C depicts one embodiment of steps taken in install mode to identify a literal resource when a request to open a native resource is received that indicates the resource is being opened with the intention of modifying it. Briefly, as no user-isolation scope is active, a determination is first made whether the application-scoped instance of the requested native resource exists (step 374). If the application-scoped instance exists, it is identified as the literal resource instance (step 384). If no application-scoped instance exists, a determination is made whether the system-scoped instance of the requested native resource exists (step 376). If it does not, an error condition is returned to the requestor indicating that the requested virtualized resource does not exist in the virtual scope (step 377). However, if the system-scoped resource exists, it is identified as the candidate resource instance (step 378), and permission data associated with the candidate instance is checked to determine if modification of that instance is allowed (step 380). If not, an error condition is returned to the requestor (step 381) indicating that modification of the virtualized resource is not allowed. If the permission data indicates that the candidate resource may be modified, as no user-isolation scope is active, an application-scoped copy of the candidate instance of the native resource is made (step 382), and the application-scoped instance is identified as the literal instance for the request (step 384). In some embodiments, the candidate file is copied to a location defined by the rules engine. For example, a rule may specify that the file is copied to an application isolation scope. In other embodiments the rules may specify a particular application isolation sub-scope or user isolation sub-scope to which the requested file should be copied. Any ancestors of the requested file that do not appear in the isolation scope to which the file is copied are created as placeholders in the isolation scope in order to correctly locate the copied instance in the hierarchy.

Figure 3D:
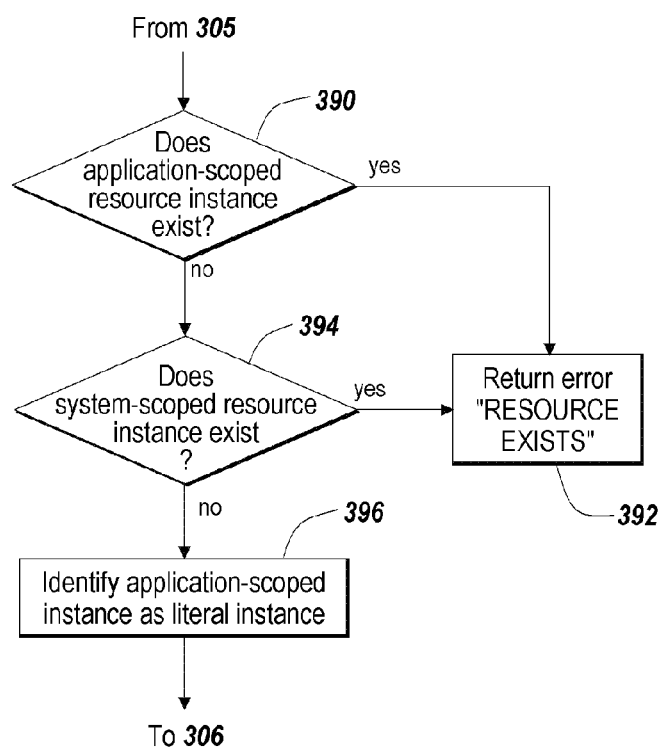
FIG. 3D is a flowchart depicting one embodiment of steps taken in install mode to identify the literal resource when a request to create a virtual resource is received.

FIG. 3D shows one embodiment of steps taken in install mode to identify the literal resource when a request to create a native resource is received. Briefly, as no user-isolation scope is active, a determination is first made whether the application-scoped instance of the requested native resource exists (step 390). If the application-scoped instance exists, an error condition may be returned to the requestor indicating that the resource cannot be created because it already exists (step 392). If no application-scoped instance exists, a determination may be made whether the system-scoped instance of the requested native resource exists (step 394). If the system-scoped instance exists, an error condition may be returned to the requestor indicating that the resource cannot be created because it already exists (step 392). In some embodiments, the request used to open the resource may specify that any extant system-scoped instance of the resource may be overwritten. If the system-scoped resource instance does not exist, the application-scoped resource instance may be identified as the literal instance which will be created to fulfill the request (step 396).

By comparing FIG. 3B with FIGS. 3C and 3D, it can be seen that install mode operates in a similar manner to execute mode, with the application isolation scope taking the place of the user isolation scope. In other words, modifications to persistent resources, including creation of new resources, take place in the appropriate application isolation scope instead of the appropriate user isolation scope. Furthermore, virtualization of access to existing isolated resources also ignores the appropriate user isolation scope and begins searching for a candidate literal resource in the application isolation scope.

There are two other cases where the application isolation scope operates in this manner to contain modifications to existing resources and creation of new resources. Firstly, there may be an isolation environment configured to operate without a user isolation layer, or a virtual scope configured to operate without a user isolation scope. In this case, the application isolation scope is the only isolation scope that can isolate modified and newly created resources. Secondly, the rules governing a particular set of virtual resources may specify that they are to be isolated into the appropriate application isolation scope rather than into the appropriate user isolation scope. Again, this means modifications to and creations of resources subject to that rule will be isolated into the appropriate application isolation scope where they are visible to all application instances sharing that scope, rather than in the user isolation scope where they are only visible to the user executing those application instances.

In still other embodiments, an isolation environment may be configured to allow certain resources to be shared in the system scope, that is, the isolation environment may act, for one or more system resources, as if no user isolation scope and no application isolation scope exists. System resources shared in the system scope are never copied when accessed with the intent to modify, because they are shared by all applications and all users, i.e., they are global objects.

4.0 Detailed Virtualization Examples

The methods and apparatus described above may be used to virtualize a wide variety of native resources 108. A number of these are described in detail below.

4.1 File System Virtualization

The methods and apparatus described above may be used to virtualize access to a file system. As described above, a file system is commonly organized in a logical hierarchy of directories, which are themselves files and which may contain other directories and data files.

4.1.1 File System Open Operations

Figure 4:
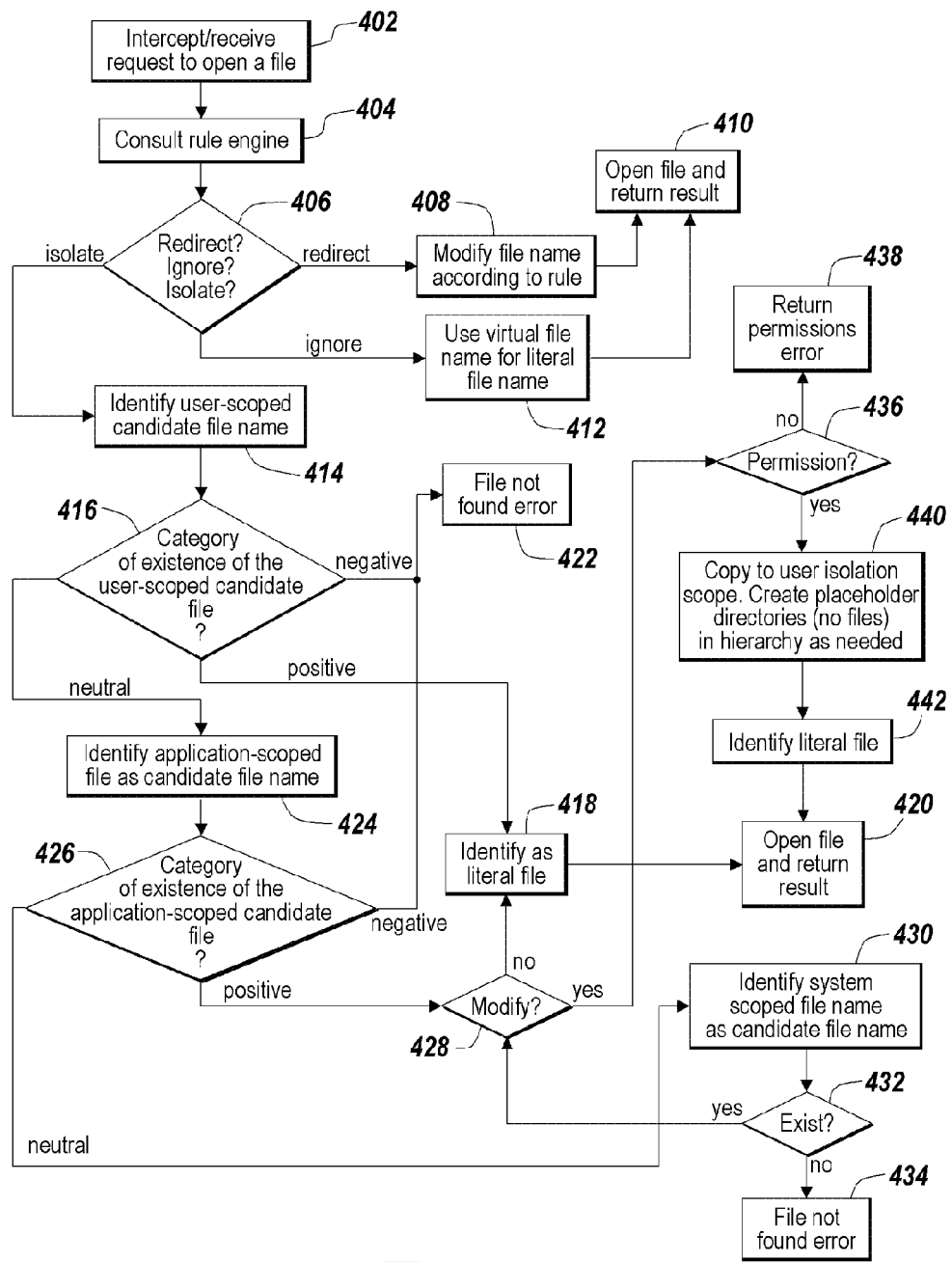
FIG. 4 is a flowchart depicting one embodiment of the steps taken to open an entry in a file system in the described virtualized environment.

In brief overview, FIG. 4 depicts one embodiment of the steps taken to open a file in the virtualized environment described above. A request to open a file is received or intercepted (step 402). The request contains a file name, which is treated as a virtual file name by the isolation environment. The processing rule applicable to the target of the file system open request is determined (step 404). If the rule action is "redirect" (step 406), the virtual file name provided in the request is mapped to a literal file name according to the applicable rule (step 408). A request to open the literal file using the literal file name is passed to the operating system and the result from the operating system is returned to the requestor (step 410). If instead the rule action is "ignore" (step 406), then the literal file name is determined to be exactly the virtual file name (step 412), and the request to open the literal file is passed to the operating system and the result from the operating system is returned to the requestor (step 410). If in step 406 the rule action is "isolate", then the file name corresponding to the virtual file name in the user isolation scope is identified as the candidate file name (step 414). In other words, the candidate file name is formed by mapping the virtual file name to the corresponding native file name specific to the applicable user isolation scope. The category of existence of the candidate file is determined by examining the user isolation scope and any metadata associated with the candidate file (step 416). If the candidate file is determined to have "negative existence", because either the candidate file or one of its ancestor directories in the user isolation scope is marked as deleted, this means the requested virtual file is known to not exist. In this case, an error condition indicating the requested file is not found is returned to the requestor (step 422). If instead in step 416 the candidate file is determined to have "positive existence", because the candidate file exists in the user isolation scope and is not marked as a placeholder node, then the requested virtual file is known to exist. The candidate file is identified as the literal file for the request (step 418), and a request issued to open the literal file and the result returned to the requestor (step 420). If, however, in step 416, the candidate file has "neutral existence" because the candidate file does not exist, or the candidate file exists but is marked as a placeholder node, it is not yet known whether the virtual file exists or not. In this case the application-scoped file name corresponding to the virtual file name is identified as the candidate file name (step 424). In other words, the candidate file name is formed by mapping the virtual file name to the corresponding native file name specific to the applicable application isolation scope. The category of existence of the candidate file is determined by examining the application isolation scope and any metadata associated with the candidate file (step 426). If the candidate file is determined to have "negative existence", because either the candidate file or one of its ancestor directories in the application isolation scope is marked as deleted, this means the requested virtual file is known to not exist. In this case, an error condition indicating the requested file is not found is returned to the requestor (step 422). If instead in step 426 the candidate file is determined to have "positive existence", because the candidate file exists in the application isolation scope and is not marked as a placeholder node, then the requested virtual file is known to exist. The request is checked to determine if the open request indicates an intention to modify the file (step 428). If not, the candidate file is identified as the literal file for the request (step 418), and a request issued to open the literal file and the result returned to the requestor (step 420). If, however, in step 428, it is determined that the open request indicates intention to modify the file, permission data associated with the file is checked to determine if modification of the file is allowed (step 436). If not, an error condition is returned to the requestor (step 438) indicating that modification of the file is not allowed. If the permission data indicates that the file may be modified, the candidate file is copied to the user isolation scope (step 440). In some embodiments, the candidate file is copied to a location defined by the rules engine. For example, a rule may specify that the file is copied to an application isolation scope. In other embodiments the rules may specify a particular application isolation sub-scope or user isolation sub-scope to which the file should be copied. Any ancestors of the requested file that do not appear in the isolation scope to which the file is copied are created as placeholders in the isolation scope in order to correctly locate the copied instance in the hierarchy. The scoped instance is identified as the literal file (step 442) and a request issued to open the literal file and the result returned to the requestor (step 420). Returning to step 426, if the candidate file has neutral existence because the candidate file does not exist, or because the candidate file is found but marked as a placeholder node, it is not yet known whether the virtual file exists or not. In this case, the system-scoped file name corresponding to the virtual file name is identified as the candidate file name (step 430). In other words, the candidate file name is exactly the virtual file name. If the candidate file does not exist (step 432), an error condition indicating the virtual file was not found is returned to the requestor (step 434). If on the other hand the candidate file exists (step 432), the request is checked to determine if the open request indicates an intention to modify the file (step 428). If not, the candidate file is identified as the literal file for the request (step 418), and a request issued to open the literal file and the result returned to the requestor (step 420). If, however, in step 428, it is determined that the open request indicates intention to modify the file, permission data associated with the file is checked to determine if modification of the file is allowed (step 436). If not, an error condition is returned to the requestor (step 438) indicating that modification of the file is not allowed. If the permission data indicates that the file may be modified, the candidate file is copied to the user isolation scope (step 440). In some embodiments, the candidate file is copied to a location defined by the rules engine. For example, a rule may specify that the file is copied to an application isolation scope. In other embodiments the rules may specify a particular application isolation sub-scope or user isolation sub-scope to which the file should be copied. Any ancestors of the requested file that do not appear in the isolation scope are created as placeholders in the isolation scope in order to correctly locate the copied instance in the hierarchy. The scoped instance is identified as the literal file (step 442) and a request issued to open the literal file and the result returned to the requestor (step 420).

This embodiment can be trivially modified to perform a check for existence of a file rather than opening a file. The attempt to open the literal file in step 420 is replaced with a check for the existence of that literal file and that status returned to the requestor.

Still referring to FIG. 4 and now in more detail, a request to open a virtual file is received or intercepted (step 402). The corresponding literal file may be of user isolation scope, application isolation scope or system scope, or it may be scoped to an application isolation sub-scope or a user isolation sub-scope. In some embodiments, the request is hooked by a function that replaces the operating system function or functions for opening a file. In another embodiment a hooking dynamically-linked library is used to intercept the request. The hooking function may execute in user mode or in kernel mode. For embodiments in which the hooking function executes in user mode, the hooking function may be loaded into the address space of a process when that process is created. For embodiments in which the hooking function executes in kernel mode, the hooking function may be associated with an operating system resource that is used in dispatching requests for native files. For embodiments in which a separate operating system function is provided for each type of file operation, each function may be hooked separately. Alternatively, a single hooking function may be provided which intercepts create or open calls for several types of file operations.

The request contains a file name, which is treated as a virtual file name by the isolation environment. The processing rule applicable to the file system open request is determined (step 404) by consulting the rules engine. In some embodiments the processing rule applicable to the open request is determined using the virtual name included in the open request. In some embodiments, the rules engine may be provided as a relational database. In other embodiments, the rules engine may be a tree-structured database, a hash table, or a flat file database. In some embodiments, the virtual file name provided for the requested file is used as an index into the rule engine to locate one or more rules that apply to the request. In particular ones of these embodiments, multiple rules may exist in the rules engine for a particular file and, in these embodiments, the rule having the longest prefix match with the virtual file name is the rule applied to the request. In other embodiments, a process identifier is used to locate in the rule engine a rule that applies to the request, if one exists. The rule associated with a request may be to ignore the request, redirect the request, or isolate the request. Although shown in FIG. 4 as a single database transaction or single lookup into a file, the rule lookup may be performed as a series of rule lookups.

If the rule action is "redirect" (step 406), the virtual file name provided in the request is mapped to a literal file name according to the applicable rule (step 408). A request to open the literal file identified by the literal file name is passed to the operating system and the result from the operating system is returned to the requestor (step 410). For example, a request to open a file named "file_1" may result in the opening of a literal file named "Different_file_1". In one embodiment, this is accomplished by calling the original version of the hooked function and passing the formed literal name to the function as an argument. For embodiments using a file system filter driver, the first request to open the file using the virtual name results in the return of a STATUS_REPARSE response from the file system filter driver indicating the determined literal name. The I/O Manager then reissues the file open request with the determined literal name include in the STATUS_REPARSE response.

If instead the rule action is "ignore" (step 406), then the literal file name is determined to be exactly the virtual file name (step 412), and the request to open the literal file is passed to the operating system and the result from the operating system is returned to the requestor (step 410). For example, a request to open a file named "file_1" will result in the opening of an actual file named "file_1". In one embodiment, this is accomplished by calling the original version of the hooked function and passing the formed literal name to the function as an argument.

If in step 406 the rule action is "isolate", then the user-scoped file name corresponding to the virtual file name is identified as the candidate file name (step 414). In other words, the candidate file name is formed by mapping the virtual file name to the corresponding native file name specific to the applicable user isolation scope. For example, a request to open a file named "file_1" may result in the opening of an actual file named "Isolated_file_1". In one embodiment, this is accomplished by calling the original version of the hooked function and passing the formed literal name to the function as an argument. For embodiments using a file system filter driver, the first request to open the file using the virtual name results in the return of a STATUS_REPARSE response from the file system filter driver indicating the determined literal name. The I/O Manager then reissues the file open request with the determined literal name include in the REPARSE response.

In some embodiments, the literal name formed in order to isolate a requested system file may be based on the virtual file name received and a scope-specific identifier. The scope-specific identifier may be an identifier associated with an application isolation scope, a user isolation scope, a session isolation scope, an application isolation sub-scope, a user isolation sub-scope, or some combination of the above. The scope-specific identifier is used to "mangle" the virtual name received in the request.

In other embodiments, the user isolation scope or a sub-scope may be a directory under which all files that exist in the user isolation scope are stored. In some of these embodiments, the directory tree structure under the user isolation directory reflects the path of the requested resource. In other words, the literal file path is formed by mapping the virtual file path to the user isolation scope. For example, if the requested file is c:\temp\test.txt and the user isolation scope directory is d:\user1\app1\, then the path to the user-scoped literal file may be d:\user1\app1\c\temp\test.txt. In other embodiments, the path to the user-scoped literal may be defined in a native naming convention. For example, the path to the user-scoped literal file may be d:\user1\app1\device\harddisk1\temp\test.txt. In still other embodiments, the user-scoped files may all be stored in a single directory with names chosen to be unique and a database may be used to store the mapping between the requested file name and the name of the corresponding literal file stored in the directory. In still other embodiments, the contents of the literal files may be stored in a database. In still other embodiments, the native file system provides the facility for a single file to contain multiple independent named "streams", and the contents of the user-scoped files are stored as additional streams of the associated files in the system scope. Alternatively, the literal files may be stored in a custom file system that may be designed to optimize disk usage or other criteria of interest.

The category of existence of the candidate file is determined by examining the user isolation scope and any metadata associated with the candidate file (step 416). If the candidate file is determined to have "negative existence", because either the candidate file or one of its ancestor directories in the user isolation scope is marked as deleted, this means the requested virtual file is known to not exist. In this case, an error condition indicating the requested file is not found is returned to the requestor (step 422).

In some embodiments, small amounts of metadata about a file may be stored directly in the literal filename, such as by suffixing the virtual name with a metadata indicator, where a metadata indicator is a string uniquely associated with a particular metadata state. The metadata indicator may indicate or encode one or several bits of metadata. Requests to access the file by virtual filename check for possible variations of the literal filename due to the presence of a metadata indicator, and requests to retrieve the name of the file itself are hooked or intercepted in order to respond with the literal name. In other embodiments, one or more alternate names for the file may be formed from the virtual file name and a metadata indicator, and may be created using hard link or soft link facilities provided by the file system. The existence of these links may be hidden from applications by the isolation environment by indicating that the file is not found if a request is given to access a file using the name of a link. A particular link's presence or absence may indicate one bit of metadata for each metadata indicator, or there may be a link with a metadata indicator that can take on multiple states to indicate several bits of metadata. In still other embodiments, where the file system supports alternate file streams, an alternate file stream may be created to embody metadata, with the size of the stream indicating several bits of metadata. In still other embodiments, a file system may directly provide the ability to store some 3rd party metadata for each file in the file system.

In specific ones of these embodiments, a list of deleted files or file system elements may be maintained and consulted to optimize this check for deleted files. In these embodiments, if a deleted file is recreated then the file name may be removed from the list of deleted files. In others of these embodiments, a file name may be removed from the list if the list grows beyond a certain size.

If instead in step 416 the candidate file is determined to have "positive existence", because the candidate file exists in the user isolation scope and is not marked as a placeholder node, then the requested virtual file is known to exist. The candidate file is identified as the literal file for the request (step 418), and a request issued to open the literal file and the result returned to the requestor (step 420).

If, however, in step 416, the candidate file has "neutral existence" because the candidate file does not exist, or the candidate file exists but is marked as a placeholder node, it is not yet known whether the virtual file exists or not. In this case the application-scoped file name corresponding to the virtual file name is identified as the candidate file name (step 424). In other words, the candidate file name is formed by mapping the virtual file name to the corresponding native file name specific to the applicable application isolation scope. The category of existence of the candidate file is determined by examining the application isolation scope and any metadata associated with the candidate file (step 426).

If the application-scoped candidate file is determined to have "negative existence", because either the candidate file or one of its ancestor directories in the application isolation scope is marked as deleted, this means the requested virtual file is known to not exist. In this case, an error condition indicating the requested file is not found is returned to the requestor (step 422).

If in step 426 the candidate file is determined to have "positive existence", because the candidate file exists in the application isolation scope and is not marked as a placeholder node, then the requested virtual file is known to exist. The request is checked to determine if the open request indicates an intention to modify the file (step 428). If not, the candidate file is identified as the literal file for the request (step 418), and a request issued to open the literal file and the result returned to the requestor (step 420).

If, however, in step 428, it is determined that the open request indicates intention to modify the file, permission data associated with the file is checked to determine if modification of the file is allowed (step 436). In some embodiments, the permission data is associated with the application-scoped candidate file. In some of these embodiments, the permissions data is stored in a rules engine or in metadata associated with the candidate file. In other embodiments, the permission data associated with the candidate file is provided by the operating system. Further, the rules engine may include configuration settings instructing the isolation environment to obey or override the native permission data for virtualized copies of resources. In some embodiments, the rules may specify for some virtual resources the scope in which modifications are to occur, for example the system scope or the application isolation scope or a sub-scope, or the user isolation scope or a sub-scope. In some embodiments, the rules engine may specify configuration settings that apply to subsets of the virtualized native resources based on hierarchy or on type of resource accessed. In some of these embodiments, the configuration settings may be specific to each atomic native resource. In another example, the rules engine may include configuration data that prohibits or allows modification of certain classes of files, such as executable code or MIME types or file types as defined by the operating system.

If the permission data associated with the candidate file indicates that it may not be modified, an error condition is returned to the requestor (step 438) indicating that modification of the file is not allowed. If the permission data indicates that the file may be modified, the candidate file is copied to the user isolation scope (step 440). In some embodiments, the candidate file is copied to a location defined by the rules engine. For example, a rule may specify that the file is copied to another application isolation scope. In other embodiments the rules may specify a particular application isolation sub-scope or user isolation sub-scope to which the file should be copied. Any ancestors of the requested file that do not appear in the isolation scope to which the file is copied are created as placeholders in the isolation scope in order to correctly locate the copied instance in the hierarchy.

In some embodiments, metadata is associated with files copied to the isolation scope that identifies the date and time at which the files were copied. This information may be used to compare the time stamp associated with the copied instance of the file to the time stamp of the last modification of the original instance of the file or of another instance of the file located in a lower isolation scope. In these embodiments, if the original instance of the file, or an instance of the file located in a lower isolation scope, is associated with a time stamp that is later than the time stamp of the copied file, that file may be copied to the isolation scope to update the candidate file. In other embodiments, the copy of the file in the isolation scope may be associated with metadata identifying the scope containing the original file that was copied.

In further embodiments, files that are copied to isolation scopes because they have been opened with intent to modify them may be monitored to determine if they are, in fact, modified. In one embodiment a copied file may be associated with a flag that is set when the file is actually modified. In these embodiments, if a copied file is not actually modified, it may be removed from the scope to which it was copied after it is closed, as well as any placeholder nodes associated with the copied file.

The scoped instance is identified as the literal file (step 442) and a request issued to open the literal file and the result returned to the requestor (step 420).

Returning to step 426, if the candidate file has neutral existence because the candidate file does not exist, or if the candidate file is found but marked as a placeholder node, it is not yet known whether the virtual file exists or not. In this case, the system-scoped file name corresponding to the virtual file name is identified as the candidate file name (step 430). In other words, the candidate file name is exactly the virtual file name.

If the candidate file does not exist (step 432), an error condition indicating the virtual file was not found is returned to the requestor (step 434). If on the other hand the candidate file exists (step 432), the request is checked to determine if the open request indicates an intention to modify the file (step 428).

As above, if the candidate file is being opened without the intent to modify it, the system-scoped candidate file is identified as the literal file for the request (step 418), and a request issued to open the literal file and the result returned to the requestor (step 420). If, however, in step 428, it is determined that the open request indicates intention to modify the file, permission data associated with the file is checked to determine if modification of the file is allowed (step 436). In some embodiments, the permission data is associated with the system-scoped candidate file. In some of these embodiments, the permissions data is stored in a rules engine or in metadata associated with the candidate file. In other embodiments, the permission data associated with the candidate file is provided by the operating system.

If the permission data associated with the system-scoped candidate file indicates that the file may not be modified, an error condition is returned to the requestor (step 438) indicating that modification of the file is not allowed. If, however, the permission data indicates that the file may be modified, the candidate file is copied to the user isolation scope (step 440). In some embodiments, the candidate file is copied to a location defined by the rules engine. For example, a rule may specify that the file is copied to an application isolation scope or that it may be left in the system scope. In other embodiments the rules may specify a particular application isolation sub-scope or user isolation sub-scope to which the file should be copied. Any ancestors of the requested file that do not appear in the isolation scope are created as placeholders in the isolation scope in order to correctly locate the copied instance in the hierarchy.

In some embodiments, metadata is associated with files copied to the isolation scope that identifies the date and time at which the files were copied. This information may be used to compare the time stamp associated with the copied instance of the file to the time stamp of the last modification of the original instance of the file. In these embodiments, if the original instance of the file is associated with a time stamp that is later than the time stamp of the copied file, the original file may be copied to the isolation scope to update the candidate file. In other embodiments, the candidate file copied to the isolation scope may be associated with metadata identifying the scope from which the original file was copied.

In further embodiments, files that are copied to isolation scopes because they have been opened with intent to modify them may be monitored to determine if they are, in fact, modified. In one embodiment a copied file may be associated with a flag that is set when the file is actually modified. In these embodiments, if a copied file is not actually modified, when it is closed it may be removed from the scope to which it was copied, as well as any placeholder nodes associated with the copied file. In still further embodiments, the file is only copied to the appropriate isolation scope when the file is actually modified.

The scoped instance is identified as the literal file (step 442) and a request issued to open the literal file and the result returned to the requestor (step 420).

4.1.2 File System Delete Operations

Figure 5:
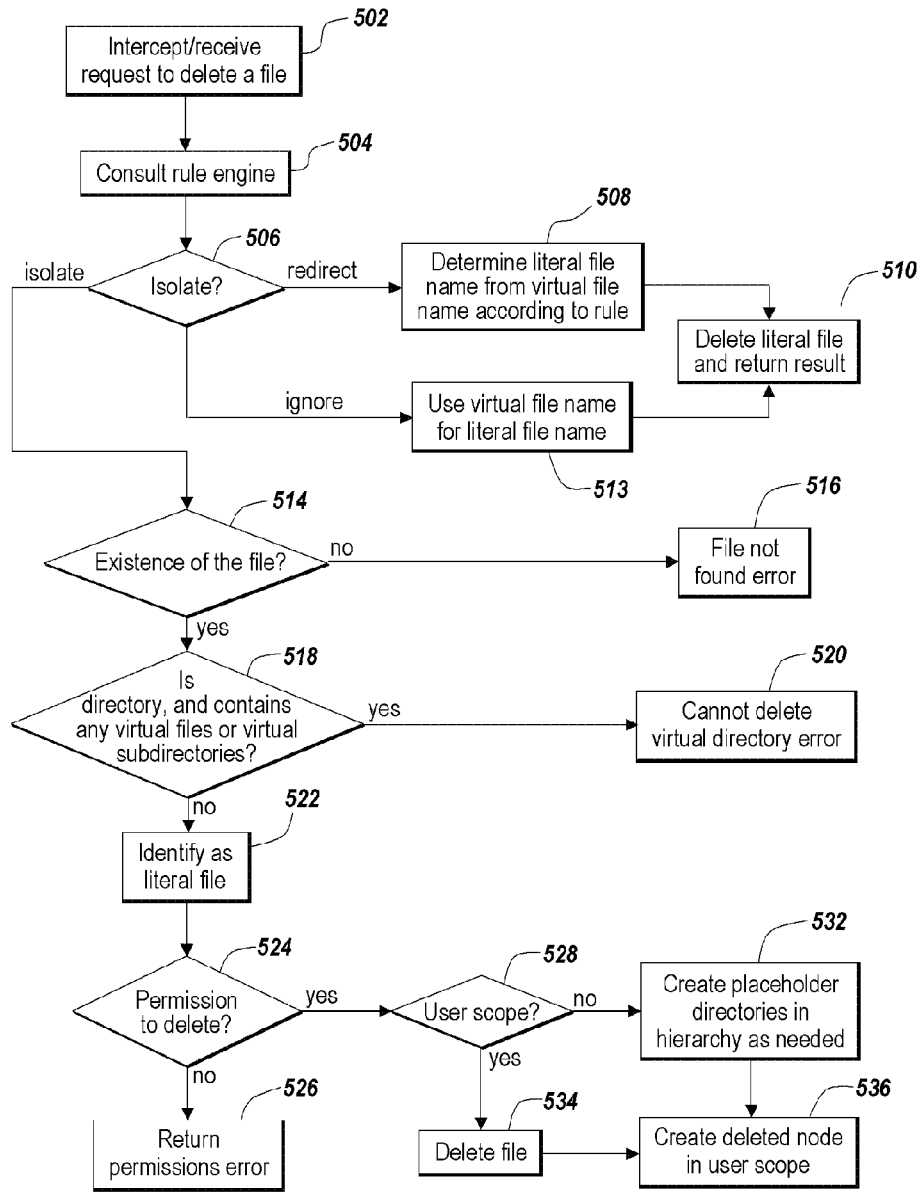
FIG. 5 is a flowchart depicting one embodiment of the steps taken to delete an entry from a file system in the described virtualized environment.

Referring now to FIG. 5, and in brief overview, one embodiment of the steps taken to delete a file is depicted. A request to delete a file is received or intercepted (step 502). The request contains a file name, which is treated as a virtual file name by the isolation environment. A rule determines how the file operation is processed (step 504). If the rule action is "redirect" (step 506), the virtual file name is mapped directly to a literal file name according to the rule (step 508). A request to delete the literal file is passed to the operating system and the result from the operating system is returned to the requestor (step 510). If the rule action is "ignore" (step 506), then the literal file name is identified as exactly the virtual file name (step 513), and a request to delete the literal file is passed to the operating system and the result from the operating system is returned to the requestor (step 510). If the rule action is "isolate" (step 506), then the existence of the virtual file is determined (step 514). If the virtual file does not exist, an error condition is returned to the requestor indicating that the virtual file does not exist (step 516). If the virtual file exists, and if the virtualized file specifies a directory rather than an ordinary file, the virtual directory is consulted to determine if it contains any virtual files or virtual subdirectories (step 518). If the requested virtualized file is a virtual directory that contains any virtual files or virtual subdirectories, the virtual directory cannot be deleted and an error message is returned (step 520). If the requested virtualized file is an ordinary file or is a virtual directory that contains no virtual files and no virtual subdirectories, then the literal file corresponding to the virtual file is identified (step 522). Permission data associated with the file is checked to determine if deletion is allowed (step 524). If not, a permission error message is returned (step 526). If, however, deletion of the file is allowed, and if the literal file is in the appropriate user isolation scope (step 528), the literal file is deleted (step 534) and a "deleted" node representing the deleted virtual file is created in the appropriate user isolation scope (step 536). If, however, in step 528 it is determined that the literal file is not in the user isolation scope but is in the appropriate application isolation scope or the system scope, then an instance of every user-scoped ancestor of the user-scoped instance of the requested file that does not already exist is created and marked as a placeholder (step 532). This is done to maintain the logical hierarchy of the directory structure in the user isolation scope. A user-scoped "deleted" node representing the deleted virtual file is then created in the appropriate user isolation scope (step 536).

Still referring to FIG. 5, and in more detail, a request to delete a file is received or intercepted (step 502). The file may be of user isolation scope, application isolation scope, system scope, or some applicable isolation sub-scope. In some embodiments, the request is hooked by a function that replaces the operating system function or functions for deleting the file. In another embodiment a hooking dynamically-linked library is used to intercept the request. The hooking function may execute in user mode or in kernel mode. For embodiments in which the hooking function executes in user mode, the hooking function may be loaded into the address space of a process when that process is created. For embodiments in which the hooking function executes in kernel mode, the hooking function may be associated with an operating system resource that is used in dispatching requests for native files. For embodiments in which a separate operating system function is provided for each type of file, each function may be hooked separately. Alternatively, a single hooking function may be provided which intercepts create or open calls for several types of files.

The request contains a file name, which is treated as a virtual file name by the isolation environment. A processing rule applicable to the delete operation is determined (step 504) by consulting the rules engine. In some embodiments, the virtual file name provided for the requested file is used to locate in the rule engine a rule that applies to the request. In particular ones of these embodiments, multiple rules may exist in the rules engine for a particular file and, in these embodiments, the rule having the longest prefix match with the virtual file name is the rule applied to the request. In some embodiments, the rules engine may be provided as a relational database. In other embodiments, the rules engine may be a tree-structured database, a hash table, or a flat file database. In some embodiments, the virtual file name provided in the request is used as an index into a rules engine to locate one or more rules that apply to the request. In other embodiments, a process identifier is used to locate in the rule engine a rule that applies to the request, if one exists. The rule associated with a request may be to ignore the request, redirect the request, or isolate the request. Although shown in FIG. 5 as a series of decisions, the rule lookup may occur as a single database transaction.

If the rule action is "redirect" (step 506), the virtual file name is mapped directly to a literal file name according to the applicable rule (step 508). A request to delete the literal file is passed to the operating system and the result from the operating system is returned to the requestor (step 510). For example, a request to delete a file named "file_1" may result in the deletion of an actual file named "Different_file_1". In one embodiment, this is accomplished by calling the original version of the hooked function and passing the formed literal name to the function as an argument. For embodiments using a file system filter driver, the first request to delete the file using the virtual name results in the return of a STATUS_REPARSE response from the file system filter driver indicating the determined literal name. The I/O Manager then reissues the file delete request with the determined literal name include in the STATUS_REPARSE response.

In some embodiments, operating system permissions associated with the literal file "Different_file_1" may prevent deletion of the literal file. In these embodiments, an error message is returned that the file could not be deleted.

If the rule action is "ignore" (step 506), then the literal file name is identified as exactly the virtual file name (step 513), and a request to delete the literal file is passed to the operating system and the result from the operating system is returned to the requestor (step 510). For example, a request to delete a file named "file_1" will result in the deletion of an actual file named "file_1". In one embodiment, this is accomplished by calling the original version of the hooked function and passing the formed literal name to the function as an argument. For embodiments using a file system filter driver, the first request to delete the file using the virtual name results in the return of a STATUS_REPARSE response from the file system filter driver indicating the literal name. The I/O Manager then reissues the file delete request with the determined literal name include in the STATUS_REPARSE response.

In some embodiments, operating system permissions associated with the literal file "file_1" may prevent deletion of the literal file. In these embodiments, an error message is returned that the file could not be deleted.

If the rule action is "isolate" (step 506), then the existence of the virtual file is determined (step 514). If the file does not exist, an error is returned indicating that the file is not found (step 516).

If, however, in step 518 it is determined that the file exists but that it is not an ordinary file and is not an empty virtual directory, i.e., it contains virtual files or virtual subdirectories, an error message is returned indicating that the file may not be deleted (step 520).

If, however, the file is determined to exist and the requested virtualized file is an ordinary file or is an empty virtual directory, i.e., it contains no virtual files and no virtual subdirectories (step 518), then the literal file corresponding to the virtual file is identified (step 522). The literal file name is determined from the virtual file name as specified by the isolation rule. For example, a request to delete a file named "file_1" may result in the deletion of an actual file named "Isolated_file_1". In one embodiment, this is accomplished by calling the original version of the hooked function and passing the formed literal name to the function as an argument. For embodiments using a file system filter driver, the first request to delete the file using the virtual name results in the return of a STATUS_REPARSE response from the file system filter driver indicating the literal name. The I/O Manager then reissues the file delete request with the determined literal name include in the STATUS_REPARSE response.

Once the literal file corresponding the virtual file is identified, it is determined whether the literal file may be deleted (step 524). If the file may not be deleted, an error is returned indicating that the file could not be deleted (step 524). In some embodiments, the permission data is associated with the system-scoped candidate file. In some of these embodiments, the permissions data is stored in a rules engine or in metadata associated with the candidate file. In other embodiments, the permission data associated with the candidate file is provided by the operating system.

If, however, deletion of the file is allowed, and if the literal file is in the appropriate user isolation scope (step 528), the literal file is deleted (step 534) and a "deleted" node representing the deleted virtual file is created in the appropriate user isolation scope (step 536).

If, however, in step 528 it is determined that the literal file is not in the user isolation scope but is in the appropriate application isolation scope or the system scope, then an instance of every user-scoped ancestor of the user-scoped instance of the requested file that does not already exist is created and marked as a placeholder (step 532). This is done to maintain the logical hierarchy of the directory structure in the user isolation scope. A user-scoped "deleted" node representing the deleted virtual file is then created in the appropriate user isolation scope (step 536). In some embodiments, the identity of the deleted file is stored in a file or other cache memory to optimize checks for deleted files.

In some embodiments, the located virtualized file may be associated with metadata indicating that the virtualized file has already been deleted. In some other embodiments, an ancestor of the virtualized file (e.g., a higher directory containing the file) is associated with metadata indicating that it is deleted. In these embodiments, an error message may be returned indicating that the virtualized file does not exist. In specific ones of these embodiments, a list of deleted files or file system elements may be maintained and consulted to optimize this check for deleted files.

4.1.3 File System Enumeration Operations

Figure 6:
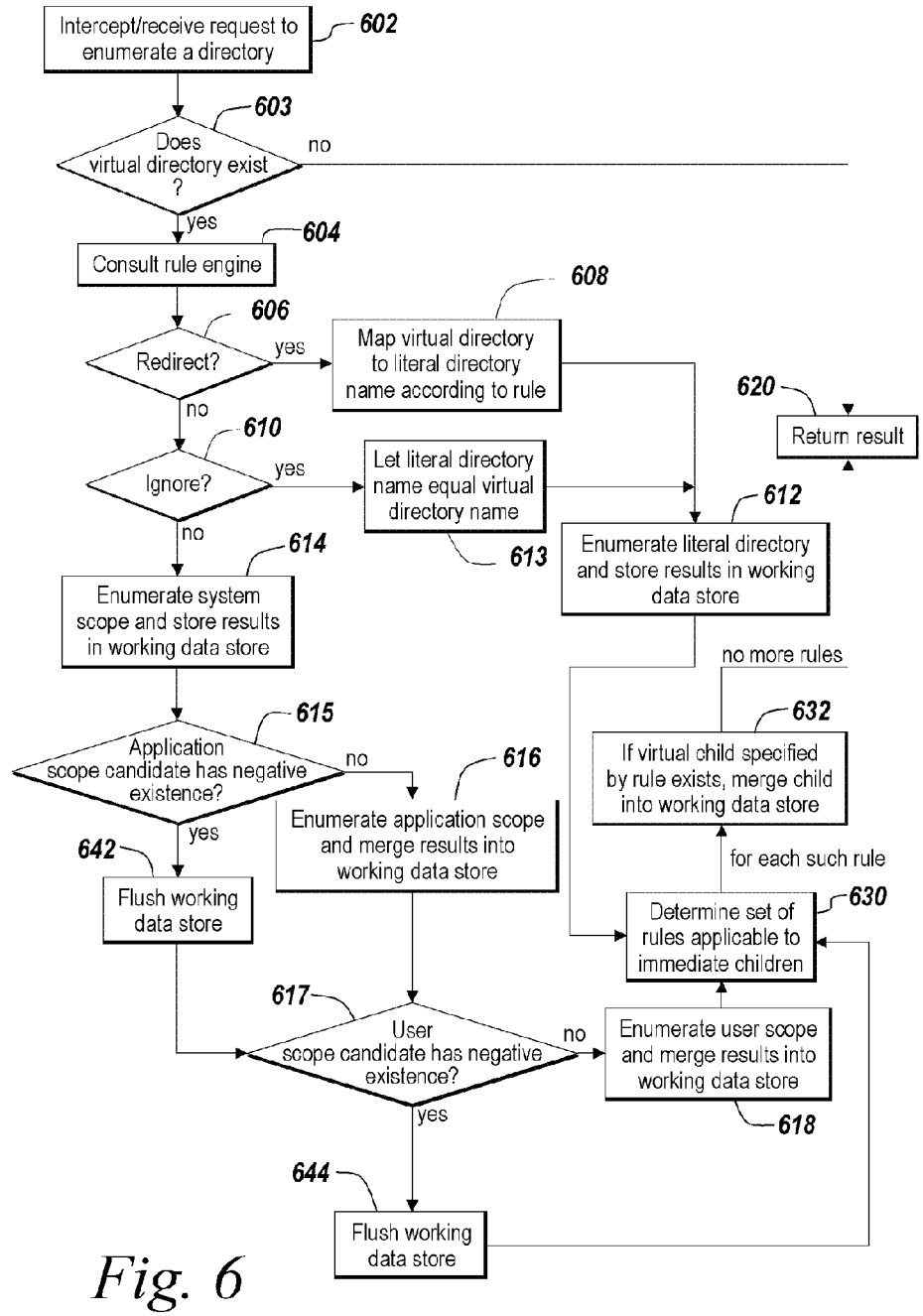
FIG. 6 is a flowchart depicting one embodiment of the steps taken to enumerate entries in a file system in the described virtualized environment.

Referring now to FIG. 6, and in brief overview, one embodiment of the steps taken to enumerate a directory in the described virtualized environment is shown. A request to enumerate is received or intercepted (step 602). The request contains a directory name that is treated as a virtual directory name by the isolation environment. Conceptually, the virtual directory's existence is determined as described in section 4.1.1 (step 603). If the virtual directory does not exist, a result indicating that the virtual directory is not found is returned to the requestor (step 620). If instead the virtual directory exists, the rules engine is consulted to determine the rule for the directory specified in the enumerate request (step 604). If the rule specifies an action of "redirect" (step 606), the literal directory name corresponding to the virtual directory name is determined as specified by the rule (step 608) and the literal directory identified by the literal name is enumerated, and the enumeration results stored in a working data store (step 612), followed by step 630 as described later. If the rule action specified is not "redirect" and is "ignore," (step 610) the literal directory name is exactly the virtual directory name (step 613) and the literal directory is enumerated, and the enumeration results stored in a working data store (step 612), followed by step 630 as described later. If, however, the rule action specifies "isolate," firstly the system scope is enumerated; that is, the candidate directory name is exactly the virtual directory name, and if the candidate directory exists it is enumerated. The enumeration results are stored in a working data store. If the candidate directory does not exist, the working data store remains empty at this stage (step 614). Next, the candidate directory is identified as the application-scoped instance of the virtual directory, and the category of existence of the candidate directory is determined (step 615). If the candidate directory has "negative existence", i.e. it or one of its ancestors in the scope is marked as deleted, then within this scope it is known to be deleted, and this is indicated by flushing the working data store (step 642). If instead the candidate directory does not have negative existence, the candidate directory is enumerated and any enumeration results obtained are merged into the working data store. In particular, for each file system element in the enumeration, its category of existence is determined. Elements with negative existence are removed from the working data store, and elements with positive existence, i.e. those that exist and are not marked as placeholders and are not marked as deleted, are added to the working data store, replacing the corresponding element if one is already present in the working data store (step 616).

In either case, the candidate directory is identified as the user-scoped instance of the virtual directory, and the category of existence of the candidate directory is determined (step 617). If the candidate directory has "negative existence", i.e. it or one of its ancestors in the scope is marked as deleted, then within this scope it is known to be deleted, and this is indicated by flushing the working data store (step 644). If instead the candidate directory does not have negative existence, the candidate directory is enumerated and any enumeration results obtained are merged into the working data store. In particular, for each file system element in the enumeration, its category of existence is determined. Elements with negative existence are removed from the working data store, and elements with positive existence, i.e. those that exist and are not marked as placeholders and are not marked as deleted, are added to the working data store, replacing the corresponding element if one is already present in the working data store (step 618), followed by step 630 as described below.

Then, for all three types of rules, step 630 is executed. The rules engine is queried to find the set of rules whose filters match immediate children of the requested directory, but do not match the requested directory itself (step 630). For each rule in the set, the existence of the virtual child whose name matches the name in the rule is queried using the logic outlined in section 4.1.1. If the child has positive existence, it is added to the working data store, replacing any child of the same name already there. If the child has negative existence, the entry in the working data store corresponding to the child, if any, is removed. (Step 632). Finally, the constructed enumeration is then returned from the working data store to the requestor (step 620).

Still referring to FIG. 6, and in more detail, a request to enumerate a directory is received or intercepted (step 602). In some embodiments, the request is hooked by a function that replaces the operating system function or functions for enumerating a directory. In another embodiment, a hooking dynamically-linked library is used to intercept the request. The hooking function may execute in user mode or in kernel mode. For embodiments in which the hooking function executes in user mode, the hooking function may be loaded into the address space of a process when that process is created. For embodiments in which the hooking function executes in kernel mode, the hooking function may be associated with an operating system resource that is used in dispatching requests for file operations. For embodiments in which a separate operating system function is provided for each type of file operation, each function may be hooked separately. Alternatively, a single hooking function may be provided which intercepts create or open calls for several types of file operations.

The existence of the virtual directory is determined (step 603). This is achieved as described in section 4.1.1. If the virtual directory does not exist, it cannot be enumerated, and a result indicating that the virtual directory does not exist is returned to the requestor (step 620).

The request contains a directory name, which is treated as a virtual directory name by the isolation environment. If the virtual directory exists, then a rule determining how the enumeration operation is to be processed is located (step 604) by consulting the rules engine. In some embodiments, the rules engine may be provided as a relational database. In other embodiments, the rules engine may be a tree-structured database, a hash table, or a flat file database. In some embodiments, the virtual directory name provided for the requested directory is used to locate in the rule engine a rule that applies to the request. In particular ones of these embodiments, multiple rules may exist in the rules engine for a particular directory and, in these embodiments, the rule having the longest prefix match with the virtual directory name is the rule applied to the request. In other embodiments, a process identifier is used to locate in the rule engine a rule that applies to the request, if one exists. The rule associated with a request may be to ignore the request, redirect the request, or isolate the request. Although shown in FIG. 6 as a single database transaction or single lookup into a file, the rule lookup may be performed as a series of rule lookups.

If the rule action is "redirect" (step 606), the virtual directory name is mapped directly to a literal directory name according to the rule (step 608). A request to enumerate the literal directory is passed to the operating system (step 612) and step 630 is executed as described later. For example, a request to enumerate a directory named "directory_1" may result in the enumeration of a literal directory named "Different_directory_1". In one embodiment, this is accomplished by calling the original version of the hooked function and passing the formed literal name to the function as an argument. For embodiments using a file system filter driver, the first request to open the directory for enumeration using the virtual name results in a "STATUS_REPARSE" request response indicating the determined literal name. The I/O Manager then reissues the directory open request for enumeration with the determined literal name include in the STATUS_REPARSE response.

If the rule action is not "redirect" (step 606), but is "ignore" (step 610), then the literal directory name is identified as exactly the virtual directory name (step 613), and a request to enumerate the literal directory is passed to the operating system (step 612) and step 630 is executed as described later. For example, a request to enumerate a directory named "directory_1" will result in the enumeration of an actual directory named "directory_1." In one embodiment, this is accomplished by calling the original version of the hooked function and passing the formed literal name to the function as an argument. For embodiments using a file system filter driver, the first request to enumerate the directory using the virtual name is passed on unmodified by the filter driver.

If the rule action determined in step 610 is not "ignore" but is "isolate", then the system scope is enumerated, that is, the virtual name provided in the request is used to identify the enumerated directory (step 614). The results of the enumeration are stored in a working data store. In some embodiments, the working data store is comprised of a memory element. In other embodiments, the working data store comprises a database or a file or a solid-state memory element or a persistent data store.

Next, the candidate directory is identified as the application-scoped instance of the virtual directory, and the category of existence of the candidate directory is determined (step 615). If the candidate directory has "negative existence", i.e. it or one of its ancestors in the scope is marked as deleted, then within this scope it is known to be deleted, and this is indicated by flushing the working data store (step 642).

In some embodiments, small amounts of metadata about a file may be stored directly in the literal filename, such as by suffixing the virtual name with a metadata indicator, where a metadata indicator is a string uniquely associated with a particular metadata state. The metadata indicator may indicate or encode one or several bits of metadata. Requests to access the file by virtual filename check for possible variations of the literal filename due to the presence of a metadata indicator, and requests to retrieve the name of the file itself are hooked or intercepted in order to respond with the literal name. In other embodiments, one or more alternate names for the file may be formed from the virtual file name and a metadata indicator, and may be created using hard link or soft link facilities provided by the file system. The existence of these links may be hidden from applications by the isolation environment by indicating that the file is not found if a request is given to access a file using the name of a link. A particular link's presence or absence may indicate one bit of metadata for each metadata indicator, or there may be a link with a metadata indicator that can take on multiple states to indicate several bits of metadata. In still other embodiments, where the file system supports alternate file streams, an alternate file stream may be created to embody metadata, with the size of the stream indicating several bits of metadata. In still other embodiments, a file system may directly provide the ability to store some 3rd party metadata for each file in the file system. In yet other embodiment, a separate sub-scope may be used to record deleted files, and existence of a file (not marked as a placeholder) in that sub-scope is taken to mean that the file is deleted.

If instead the candidate directory does not have negative existence, the candidate directory is enumerated and any enumeration results obtained are merged into the working data store. In particular, for each file system element in the enumeration, its category of existence is determined. Elements with negative existence are removed from the working data store, and elements with positive existence, i.e. those that exist and are not marked as placeholders and are not marked as deleted, are added to the working data store, replacing the corresponding element if one is already present in the working data store (step 616).

In either case, the candidate directory is identified as the user-scoped instance of the virtual directory, and the category of existence of the candidate directory is determined (step 617). If the candidate directory has "negative existence", i.e. it or one of its ancestors in the scope is marked as deleted, then within this scope it is known to be deleted, and this is indicated by flushing the working data store (step 644). If instead the candidate directory does not have negative existence, the candidate directory is enumerated and any enumeration results obtained are merged into the working data store. In particular, for each file system element in the enumeration, its category of existence is determined. Elements with negative existence are removed from the working data store, and elements with positive existence, i.e. those that exist and are not marked as placeholders and are not marked as deleted, are added to the working data store, replacing the corresponding element if one is already present in the working data store (step 618), followed by step 630 as described below.

Then, for all three types of rules, step 630 is executed. The rules engine is queried to find the set of rules whose filters match immediate children of the requested directory, but do not match the requested directory itself (step 630). For each rule in the set, the existence of the virtual child whose name matches the name in the rule is queried using the logic outlined in section 4.1.1. If the child has positive existence, it is added to the working data store, replacing any child of the same name already there. If the child has negative existence, the entry in the working data store corresponding to the child, if any, is removed. (Step 632). Finally, the constructed enumeration is then returned from the working data store to the requestor (step 620).

A practitioner of ordinary skill in the art will realize that the layered enumeration process described above can be applied with minor modification to the operation of enumerating a single isolation scope which comprises a plurality of isolation sub-scopes. A working data store is created, successive sub-scopes are enumerated and the results are merged into the working data store to form the aggregated enumeration of the isolation scope.

4.1.4. File System Creation Operations

Figure 7:
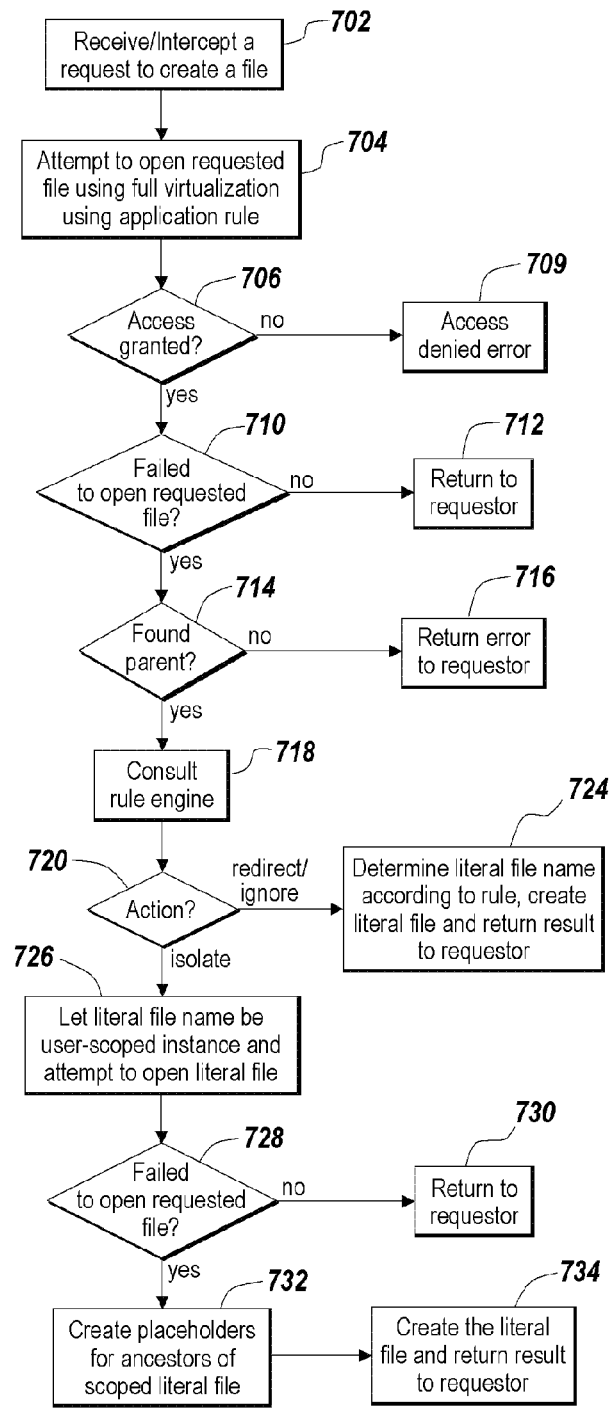
FIG. 7 is a flowchart depicting one embodiment of the steps taken to create an entry in a file system in the described virtualized environment.

Referring now to FIG. 7, and in brief overview, one embodiment of the steps taken to create a file in the isolation environment is shown. A request to create a file is received or intercepted (step 702). The request contains a file name, which is treated as a virtual file name by the isolation environment. An attempt is made to open the requested file using full virtualization using applicable rules, i.e. using appropriate user and application isolation scope, as described in section 4.1.1 (step 704). If access is denied (step 706), an access denied error is returned to the requestor (step 709). If access is granted (step 706), and the requested file is successfully opened (step 710), the requested file is returned to the requestor (step 712). However, if access is granted (step 706), but the requested file is not opened successfully (step 710) then if the parent of the requested file also does not exist (step 714), an error appropriate to the request semantics is issued to the requestor (step 716). If on the other hand, the parent of the requested file is found in full virtualized view using the appropriate user and application scope (step 714), a rule then determines how the file operation is processed (step 718). If the rule action is "redirect" or "ignore" (step 720), the virtual file name is mapped directly to a literal file name according to the rule. Specifically, if the rule action is "ignore", the literal file name is identified as exactly the virtual file name. If, instead, the rule action is "redirect", the literal file name is determined from the virtual file name as specified by the rule. Then a request to create the literal file is passed to the operating system, and the result is returned to the requestor (step 724). If on the other hand, the rule action determined in step 720 is "isolate", then the literal file name is identified as the instance of the virtual file name in the user isolation scope. If the literal file already exists, but is associated with metadata indicating that it is a placeholder or that it is deleted, then the associated metadata is modified to remove those indications, and it is ensured that the file is empty. In either case, a request to open the literal file is passed to the operating system (step 726). If the literal file was opened successfully (step 728), the literal file is returned to the requestor (step 730). If on the other hand, in step 728, the requested file fails to open, placeholders for each ancestor of the literal file that does not currently exist in the user-isolation scope (step 732) and a request to create the literal file using the literal name is passed to the operating system and the result is returned to the requestor (step 734).

Still referring to FIG. 7, and in more detail, a request to create a file is received or intercepted (step 702). In some embodiments, the request is hooked by a function that replaces the operating system function or functions for creating the file. In another embodiment, a hooking dynamically-linked library is used to intercept the request. The hooking function may execute in user mode or in kernel mode. For embodiments in which the hooking function executes in user mode, the hooking function may be loaded into the address space of a process when that process is created. For embodiments in which the hooking function executes in kernel mode, the hooking function may be associated with an operating system resource that is used in dispatching requests for files. For embodiments in which a separate operating system function is provided for each type of file operation, each function may be hooked separately. Alternatively, a single hooking function may be provided which intercepts create or open calls for several types of file operations.

The request contains a file name, which is treated as a virtual file name by the isolation environment. The requestor attempts to open the requested file using full virtualization using applicable rules, i.e. using appropriate user and application isolation scope, as described in section 4.1.1 (step 704). If access is denied during the full virtualized open operation (step 706), an access denied error is returned to the requestor (step 709). If access is granted (step 706), and the requested virtual file is successfully opened (step 710), the corresponding literal file is returned to the requestor (step 712). However, if access is granted (step 706), but the requested file is not opened successfully (step 710) then the virtual file has been determined not to exist. If the virtual parent of the requested virtual file also does not exist, as determined by the procedures in section 4.1.1 (step 714), an error appropriate to the request semantics is issued to the requestor (step 716). If on the other hand, the virtual parent of the requested virtual file is found in full virtualized view using the appropriate user and application scope (step 714), then a rule that determines how the create operation is processed is located (step 718) by consulting the rules engine. In some embodiments, the rules engine may be provided as a relational database. In other embodiments, the rules engine may be a tree-structured database, a hash table, or a flat file database. In some embodiments, the virtual file name provided for the requested file is used to locate in the rule engine a rule that applies to the request. In particular ones of these embodiments, multiple rules may exist in the rules engine for a particular file and, in some of these embodiments, the rule having the longest prefix match with the virtual file name is the rule applied to the request. In some embodiments, a process identifier is used to locate in the rule engine a rule that applies to the request, if one exists. The rule associated with a request may be to ignore the request, redirect the request, or isolate the request. Although shown in FIG. 7 as a single database transaction or single lookup into a file, the rule lookup may be performed as a series of rule lookups.

If the rule action is "redirect" or "ignore" (step 720), the virtual file name is mapped directly to a literal file name according to the rule (step 724). If the rule action is "redirect" (step 720), the literal file name is determined from the virtual file name as specified by the rule (step 724). If the rule action is "ignore" (step 720), the literal file name is determined to be exactly the virtual file name (step 724). If the rule action is "ignore" or the rule action is "redirect", a request to create the literal file using the determined literal file name is passed to the operating system and the result from the operating system is returned to the requestor (step 724). For example, a request to create a virtual file named "file_1" may result in the creation of a literal file named "Different _file_1." In one embodiment, this is accomplished by calling the original version of the hooked function and passing the formed literal name to the function as an argument. (step 724). For embodiments using a file system filter driver, the first request to open the file using the virtual name results in a "STATUS_ REPARSE" request response that indicates the determined literal name. The I/O Manager then reissues the file open request with the determined literal name include in the STATUS_ REPARSE response.

If the rule action determined in step 720 is not "ignore" or "redirect" but is "isolate," then the literal file name is identified as the instance of the virtual file name in the user isolation scope. If the literal file already exists, but is associated with metadata indicating that it is a placeholder or that it is deleted, then the associated metadata is modified to remove those indications, and it is ensured that the file is empty.

In some embodiments, small amounts of metadata about a file may be stored directly in the literal filename, such as by suffixing the virtual name with a metadata indicator, where a metadata indicator is a string uniquely associated with a particular metadata state. The metadata indicator may indicate or encode one or several bits of metadata. Requests to access the file by virtual filename check for possible variations of the literal filename due to the presence of a metadata indicator, and requests to retrieve the name of the file itself are hooked or intercepted in order to respond with the literal name. In other embodiments, one or more alternate names for the file may be formed from the virtual file name and a metadata indicator, and may be created using hard link or soft link facilities provided by the file system. The existence of these links may be hidden from applications by the isolation environment by indicating that the file is not found if a request is given to access a file using the name of a link. A particular link's presence or absence may indicate one bit of metadata for each metadata indicator, or there may be a link with a metadata indicator that can take on multiple states to indicate several bits of metadata. In still other embodiments, where the file system supports alternate file streams, an alternate file stream may be created to embody metadata, with the size of the stream indicating several bits of metadata. In still other embodiments, a file system may directly provide the ability to store some 3rd party metadata for each file in the file system.

In specific ones of these embodiments, a list of deleted files or file system elements may be maintained and consulted to optimize this check for deleted files. In these embodiments, if a deleted file is recreated then the file name may be removed from the list of deleted files. In others of these embodiments, a file name may be removed from the list if the list grows beyond a certain size.

In either case, a request to open the user-scoped literal file is passed to the operating system (step 726). In some embodiments, rules may specify that the literal file corresponding to the virtual file should be created in a scope other than the user isolation scope, such as the application isolation scope, the system scope, a user isolation sub-scope or an application isolation sub-scope.

If the literal file was opened successfully (step 728), the literal file is returned to the requestor (step 730). If on the other hand, in step 728, the requested file fails to open, placeholders are created for each ancestor of the literal file that does not currently exist in the user-isolation scope (step 732) and a request to create the literal file using the literal name is passed to the operating system and the result is returned to the requestor (step 734).

This embodiment is for operating systems with APIs or facilities that only support creation of one level per call/invocation. Extension to multi-levels per call/invocation should be obvious to one skilled in the art.

4.1.5 Short Filename Management

In some file systems, both short and long filenames may be given to each file. Either name may be used to access the file in any of the file operations described above. For each file that possesses both a short and long filename, this implicitly creates an association between the short and long filename assigned to that file. In some of these file systems, short names are automatically assigned by the file system to files that are created using long file names. If the association between short and long filename is not maintained by the isolation environment, files with different long names in the same directory but in different scope levels may have the same short file name, leading to ambiguity if the short name is used to access a virtual file. Alternately, the short file name may change when a file is copied to a user isolation scope for modification meaning the virtual file can no longer be accessed using the original short name.

In order to prevent these issues, firstly file system operations that copy file instances opened with intention to modify to a "higher" scope preserve the association between the short and long filenames associated with the copied instance. Secondly, unique short names are created for newly-created isolated files in lieu of the filenames assigned by the operating system. The generated short filenames should satisfy the condition that the generated filenames do not match any existing short filenames in the same directory in the same isolation scope or in the same directory in a "lower" isolation scope. For example, a short filename generated for an instance of a file located in a user isolation scope should not match existing short filenames in application-scoped instance of the directory or in the system-scoped instance of the directory.

Figure 7A:
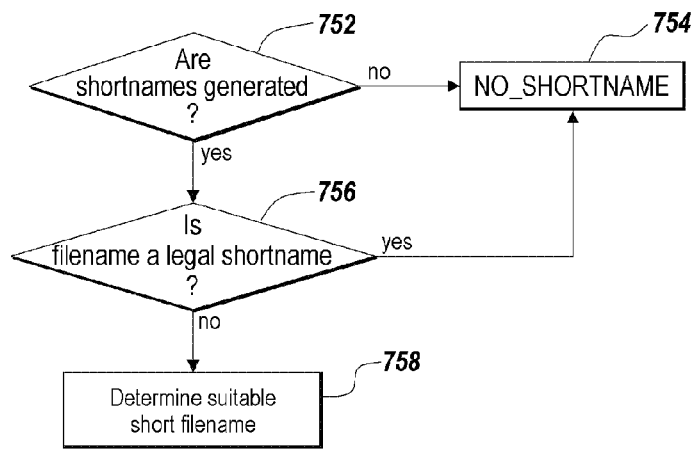
FIG. 7A is a flowchart depicting one embodiment of the steps taken to assign unique short filenames after creating a new file.

Referring now to FIG. 7A, one embodiment of the steps taken to assign unique short filenames after creating a new file is shown. In brief overview, a check is made to determine if short filenames should be generated (step 752). If not, a status is returned indicating that no short filename will be generated (step 754). Otherwise, the filename is checked to determine if it is already a legal short filename according to the file system (step 756). If it is already a legal short filename, a status is returned indicating that no short name will be generated (step 754). Otherwise, a suitable short filename is constructed (step 758).

Still referring to FIG. 7A, and in greater detail, a check is made to determine if short filenames should be generated (step 752). In some embodiments, this decision may be made based on the device storing the file to which the filename refers. In other embodiments, generation of short filenames may be enabled for certain scopes or sub-scopes, or for the isolation environment as a whole. In some of these embodiments, a registry setting may specify whether a short filename will be generated for a particular filename. If no short filename should be generated, a status that no short filename will be generated is returned (step 754).

Otherwise, the filename is checked to determine if it is already a legal short filename (step 756). In some embodiments, legal short filenames contain up to eight characters in the filename and up to three characters in an optional extension. In some embodiments, legal short names contain only legal characters, such as A-Z, a-z, 0-9, , ~, !, @, #, $, %, ˆ, &, *, (,), -, \_, ', {, and }. In some embodiments a leading space or "." or more than one embedded "." is illegal. If the provided filename is already a legal short filename, a status is returned that no short filename will be generated (step 754).

Otherwise, if it is determined in step 756 that the filename is an illegal short filename, a suitable short filename is constructed (step 758). In some embodiments this is achieved by using some of the parts of the long filename that are legal to use in a short filename, combined with an encoded iteration count to form a candidate short filename. The iteration count is increased until the associated candidate short filename is suitable, that is it is a legal short filename that is not used by any other file in the same directory in the same scope, or in the same directory in a lower scope. In other embodiments, the long filename is mangled or hashed and encoded, and is combined with an encoded iteration count to form a candidate short filename. The iteration count is increased until the associated candidate short filename is suitable, that is it is a legal short filename that is not used by any other file in the same directory in the same scope, or in the same directory in a lower scope. In all of these embodiments a scope-specific string may be incorporated into the candidate short filename to increase the likelihood that a suitable candidate short filename will be found with a low iteration count.

4.2 Registry Virtualization

The methods and apparatus described above may be used to virtualize access to a registry database. As described above a registry database stores information regarding hardware physically attached to the computer, which system options have been selected, how computer memory is set up, various items of application-specific data, and what application programs should be present when the operating system is started. A registry database is commonly organized in a logical hierarchy of "keys" 170, 172, which are containers for registry values.

4.2.1 Registry Key Open Operations

Figure 8:
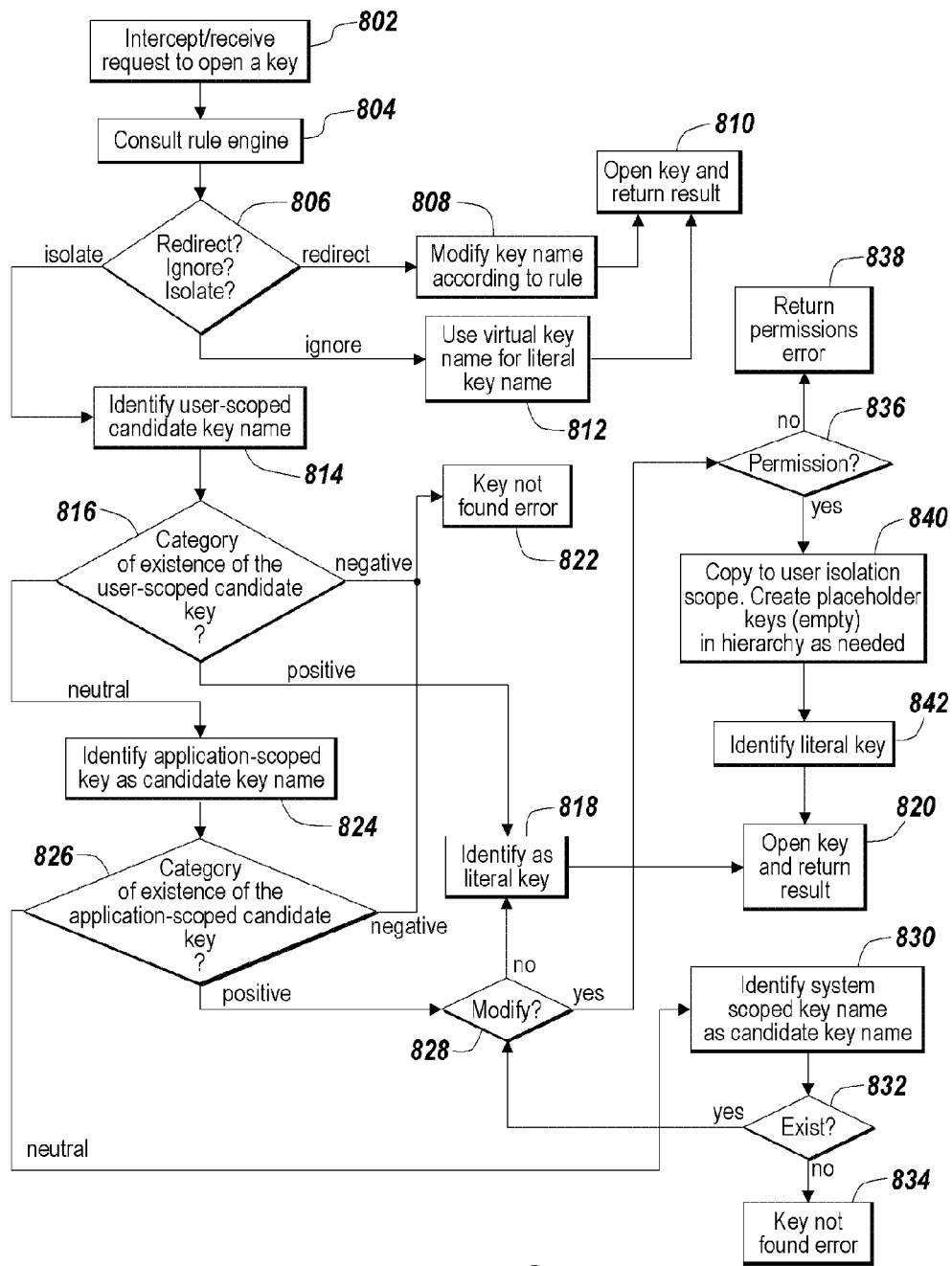
FIG. 8 is a flowchart depicting one embodiment of the steps taken to open a registry key in the described virtualized environment.

In brief overview, FIG. 8 depicts one embodiment of the steps taken to open a registry key in the isolation environment described above. A request to open a registry key is received or intercepted, the request containing a registry key name which is treated as a virtual key name by the isolation environment (step 802). A processing rule applicable to the virtual name in the request determines how the registry key operation is processed (step 804). If the rule action is "redirect" (step 806), the virtual key name provided in the request is mapped to a literal key name as specified by the applicable rule (step 808). A request to open the literal registry key using the literal key name is passed to the operating system and the result from the operating system is returned to the requestor (step 810). If the rule action is not "redirect", but is "ignore" (step 806), then the virtual key name is identified as the literal key name (step 812), and a request to open the literal registry key is passed to the operating system and the result from the operating system is returned to the requestor (step 810). If the rule action determined in step 806 is not "redirect" and is not "ignore," but is "isolate", the virtual key name provided in the request is mapped to a user-scoped candidate key name, that is a key name corresponding to the virtual key name that is specific to the applicable user isolation scope (step 814). The category of existence of the user-scoped candidate key is determined by examining the user isolation scope and any metadata associated with the candidate key (step 816). If the candidate key is determined to have "negative existence", because either the candidate key or one of its ancestor keys in the user isolation scope is marked as deleted, this means the requested virtual key is known to not exist. In this case, an error condition indicating the requested file is not found is returned to the requestor (step 822). If instead in step 816 the candidate key is determined to have "positive existence", because the candidate key exists in the user isolation scope and is not marked as a placeholder node, then the requested virtual key is known to exist. The candidate key is identified as the literal key for the request (step 818), and a request issued to open the literal key and the result returned to the requestor (step 820). If, however, in step 816, the candidate key has "neutral existence" because the candidate key does not exist, or the candidate key exists but is marked as a placeholder node, it is not yet known whether the virtual key exists or not. In this case the application-scoped key name corresponding to the virtual key name is identified as the candidate key name (step 824). In other words, the candidate key name is formed by mapping the virtual key name to the corresponding native key name specific to the applicable application isolation scope. The category of existence of the candidate key is determined by examining the application isolation scope and any metadata associated with the candidate key (step 826). If the candidate key is determined to have "negative existence", because either the candidate key or one of its ancestor keys in the application isolation scope is marked as deleted, this means the requested virtual key is known to not exist. In this case, an error condition indicating the requested key is not found is returned to the requestor (step 822). If instead in step 826 the candidate key is determined to have "positive existence", because the candidate key exists in the application isolation scope and is not marked as a placeholder node, then the requested virtual key is known to exist. The request is checked to determine if the open request indicates an intention to modify the key (step 828). If not, the candidate key is identified as the literal key for the request (step 818), and a request issued to open the literal key and the result returned to the requestor (step 820). If, however, in step 828, it is determined that the open request indicates an intention to modify the key, permission data associated with the key is checked to determine if modification of the key is allowed (step 836). If not, an error condition is returned to the requestor (step 838) indicating that modification of the key is not allowed. If the permission data indicates that the key may be modified, the candidate key is copied to the user isolation scope (step 840). In some embodiments, the candidate key is copied to a location defined by the rules engine. For example, a rule may specify that the key is copied to an application isolation scope. In other embodiments the rules may specify a particular application isolation sub-scope or user isolation sub-scope to which the key should be copied. Any ancestors of the requested key that do not appear in the isolation scope to which the key is copied are created as placeholders in the isolation scope in order to correctly locate the copied instance in the hierarchy. The newly copied scoped instance is identified as the literal key (step 842) and a request issued to open the literal key and the result returned to the requestor (step 820). Returning to step 826, if the candidate key has neutral existence because the candidate key does not exist, or because the candidate key is found but marked as a placeholder node, it is not yet known whether the virtual key exists or not. In this case, the system-scoped key name corresponding to the virtual key name is identified as the candidate key name (step 830). In other words, the candidate key name is exactly the virtual key name. If the candidate key does not exist (step 832), an error condition indicating the virtual key was not found is returned to the requestor (step 834). If on the other hand the candidate key exists (step 832), the request is checked to determine if the open request indicates an intention to modify the key (step 828). If not, the candidate key is identified as the literal key for the request (step 818), and a request issued to open the literal key and the result returned to the requestor (step 820). If, however, in step 828, it is determined that the open request indicates intention to modify the key, permission data associated with the key is checked to determine if modification of the key is allowed (step 836). If not, an error condition is returned to the requestor (step 838) indicating that modification of the key is not allowed. If the permission data indicates that the key may be modified, the candidate key is copied to the user isolation scope (step 840). In some embodiments, the candidate key is copied to a location defined by the rules engine. For example, a rule may specify that the key is copied to an application isolation scope. In other embodiments the rules may specify a particular application isolation sub-scope or user isolation sub-scope to which the key should be copied. Any ancestors of the requested key that do not appear in the isolation scope are created as placeholders in the isolation scope in order to correctly locate the copied instance in the hierarchy. The newly copied scoped instance is identified as the literal key (step 842) and a request issued to open the literal key and the result returned to the requestor (step 820).

Still referring to FIG. 8 and now in more detail, a request to open a virtual registry key is received or intercepted (step 802). The corresponding literal registry key may be of user isolation scope, application isolation scope or system scope, or it may be scoped to an application isolation sub-scope or a user isolation sub-scope. In some embodiments, the request is hooked by a function that replaces the operating system function or functions for opening a registry key. In another embodiment a hooking dynamically-linked library is used to intercept the request. The hooking function may execute in user mode or in kernel mode. For embodiments in which the hooking function executes in user mode, the hooking function may be loaded into the address space of a process when that process is created. For embodiments in which the hooking function executes in kernel mode, the hooking function may be associated with an operating system resource that is used in dispatching requests for native registry keys. For embodiments in which a separate operating system function is provided for each type of registry key operation, each function may be hooked separately. Alternatively, a single hooking function may be provided which intercepts create or open calls for several types of registry key operations.

The request contains a registry key name, which is treated as a virtual registry key name by the isolation environment. The processing rule applicable to the registry key open request is determined (step 804) by consulting the rules engine. In some embodiments, the rules engine may be provided as a relational database. In other embodiments, the rules engine may be a tree-structured database, a hash table, or a flat file database. In some embodiments, the virtual registry key name provided for the requested registry key is used to locate in the rule engine a rule that applies to the request. In particular ones of these embodiments, multiple rules may exist in the rules engine for a particular registry key and, in these embodiments, the rule having the longest prefix match with the virtual registry key name is the rule applied to the request. In other embodiments, a process identifier is used to locate in the rule engine a rule that applies to the request, if one exists. The rule associated with a request may be to ignore the request, redirect the request, or isolate the request. Although shown in FIG. 8 as a single database transaction or single lookup into a file, the rule lookup may be performed as a series of rule lookups.

If the rule action is "redirect" (step 806), the virtual registry key name provided in the request is mapped to the literal registry key name according to the applicable rule (step 808). A request to open the literal registry key using the literal registry key name is passed to the operating system and the result from the operating system is returned to the requestor (step 810). For example, a request to open a registry key named "registry_key_1" may result in the opening of a literal registry key named "Different _registry_key_1". In one embodiment, this is accomplished by calling the original version of the hooked function and passing the formed literal name to the function as an argument. In other embodiments, a registry filter driver facility conceptually similar to a file system filter driver facility may be provided by the operating system. In these embodiments, opening the literal registry key may be achieved by responding to the original request to open the virtual key by signaling to the registry filter manager to reparse the request using the determined literal key name. If instead the rule action is "ignore" (step 806), then the literal registry key name is determined to be exactly the virtual registry key name (step 812), and the request to open the literal registry key is passed to the operating system and the result from the operating system is returned to the requestor (step 810). For example, a request to open a registry key named "registry_key_1" will result in the opening of a literal registry key named "registry_key_1". In one embodiment, this is accomplished by calling the original version of the hooked function and passing the formed literal name to the function as an argument. In another embodiment, this is accomplished by signaling to the registry filter manager to continue processing the original unmodified request in the normal fashion.

If in step 806 the rule action is "isolate", then the user-scoped registry key name corresponding to the virtual registry key name is identified as the candidate registry key name (step 814). In other words, the candidate registry key name is formed by mapping the virtual registry key name to the corresponding native registry key name specific to the applicable user isolation scope. For example, a request to open a registry key named "registry_key_1" may result in the opening of a literal registry key named "Isolated_UserScope_UserA_registry_key_1". In one embodiment, this is accomplished by calling the original version of the hooked function and passing the formed literal name to the function as an argument. In other embodiments, opening the literal registry key may be achieved by responding to the original request to open the virtual key by signaling to the registry filter manager to reparse the request using the determined literal key name.

In some embodiments, the literal name formed in order to isolate a requested virtual registry key may be based on the virtual registry key name received and a scope-specific identifier. The scope-specific identifier may be an identifier associated with an application isolation scope, a user isolation scope, a session isolation scope, an application isolation sub-scope, a user isolation sub-scope, or some combination of the above. The scope-specific identifier is used to "mangle" the virtual name received in the request.

In other embodiments, the user isolation scope or a sub-scope may be a registry key under which all keys that exist in the user isolation scope are stored. In some of these embodiments, the key hierarchy under the user isolation key reflects the path of the requested resource. In other words, the literal key path is formed by mapping the virtual key path to the user isolation scope. For example, if the requested key is HKLM\Software\Citrix\MyKey and the user isolation scope key is HKCU\Software\UserScope\, then the path to the user-scoped literal key may be HKCU\Software\UserScope\HKLM\Software\Citrix\MyKey. In other embodiments, the path to the user-scoped literal may be defined in a native naming convention. For example, the path to the user-scoped literal key may be HKCU\Software\UserScope\Registry\Machine\Software\Citrix\MyKey. In still other embodiments, the user-scoped keys may all be stored under a single key with names chosen to be unique and a database may be used to store the mapping between the requested key name and the name of the corresponding literal key stored in the user isolation key. In still other embodiments, the contents of the literal keys may be stored in a database or a file store.

The category of existence of the candidate key is determined by examining the user isolation scope and any metadata associated with the candidate key (step 816). If the candidate key is determined to have "negative existence", because either the candidate key or one of its ancestor keys in the user isolation scope is marked as deleted, this means the requested virtual key is known to not exist. In this case, an error condition indicating the requested key is not found is returned to the requestor (step 822).

In some embodiments, the literal registry key may be associated with metadata indicating that the virtualized registry key has already been deleted. In some embodiments, metadata about a registry key may be stored in a distinguished value held by that key, with the existence of that value hidden from ordinary application usage of registry APIs. In some embodiments, small amounts of metadata about a registry key may be stored directly in the literal key name, such as by suffixing the virtual name with a metadata indicator, where a metadata indicator is a string uniquely associated with a particular metadata state. The metadata indicator may indicate or encode one or several bits of metadata. Requests to access the key by virtual name check for possible variations of the literal key name due to the presence of a metadata indicator, and requests to retrieve the name of the key itself are hooked or intercepted in order to respond with the literal name. In other embodiments, the metadata indicator may be encoded in a subkey name or a registry value name instead of the key name itself. In still other embodiments, a registry key system may directly provide the ability to store some 3rd party metadata for each key. In some embodiments, metadata is stored in a database or other repository separate from the registry database. In some embodiments, a separate sub-scope may be used to store keys that are marked as deleted. The existence of a key in the sub-scope indicates that the key is marked as deleted.

In specific ones of these embodiments, a list of deleted keys or key system elements may be maintained and consulted to optimize this check for deleted keys. In these embodiments, if a deleted key is recreated then the key name may be removed from the list of deleted keys. In others of these embodiments, a key name may be removed from the list if the list grows beyond a certain size.

If instead in step 816 the candidate key is determined to have "positive existence", because the candidate key exists in the user isolation scope and is not marked as a placeholder node, then the requested virtual key is known to exist. The candidate key is identified as the literal key for the request (step 818), and a request issued to open the literal key and the result returned to the requestor (step 820).

If, however, in step 816, the candidate key has "neutral existence" because the candidate key does not exist, or the candidate key exists but is marked as a placeholder node, it is not yet known whether the virtual key exists or not. In this case the application-scoped key name corresponding to the virtual key name is identified as the candidate key name (step 824). In other words, the candidate key name is formed by mapping the virtual key name to the corresponding native key name specific to the applicable application isolation scope. The category of existence of the candidate key is determined by examining the application isolation scope and any metadata associated with the candidate key (step 826).

If the application-scoped candidate key is determined to have "negative existence", because either the candidate key or one of its ancestor keys in the application isolation scope is marked as deleted, this means the requested virtual key is known to not exist. In this case, an error condition indicating the requested key is not found is returned to the requestor (step 822).

If, however, in step 826 the candidate key is determined to have "positive existence", because the candidate key exists in the application isolation scope and is not marked as a placeholder node, then the requested virtual key is known to exist. The request is checked to determine if the open request indicates an intention to modify the key (step 828). If not, the candidate key is identified as the literal key for the request (step 818), and a request issued to open the literal key and the result returned to the requestor (step 820).

If, however, in step 828, it is determined that the open request indicates intention to modify the key, permission data associated with the key is checked to determine if modification of the key is allowed (step 836). In some embodiments, the permission data is associated with the application-scoped candidate key. In some of these embodiments, the permissions data is stored in a rules engine or in metadata associated with the candidate key. In other embodiments, the permission data associated with the candidate key is provided by the operating system. Further, the rules engine may include configuration settings instructing the isolation environment to obey or override the native permission data for virtualized copies of resources. In some embodiments, the rules may specify for some virtual resources the scope in which modifications are to occur, for example the system scope or the application isolation scope or a sub-scope, or the user isolation scope or a sub-scope. In some embodiments, the rules engine may specify configuration settings that apply to subsets of the virtualized native resources based on hierarchy. In some of these embodiments, the configuration settings may be specific to each atomic native resource.

If the permission data associated with the candidate key indicates that it may not be modified, an error condition is returned to the requestor (step 838) indicating that modification of the key is not allowed. If the permission data indicates that the key may be modified, the candidate key is copied to the user isolation scope (step 840). In some embodiments, the candidate key is copied to a location defined by the rules engine. For example, a rule may specify that the key is copied to another application isolation scope. In other embodiments the rules may specify a particular application isolation sub-scope or user isolation sub-scope to which the key should be copied. Any ancestors of the requested key that do not appear in the isolation scope to which the key is copied are created as placeholders in the isolation scope in order to correctly locate the copied instance in the hierarchy.

In some embodiments, metadata is associated with keys copied to the isolation scope that identifies the date and time at which the keys were copied. This information may be used to compare the time stamp associated with the copied instance of the key to the time stamp of the last modification of the original instance of the key or of another instance of the key located in a lower isolation scope. In these embodiments, if the original instance of the key, or an instance of the key located in a lower isolation scope, is associated with a time stamp that is later than the time stamp of the copied key, that key may be copied to the isolation scope to update the candidate key. In other embodiments, the copy of the key in the isolation scope may be associated with metadata identifying the scope containing the original key that was copied.

In further embodiments, keys that are copied to isolation scopes because they have been opened with intent to modify them may be monitored to determine if they are, in fact, modified. In one embodiment a copied key may be associated with a flag that is set when the key is actually modified. In these embodiments, if a copied key is not actually modified, it may be removed from the scope to which it was copied after it is closed, as well as any placeholder nodes associated with the copied key.

The scoped instance is identified as the literal key (step 842) and a request issued to open the literal key and the result returned to the requestor (step 820).

Returning to step 826, if the candidate key has neutral existence because the candidate key does not exist, or if the candidate key is found but marked as a placeholder node, it is not yet known whether the virtual key exists or not. In this case, the system-scoped key name corresponding to the virtual key name is identified as the candidate key name (step 830). In other words, the candidate key name is exactly the virtual key name.

If the candidate key does not exist (step 832), an error condition indicating the virtual key was not found is returned to the requestor (step 834). If on the other hand the candidate key exists (step 832), the request is checked to determine if the open request indicates an intention to modify the key (step 828).

As above, if the candidate key is being opened without the intent to modify it, the system-scoped candidate key is identified as the literal key for the request (step 818), and a request issued to open the literal key and the result returned to the requestor (step 820). If, however, in step 828, it is determined that the open request indicates intention to modify the key, permission data associated with the key is checked to determine if modification of the key is allowed (step 836). In some embodiments, the permission data is associated with the application-scoped candidate key. In some of these embodiments, the permissions data is stored in a rules engine or in metadata associated with the candidate key. In other embodiments, the permission data associated with the candidate key is provided by the operating system. Further, the rules engine may include configuration settings instructing the isolation environment to obey or override the native permission data for virtualized copies of resources. In some embodiments, the rules may specify for some virtual resources the scope in which modifications are to occur, for example the system scope or the application isolation scope or a sub-scope, or the user isolation scope or a sub-scope. In some embodiments, the rules engine may specify configuration settings that apply to subsets of the virtualized native resources based on hierarchy. In some of these embodiments, the configuration settings may be specific to each atomic native resource.

If the permission data associated with the system-scoped candidate key indicates that the key may not be modified, an error condition is returned to the requestor (step 838) indicating that modification of the key is not allowed. If, however, the permission data indicates that the key may be modified, the candidate key is copied to the user isolation scope (step 840). In some embodiments, the candidate key is copied to a location defined by the rules engine. For example, a rule may specify that the key is copied to an application isolation scope or that it may be left in the system scope. In other embodiments the rules may specify a particular application isolation sub-scope or user isolation sub-scope to which the key should be copied. Any ancestors of the requested key that do not appear in the isolation scope are created as placeholders in the isolation scope in order to correctly locate the copied instance in the hierarchy.

In some embodiments, metadata is associated with keys copied to the isolation scope that identifies the date and time at which the keys were copied. This information may be used to compare the time stamp associated with the copied instance of the key to the time stamp of the last modification of the original instance of the key. In these embodiments, if the original instance of the key is associated with a time stamp that is later than the time stamp of the copied key, the original key may be copied to the isolation scope to update the candidate key. In other embodiments, the candidate key copied to the isolation scope may be associated with metadata identifying the scope from which the original key was copied.

In further embodiments, keys that are copied to isolation scopes because they have been opened with intent to modify them may be monitored to determine if they are, in fact, modified. In one embodiment a copied key may be associated with a flag that is set when the key is actually modified. In these embodiments, if a copied key is not actually modified, when it is closed it may be removed from the scope to which it was copied, as well as any placeholder nodes associated with the copied key. In still further embodiments, the key is only copied to the appropriate isolation scope when the key is actually modified.

The scoped instance is identified as the literal key (step 842) and a request issued to open the literal key and the result returned to the requestor (step 820).

4.2.2 Registry Key Delete Operations

Figure 9:
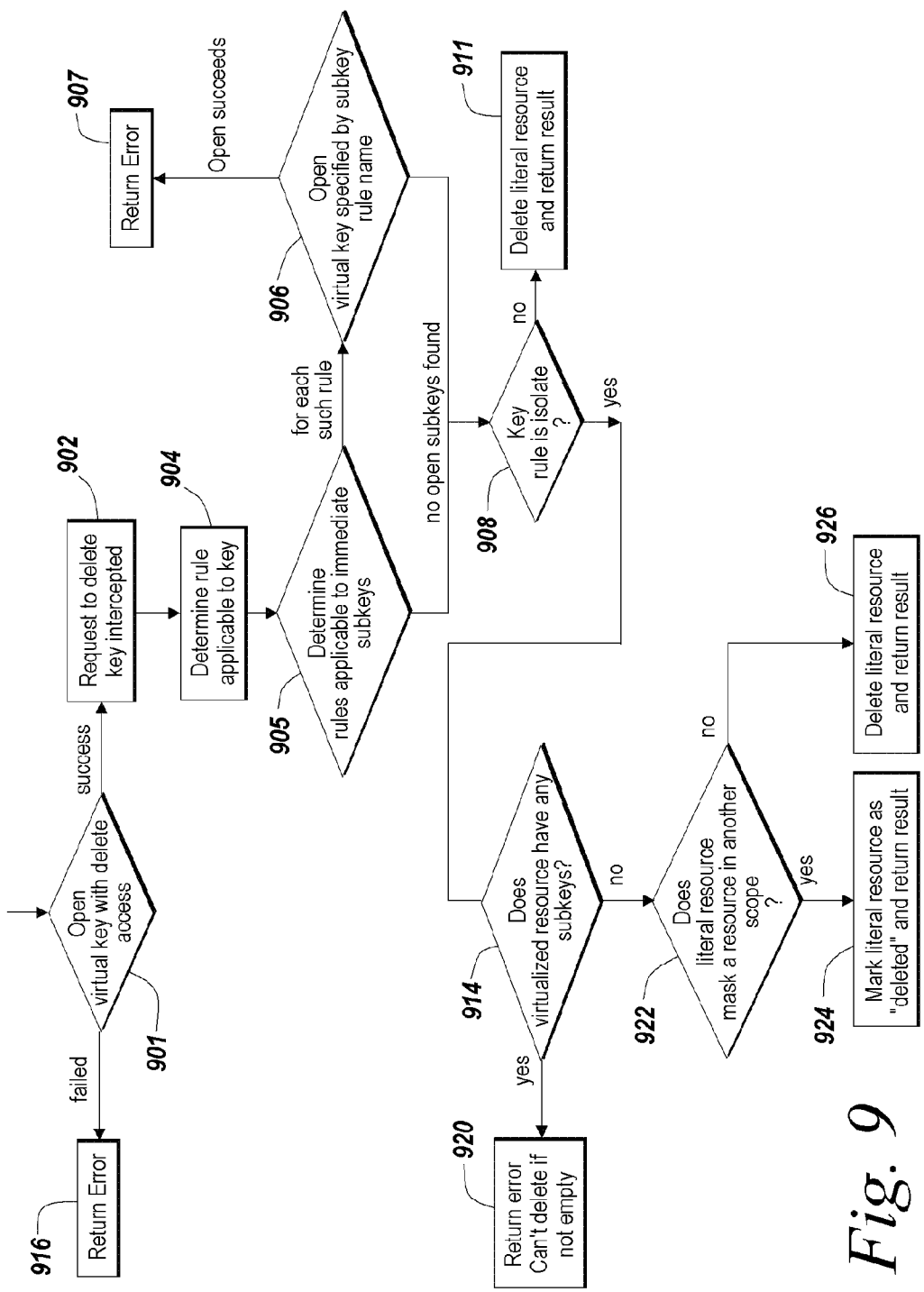
FIG. 9 is a flowchart depicting one embodiment of the steps taken to delete a registry key in the described virtualized environment.

Referring now to FIG. 9, and in brief overview, one embodiment of the steps taken to delete a registry key is depicted. Before a key can be deleted, the key must first be opened successfully with delete access (step 901). If the key is not opened successfully, an error is returned (step 916). If the virtual key is opened successfully, a request to delete a virtualized registry key is received or intercepted, the request including the handle to the literal key corresponding to the virtual key (step 902). A rule determines how the registry key operation is processed (step 904). In addition to the rule applicable to the key to be deleted, any other rules applicable to immediate subkeys are examined (step 905). For each rule applicable to an immediate subkey found, an attempt is made to open a virtual subkey, with the virtual subkey's name being specified by the name given in the rule found in step 905. If a subkey with a name corresponding to one of the rules found in step 905 is opened successfully (step 906), then the virtual key is considered to have subkeys, which means it cannot be deleted, and an error returned (step 907).

If, after all the virtual key names extracted in step 905 have been attempted to be opened (step 906), no virtual keys were found to exist, further examination is required. If the rule action is not "isolate", but is "redirect", or is "ignore" (step 908), a request to delete the literal registry key is passed to the operating system and the result from the operating system is returned to the requestor (step 911). If however the rule action determined in step 908 is "isolate" the aggregated virtualized registry key is consulted to determine if it contains any virtual subkeys (step 914). If the virtualized key has virtual subkeys, then the deletion cannot continue, and an error is returned indicating the key has not been deleted (step 920). If the virtualized key does not have virtual subkeys, then the literal key corresponding to the virtual key is examined to determine if it masks a scoped key with the same virtual name in another scope level (step 922). If the literal key corresponding to the virtual key does not mask a differently scoped key with the same virtual name, then the literal key which corresponds to the virtual key is deleted, and the result returned (step 926). If the literal key corresponding to the virtual key masks a differently scoped key with the same virtual name, then the literal key corresponding to the virtual key is marked with a value indicating that it is deleted, and a successful result returned to the caller (step 924).

Still referring to FIG. 9, and in more detail, in order to delete a key, it must first be opened with delete access (step 901). The request to open the key with delete access includes the name of the key which is treated as a virtual name by the isolation environment. A full virtualized key open is performed as described in section 4.2.1. If the virtualized open operation fails, an error is returned to the requestor (step 916). If the virtualized open operation succeeds, the handle of the literal key corresponding to the virtual key is returned to the requestor. Subsequently a request to delete the registry key which was opened in step 901 is received or intercepted (step 902). The opened literal registry key may be of user isolation scope, application isolation scope, system scope, or some applicable isolation sub-scope. In some embodiments, the delete request is hooked by a function that replaces the operating system function or functions for deleting the registry key. In another embodiment a hooking dynamically-linked library is used to intercept the delete request. The hooking function may execute in user mode or in kernel mode. For embodiments in which the hooking function executes in user mode, the hooking function may be loaded into the address space of a process when that process is created. For embodiments in which the hooking function executes in kernel mode, the hooking function may be associated with an operating system resource that is used in dispatching requests for native registry keys. In other embodiments, a registry filter driver facility conceptually similar to a file system filter driver facility may be provided by the operating system. A practitioner skilled in the art may create a registry filter driver to which the operating system passes requests to perform registry operations, thus providing a mechanism to intercept registry operation requests. For embodiments in which a separate operating system function is provided for each type of registry key function, each function may be hooked separately. Alternatively, a single hooking function may be provided which intercepts create or open calls for several types of registry key functions.

The delete request contains a literal key handle. The virtual key name associated with the handle is determined by querying the operating system for the literal name associated with the handle. The rules engine is consulted to determine the virtual name associated with the literal name, if any. A rule determining how the registry key operation is processed (step 904) is obtained by consulting the rules engine. In some embodiments, the virtual key name of the virtual registry key to be deleted is used to locate in the rule engine a rule that applies to the request. In particular ones of these embodiments, multiple rules may exist in the rules engine for a particular virtual registry key and, in some of these embodiments, the rule having the longest prefix match with the virtual key name is the rule applied to the request. In some embodiments, the rules engine may be provided as a relational database. In other embodiments, the rules engine may be a tree-structured database, a hash table, or a flat registry key database. In some embodiments, the virtual key name corresponding to the virtual key handle in the request is used as an index into a rules engine to locate one or more rules that apply to the request. In some embodiments, a process identifier is used to locate in the rule engine a rule that applies to the request, if one exists. The rule associated with a request may be to ignore the request, redirect the request, or isolate the request. The rule lookup may occur as a series of decisions, or the rule lookup may occur as a single database transaction.

The virtual name of the key to be deleted is used to consult the rules engine to locate the set of rules applicable to any immediate child keys of the virtual key to delete, but not applicable to the virtual key to be deleted. This set of rules is located whether those child keys exist or not (step 905). If this set of rules applicable to immediate child keys is not empty, then the virtual name of each of these rules is extracted. An attempt is made to do a full virtualized open of each of the virtual child key names extracted, in turn (step 906). If any of the virtual keys corresponding to any of these virtual names can be opened successfully, then this means that a virtual subkey exists. This means that the virtual key cannot be deleted, as it has a virtual child that exists, and an error is returned (step 907). If after examining all of the set of rules applicable to immediate children of the virtual key (step 905), no virtual subkeys are found to exist, the deletion can continue. For example, a key with virtual name "key_1" may have child rules applicable to "key1\subkey_1" and "key1\subkey_2". In this step, an attempt is made to do a virtualized open of "key1\subkey_1" and "key1\subkey_2". If either of these virtual subkeys can be opened successfully, then the deletion will fail, and an error is returned (step 907). Only if neither of these virtual subkeys exist can the deletion continue.

If the rule action is not "isolate", but is "redirect", or is "ignore" (step 908), a request to delete the literal registry key using the literal key handle is passed to the operating system and the result from the operating system is returned to the requestor (step 911). This request will fail if the literal key contains literal subkeys. In one embodiment, the request to delete the literal registry key is accomplished by calling the original version of the hooked function and passing the literal key handle to the function as an argument. In embodiments that make use of a registry filter driver, this is accomplished by responding to the request with a completion status that signals the operating system to perform normal processing on the request. In some embodiments, operating system permissions associated with the literal registry key may prevent its deletion. In these embodiments, an error message is returned that the virtual registry key could not be deleted.

If the rule action determined in step 908 is "isolate", then the aggregated virtualized registry key is consulted to determine if it contains any virtual subkeys (step 914). If the requested virtual registry key contains virtual subkeys, then the virtual key cannot be deleted, and an error is returned to the caller (step 920).

If the requested virtual registry key does not contain virtual subkeys, then the virtual key can be deleted. The action taken next depends on the scope that contains the literal key to be deleted. For example, a request to delete a virtual registry key may result in the deletion of an application-scoped literal key. The scope containing the literal key can be determined by consulting the rules engine with the full path to the literal key.

If the literal key to be deleted is found in a particular scope, and that literal key masks another key of the same virtual name in another scope, then the literal key to be deleted is marked as deleted, and a result returned to the requestor (step 924). For example, a virtual key that corresponds to a user-scoped literal key is considered to mask a differently-scoped key if a corresponding application-scoped key with the same virtual name or a corresponding system-scoped key with the same virtual name has "positive existence", that is, exists in the scope, and is not marked as a placeholder, and is not considered to be deleted. Similarly, an application-scoped key is considered to mask a system-scoped key corresponding to the same virtual name if that system-scoped key exists and is not considered to be deleted.

If the literal key to be deleted is found not to mask another key of the same virtual name in another scope, then the literal key to be deleted is actually deleted and a result returned (step 926).

In some embodiments, operating system permissions associated with the literal registry key may prevent deletion of the literal registry key. In these embodiments, an error message is returned that the virtual registry key could not be deleted.

In some embodiments, the literal registry key may be associated with metadata indicating that the virtualized registry key has already been deleted. In some embodiments, metadata about a registry key may be stored in a distinguished value held by that key, with the existence of that value hidden from ordinary application usage of registry APIs. In some embodiments, small amounts of metadata about a registry key may be stored directly in the literal key name, such as by suffixing the virtual name with a metadata indicator, where a metadata indicator is a string uniquely associated with a particular metadata state. The metadata indicator may indicate or encode one or several bits of metadata. Requests to access the key by virtual name check for possible variations of the literal key name due to the presence of a metadata indicator, and requests to retrieve the name of the key itself are hooked or intercepted in order to respond with the literal name. In other embodiments, the metadata indicator may be encoded in a subkey name or a registry value name instead of the key name itself. In still other embodiments, a registry key system may directly provide the ability to store some 3rd party metadata for each key. In some embodiments, metadata could be stored in a database or other repository separate from the registry database. In some embodiments, a separate sub-scope may be used to store keys that are marked as deleted. The existence of a key in the sub-scope indicates that the key is marked as deleted.

In specific ones of these embodiments, a list of deleted keys or key system elements may be maintained and consulted to optimize this check for deleted keys. In these embodiments, if a deleted key is recreated then the key name may be removed from the list of deleted keys. In others of these embodiments, a key name may be removed from the list if the list grows beyond a certain size.

In some embodiments, an ancestor of the literal registry key in the same scope is associated with metadata indicating that it is deleted, or is otherwise indicated to be deleted. In these embodiments, an error message may be returned indicating that the virtualized registry key does not exist. In specific ones of these embodiments, a list of deleted registry keys or registry key system elements may be maintained and consulted to optimize this check for deleted registry keys.

4.2.3 Registry Key Enumeration Operations

Figure 10:
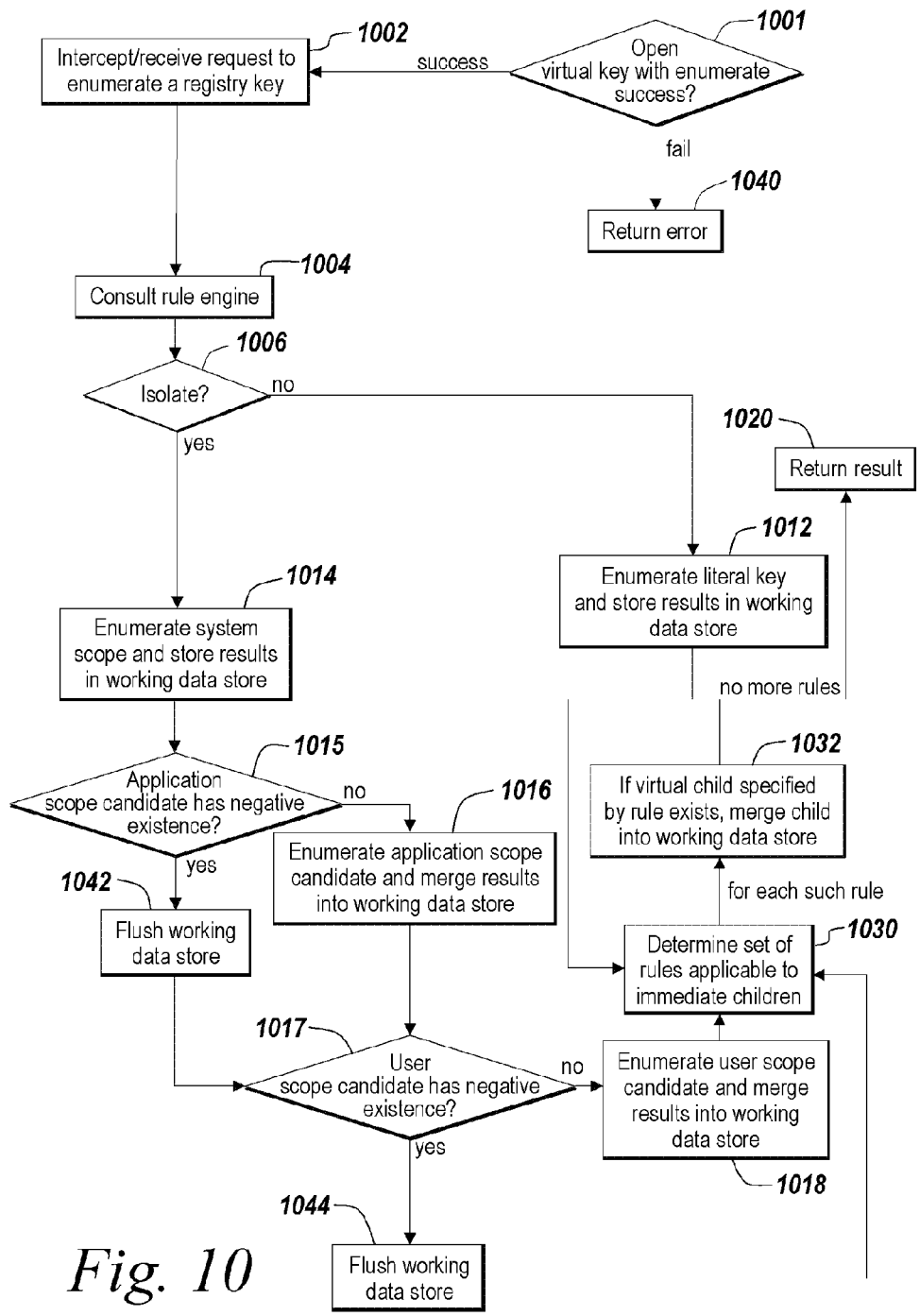
FIG. 10 is a flowchart depicting one embodiment of the steps taken to enumerate subkeys of a key in a registry database in the described virtualized environment.

Referring now to FIG. 10, and in brief overview, one embodiment of the steps taken to enumerate a key in the described virtualized environment is shown. Before a key can be enumerated, the key must first be opened successfully with enumerate access (step 1001). If the key is not opened successfully, an error is returned (step 1040). If the virtual key is opened successfully, a request to enumerate is received or intercepted, the request including the handle to the literal key corresponding to the virtual key (step 1002).

The virtual key name corresponding to the handle is determined, and the rules engine is consulted to determine the rule for the key specified in the enumerate request (step 1004). If the rule doesn't specify an action of "isolate", but instead specifies "ignore" or specifies "redirect" (step 1006), the literal key identified by the literal key handle is enumerated, and the enumeration results stored in a working data store (step 1012), followed by step 1030 as described later.

If, however, the rule action specifies "isolate," firstly the system scope is enumerated; that is, the candidate key name is exactly the virtual key name, and if the candidate key exists it is enumerated. The enumeration results are stored in a working data store. If the candidate key does not exist, the working data store remains empty at this stage (step 1014). Next, the candidate key is identified as the application-scoped instance of the virtual key, and the category of existence of the candidate key is determined (step 1015). If the candidate key has "negative existence", i.e. it or one of its ancestors in the scope is marked as deleted, then within this scope it is known to be deleted, and this is indicated by flushing the working data store (step 1042). If instead the candidate key does not have negative existence, the candidate key is enumerated and any enumeration results obtained are merged into the working data store. In particular, for each subkey in the enumeration, its category of existence is determined. Subkeys with negative existence are removed from the working data store, and subkeys with positive existence, i.e. those that exist and are not marked as placeholders and are not marked as deleted, are added to the working data store, replacing the corresponding subkey if one is already present in the working data store (step 1016).

In either case, the candidate key is identified as the user-scoped instance of the virtual key, and the category of existence of the candidate key is determined (step 1017). If the candidate key has "negative existence", i.e. it or one of its ancestors in the scope is marked as deleted, then within this scope it is known to be deleted, and this is indicated by flushing the working data store (step 1044). If instead the candidate key does not have negative existence, the candidate key is enumerated and any enumeration results obtained are merged into the working data store. In particular, for each subkey in the enumeration, its category of existence is determined. Subkeys with negative existence are removed from the working data store, and subkeys with positive existence, i.e. those that exist and are not marked as placeholders and are not marked as deleted, are added to the working data store, replacing the corresponding subkey if one is already present in the working data store (step 1018), followed by step 1030 as described below.

Then, for all three types of rules, step 1030 is executed. The rules engine is queried to find the set of rules whose filters match immediate children of the requested virtual key name, but do not match the requested virtual key name itself (step 1030). For each rule in the set, the existence of the virtual child whose name matches the name in the rule is determined. If the child has positive existence, it is added to the working data store, replacing any child of the same name already there. If the child has negative existence, the entry in the working data store corresponding to the child, if any, is removed. (Step 1032). Finally, the constructed enumeration is then returned from the working data store to the requestor (step 1020).

Still referring to FIG. 10, and in more detail, in order to enumerate a key, it must first be opened with enumerate access (step 1001). The request to open the key with enumerate access includes the name of the key which is treated as a virtual name by the isolation environment. A full virtualized key open is performed as described in section 4.2.1. If the virtualized open operation fails, an error is returned to the requestor (step 1040). If the virtualized open operation succeeds, the handle of the literal key corresponding to the virtual key is returned to the requestor. Subsequently a request to enumerate the registry key which was opened in step 1001 is received or intercepted (step 1002). The opened literal registry key may be of user isolation scope, application isolation scope, system scope, or some applicable isolation sub-scope. In some embodiments, the enumerate request is hooked by a function that replaces the operating system function or functions for enumerating a registry key. In another embodiment a hooking dynamically-linked library is used to intercept the enumerate request. The hooking function may execute in user mode or in kernel mode. For embodiments in which the hooking function executes in user mode, the hooking function may be loaded into the address space of a process when that process is created. For embodiments in which the hooking function executes in kernel mode, the hooking function may be associated with an operating system resource that is used in dispatching requests for native registry keys. In other embodiments, a registry filter driver facility conceptually similar to a file system filter driver facility may be provided by the operating system. A practitioner skilled in the art may create a registry filter driver to which the operating system passes requests to perform registry operations, thus providing a mechanism to intercept registry operation requests. For embodiments in which a separate operating system function is provided for each type of registry key function, each function may be hooked separately. Alternatively, a single hooking function may be provided which intercepts create or open calls for several types of registry key functions.

The enumerate request contains a literal key handle. The virtual key name associated with the handle is determined by querying the operating system for the literal name associated with the handle. The rules engine is consulted to determine the virtual name associated with the literal name, if any.

A rule determining how the registry key operation is processed (step 1004) is obtained by consulting the rules engine. In some embodiments, the virtual key name of the virtual registry key to be enumerated is used to locate in the rule engine a rule that applies to the request. In particular ones of these embodiments, multiple rules may exist in the rules engine for a particular virtual registry key and, in some of these embodiments, the rule having the longest prefix match with the virtual key name is the rule applied to the request. In some embodiments, the rules engine may be provided as a relational database. In other embodiments, the rules engine may be a tree-structured database, a hash table, or a flat registry key database. In some embodiments, the virtual key name corresponding to the virtual key handle in the request is used as an index into a rules engine to locate one or more rules that apply to the request. In some embodiments, a process identifier is used to locate in the rule engine a rule that applies to the request, if one exists. The rule associated with a request may be to ignore the request, redirect the request, or isolate the request. The rule lookup may occur as a series of decisions, or the rule lookup may occur as a single database transaction.

If the rule action is not "isolate" (step 1006), but is "ignore" or is "redirect", then a request to enumerate the literal key is passed to the operating system using the literal key handle, and the enumeration results, if any, are stored in the working data store (step 1012), and step 1030 is executed as described later.

In one embodiment, this is accomplished by calling the original version of the hooked function and passing the formed literal name to the function as an argument. In other embodiments, a registry filter driver facility conceptually similar to a file system filter driver facility may be provided by the operating system. In these embodiments, enumerating the literal registry key may be achieved by responding to the original request to enumerate the key by signaling to the registry filter manager to process the unmodified request in the normal fashion.

If the rule action determined in step 1010 is "isolate", then the system scope is enumerated. To achieve this, the candidate key is identified as the system-scoped key corresponding to the virtual key to be enumerated. The candidate key is enumerated, and the results of the enumeration are stored in a working data store (step 1014). In some embodiments, the working data store is comprised of a memory element. In other embodiments, the working data store comprises a database or a key or a solid-state memory element or a persistent data store.

Next, the candidate key is identified as the application-scoped instance of the virtual key, and the category of existence of the candidate key is determined (step 1015). If the candidate key has "negative existence", i.e. it or one of its ancestors in the scope is marked as deleted, then within this scope it is known to be deleted, and this is indicated by flushing the working data store (step 1042).

In some embodiments, the candidate registry key may be associated with metadata indicating that the candidate registry key has been deleted. In some embodiments, metadata about a registry key may be stored in a distinguished value held by that key, with the existence of that value hidden from ordinary application usage of registry APIs. In some embodiments, small amounts of metadata about a registry key may be stored directly in the literal key name, such as by suffixing the virtual name with a metadata indicator, where a metadata indicator is a string uniquely associated with a particular metadata state. The metadata indicator may indicate or encode one or several bits of metadata. Requests to access the key by virtual name check for possible variations of the literal key name due to the presence of a metadata indicator, and requests to retrieve the name of the key itself are hooked or intercepted in order to respond with the literal name. In other embodiments, the metadata indicator may be encoded in a subkey name or a registry value name instead of the key name itself. In still other embodiments, a registry key system may directly provide the ability to store some 3rd party metadata for each key. In some embodiments, metadata is stored in a database or other repository separate from the registry database. In some embodiments, a separate sub-scope may be used to store keys that are marked as deleted. The existence of a key in the sub-scope indicates that the key is marked as deleted.

If instead, in step 1015, the candidate key does not have negative existence, the candidate key is enumerated and any enumeration results obtained are merged into the working data store. In particular, for each subkey in the enumeration, its category of existence is determined. Subkeys with negative existence are removed from the working data store, and subkeys with positive existence, i.e. those that exist and are not marked as placeholders and are not marked as deleted, are added to the working data store, replacing the corresponding subkey if one is already present in the working data store (step 1016).

In either case, the candidate key is identified as the user-scoped instance of the virtual key, and the category of existence of the candidate key is determined (step 1017). If the candidate key has "negative existence", i.e. it or one of its ancestors in the scope is marked as deleted, then within this scope it is known to be deleted, and this is indicated by flushing the working data store (step 1044). If instead the candidate key does not have negative existence, the candidate key is enumerated and any enumeration results obtained are merged into the working data store. In particular, for each subkey in the enumeration, its category of existence is determined. Subkeys with negative existence are removed from the working data store, and subkeys with positive existence, i.e. those that exist and are not marked as placeholders and are not marked as deleted, are added to the working data store, replacing the corresponding subkey if one is already present in the working data store (step 1018), followed by step 1030 as described below.

Then, for all three types of rules, step 1030 is executed. The rules engine is queried to find the set of rules whose filters match immediate children of the requested key, but do not match the requested key itself (step 1030). For each rule in the set, the existence of the virtual child whose name matches the name in the rule is determined. In some embodiments, this is determined by examining the appropriate isolation scope and the metadata associated with the virtual child. In other embodiments, this is determined by attempting to open the key. If the open request succeeds, the virtual child has positive existence. If the open request fails with an indication that the virtual child does not exist, the virtual child has negative existence.

If the child has positive existence, it is added to the working data store, replacing any child of the same name already there. If the child has negative existence, the child in the working data store corresponding to the virtual child, if any, is removed. (Step 1032). Finally, the constructed enumeration is then returned from the working data store to the requestor (step 1020).

A practitioner of ordinary skill in the art will realize that the layered enumeration process described above can be applied with minor modification to the operation of enumerating a single isolation scope which comprises a plurality of isolation sub-scopes. A working data store is created, successive sub-scopes are enumerated and the results are merged into the working data store to form the aggregated enumeration of the isolation scope.

4.2.4. Registry Creation Operations

Figure 11:
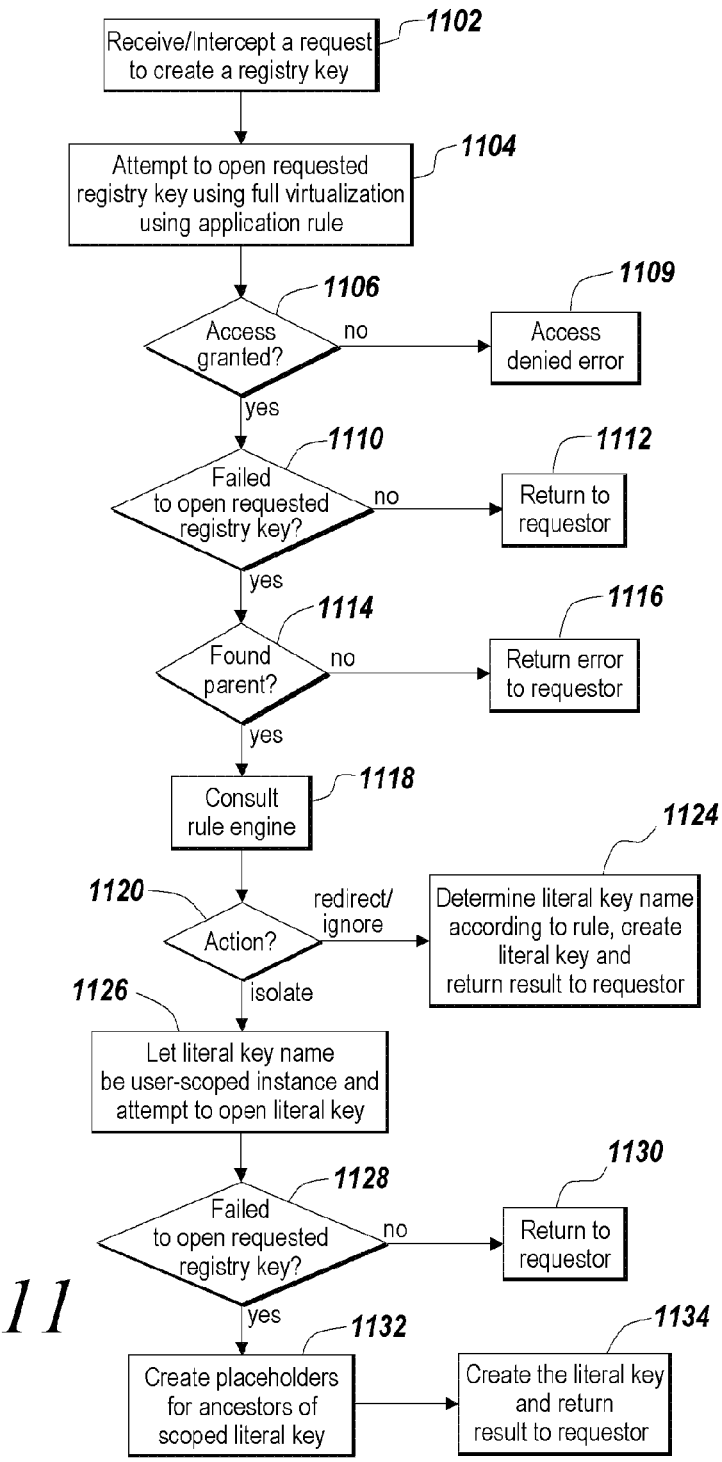
FIG. 11 is a flowchart depicting one embodiment of the steps taken to create a registry key in the described virtualized environment.

Referring now to FIG. 11, and in brief overview, one embodiment of the steps taken to create a key in the isolation environment is shown. A request to create a key is received or intercepted (step 1102). The request contains a key name, which is treated as a virtual key name by the isolation environment. An attempt is made to open the requested key using full virtualization using applicable rules, i.e. using appropriate user and application isolation scope, as described in section 4.2.1 (step 1104). If access is denied (step 1106), an access denied error is returned to the requestor (step 1109). If access is granted (step 1106), and the requested key is successfully opened (step 1110), the requested key is returned to the requestor (step 1112). However, if access is granted (step 1106), but the requested key is not opened successfully (step 1110) then if the parent of the requested key also does not exist (step 1114), an error appropriate to the request semantics is issued to the requestor (step 1116). If on the other hand, the parent of the requested key is found in full virtualized view using the appropriate user and application scope (step 1114), a rule then determines how the key operation is processed (step 1118). If the rule action is "redirect" or "ignore" (step 1120), the virtual key name is mapped directly to a literal key name according to the rule. Specifically, if the rule action is "ignore", the literal key name is identified as exactly the virtual key name. If, instead, the rule action is "redirect", the literal key name is determined from the virtual key name as specified by the rule. Then a request to create the literal key is passed to the operating system, and the result is returned to the requestor (step 1124). If on the other hand, the rule action determined in step 1120 is "isolate", then the literal key name is identified as the instance of the virtual key name in the user isolation scope. If the literal key already exists, but is associated with metadata indicating that it is a placeholder or that it is deleted, then the associated metadata is modified to remove those indications, and it is ensured that the key is empty. In either case, a request to open the literal key is passed to the operating system (step 1126). If the literal key was opened successfully (step 1128), the literal key is returned to the requestor (step 1130). If on the other hand, in step 1128, the requested key fails to open, placeholders for each ancestor of the literal key that does not currently exist in the user-isolation scope (step 1132) and a request to create the literal key using the literal name is passed to the operating system and the result is returned to the requestor (step 1134).

Still referring to FIG. 11, and in more detail, a request to create a key is received or intercepted (step 1102). In some embodiments, the request is hooked by a function that replaces the operating system function or functions for creating the key. In another embodiment, a hooking dynamically-linked library is used to intercept the request. The hooking function may execute in user mode or in kernel mode. For embodiments in which the hooking function executes in user mode, the hooking function may be loaded into the address space of a process when that process is created. For embodiments in which the hooking function executes in kernel mode, the hooking function may be associated with an operating system resource that is used in dispatching requests for key operations. For embodiments in which a separate operating system function is provided for each type of key operation, each function may be hooked separately. Alternatively, a single hooking function may be provided which intercepts create or open calls for several types of key operations.

The request contains a key name, which is treated as a virtual key name by the isolation environment. In some embodiments, the virtual key name may be expressed as a combination of a handle to a parent key, and the relative path name to the descendant key. The parent key handle is associated with a literal key name, which is itself associated with a virtual key name. The requestor attempts to open the virtual key using full virtualization using applicable rules, i.e. using appropriate user and application isolation scope, as described in section 4.2.1 (step 1104). If access is denied during the full virtualized open operation (step 1106), an access denied error is returned to the requestor (step 1109). If access is granted (step 1106), and the requested virtual key is successfully opened (step 1110), the corresponding literal key is returned to the requestor (step 1112). However, if access is granted (step 1106), but the virtual key is not opened successfully (step 1110) then the virtual key has been determined not to exist. If the virtual parent of the requested virtual key also does not exist, as determined by the procedures in section 4.2.1 (step 1114), an error appropriate to the request semantics is issued to the requestor (step 1116). If on the other hand, the virtual parent of the requested virtual key is found in full virtualized view using the appropriate user and application scope (step 1114), then a rule that determines how the create operation is processed is located (step 1118) by consulting the rules engine. In some embodiments, the rules engine may be provided as a relational database. In other embodiments, the rules engine may be a tree-structured database, a hash table, or a flat key database. In some embodiments, the virtual key name provided for the requested key is used to locate in the rule engine a rule that applies to the request. In particular ones of these embodiments, multiple rules may exist in the rules engine for a particular key and, in some of these embodiments, the rule having the longest prefix match with the virtual key name is the rule applied to the request. In some embodiments, a process identifier is used to locate in the rule engine a rule that applies to the request, if one exists. The rule associated with a request may be to ignore the request, redirect the request, or isolate the request. Although shown in FIG. 11 as a single database transaction or single lookup into a key, the rule lookup may be performed as a series of rule lookups.

If the rule action is "redirect" or "ignore" (step 1120), the virtual key name is mapped directly to a literal key name according to the rule (step 1124). If the rule action is "redirect" (step 1120), the literal key name is determined from the virtual key name as specified by the rule (step 1124). If the rule action is "ignore" (step 1120), the literal key name is determined to be exactly the virtual key name (step 1124). If the rule action is "ignore" or the rule action is "redirect", a request to create the literal key using the determined literal key name is passed to the operating system and the result from the operating system is returned to the requestor (step 1124). For example, a request to create a virtual key named "key_1" may result in the creation of a literal key named "Different_key_1." In one embodiment, this is accomplished by calling the original version of the hooked function and passing the formed literal name to the function as an argument. (step 1124). In other embodiments, a registry filter driver facility conceptually similar to a file system filter driver facility may be provided by the operating system. In these embodiments, creating the literal registry key may be achieved by responding to the original request to create the virtual key by signaling to the registry filter manager to reparse the request using the determined literal key name.

If the rule action determined in step 1120 is not "ignore" or "redirect" but is "isolate," then the literal key name is identified as the instance of the virtual key name in the user isolation scope. If the literal key already exists, but is associated with metadata indicating that it is a placeholder or that it is deleted, then the associated metadata is modified to remove those indications, and it is ensured that the key is empty.

In some embodiments, metadata about a registry key may be stored in a distinguished value held by that key, with the existence of that value hidden from ordinary application usage of registry APIs. In some embodiments, small amounts of metadata about a registry key may be stored directly in the literal key name, such as by suffixing the virtual name with a metadata indicator, where a metadata indicator is a string uniquely associated with a particular metadata state. The metadata indicator may indicate or encode one or several bits of metadata. Requests to access the key by virtual name check for possible variations of the literal key name due to the presence of a metadata indicator, and requests to retrieve the name of the key itself are hooked or intercepted in order to respond with the literal name. In other embodiments, the metadata indicator may be encoded in a subkey name or a registry value name instead of the key name itself. In still other embodiments, a registry key system may directly provide the ability to store some 3rd party metadata for each key. In some embodiments, metadata could be stored in a database or other repository separate from the registry database. In some embodiments, a separate sub-scope may be used to store keys that are marked as deleted. The existence of a key in the sub-scope indicates that the key is marked as deleted.

In specific ones of these embodiments, a list of deleted keys or key system elements may be maintained and consulted to optimize this check for deleted keys. In these embodiments, if a deleted key is recreated then the key name may be removed from the list of deleted keys. In others of these embodiments, a key name may be removed from the list if the list grows beyond a certain size.

In either case, a request to open the user-scoped literal key is passed to the operating system (step 1126). In some embodiments, rules may specify that the literal key corresponding to the virtual key should be created in a scope other than the user isolation scope, such as the application isolation scope, the system scope, a user isolation sub-scope or an application isolation sub-scope.

If the literal key was opened successfully (step 1128), the literal key is returned to the requestor (step 1130). If on the other hand, in step 1128, the requested key fails to open, placeholders are created for each ancestor of the literal key that does not currently exist in the user-isolation scope (step 1132) and a request to create the literal key using the literal name is passed to the operating system and the result is returned to the requestor (step 1134).

This embodiment is for operating systems with APIs or facilities that only support creation of one level per call/invocation. Extension to multi-levels per call/invocation should be obvious to one skilled in the art.

4.3 Named Object Virtualization

Another class of system-scoped resources that may be virtualized using the techniques described above are named objects, which include semaphores, mutexes, mutants, waitable timers, events, job objects, sections, named pipes, and mailslots. These objects are characterized in that they typically exist only for the duration of the process which creates them. The name space for these objects may be valid over an entire computer (global in scope) or only in an individual user session (session scoped).

Figure 12:
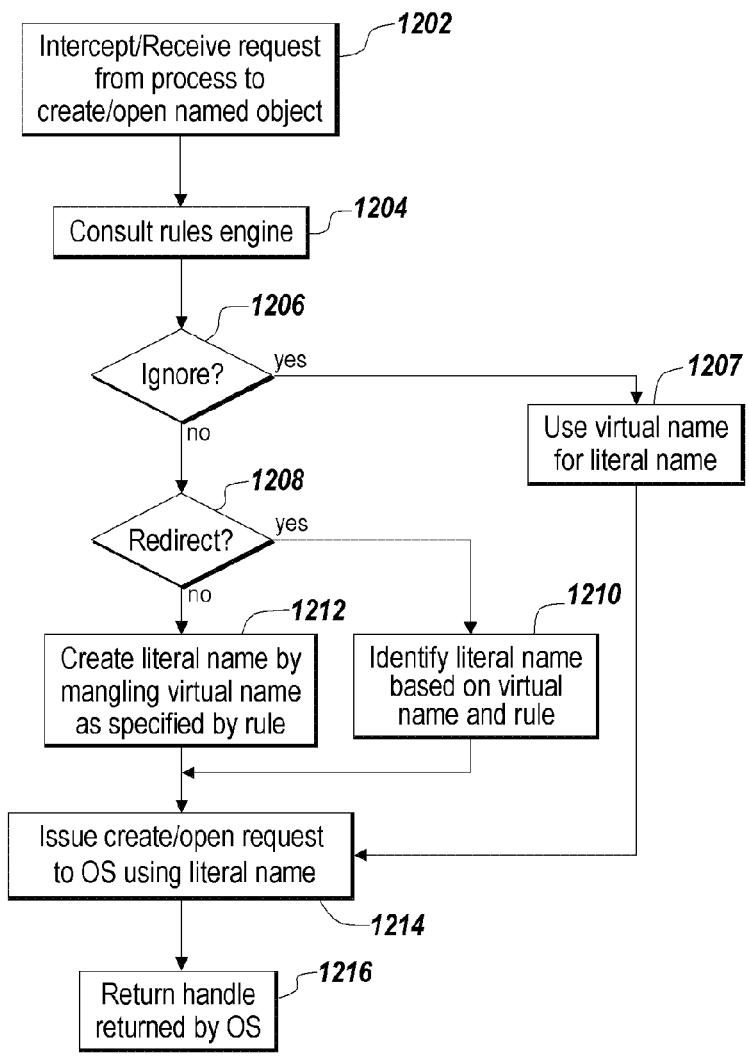
FIG. 12 is a flowchart depicting one embodiment of the steps taken to virtualize access to named objects.

Referring now to FIG. 12, and in brief overview, a request to create or open a named object is received or intercepted (step 1202). That request contains an object name which is treated as a virtual name by the isolation environment. A rule determining how to treat the request is determined (step 1204). If the rule indicates that the request should be ignored (step 1206), the literal object name is determined to be the virtual name (step 1207), and a request to create or open the literal object is issued to the operating system (step 1214). If the determined rule is not to ignore the request, but indicates instead that the request should be redirected (step 1208), the literal object name is determined from the virtual name as specified by the redirection rule (step 1210) and a create or open request for the literal object is issued to the operating system (step 1214). If the rule does not indicate that the request should be redirected (step 1208), but instead indicates that the request should be isolated, then the literal object name is determined from the virtual name as specified by the isolation rule (step 1212) and a create or open command for the literal object is issued to the operating system (step 1214). The handle of the literal object returned by the operating system in response to the issued create or open command is returned to the program requesting creation or opening of the virtual object (step 1216).

Still referring to FIG. 12, and in more detail, a request from a process to create or open a named object is intercepted (step 1202). The named object may be of session scope or it may be of global scope. In some embodiments, the request is hooked by a function that replaces the operating system function or functions for creating or opening the named object. In another embodiment a hooking dynamically-linked library is used to intercept the request. The hooking function may execute in user mode or in kernel mode. For embodiments in which the hooking function executes in user mode, the hooking function may be loaded into the address space of a process when that process is created. For embodiments in which the hooking function executes in kernel mode, the hooking function may be associated with an operating system resource that is used in dispatching requests for system objects. The request to create or open the named object may refer to any one of a wide variety of system-scoped resources that are used for interprocess communication and synchronization and that are identified by a unique identifier including semaphores, mutexes, mutants, waitable timers, file-mapping objects, events, job objects, sections, named pipes, and mailslots. For embodiments in which a separate operating system function is provided for each type of object, each function may be hooked separately. Alternatively, a single hooking function may be provided which intercepts create or open calls for several types of objects.

The intercepted request contains an object name which is treated as a virtual name by the isolation environment. A rule determining how to treat the request for the object is determined (step 1204) by consulting the rules engine. In some embodiments, the rules engine may be provided as a relational database. In other embodiments, the rules engine may be a tree-structured database, a hash table, or a flat file database. In some embodiments, the virtual name provided for the requested object is used to locate in the rule engine a rule that applies to the request. In particular ones of these embodiments, multiple rules may exist in the rules engine for a particular object and, in these embodiments, the rule having the longest prefix match with the virtual name is the rule applied to the request. In some embodiments, a process identifier is used to locate in the rule engine a rule that applies to the request, if one exists. The rule associated with a request may be to ignore the request, redirect the request, or isolate the request. Although shown in FIG. 12 as a series of decisions, the rule lookup may occur as a single database transaction.

If the rule indicates that the request should be ignored (step 1206), the literal object name is determined to be the virtual name, and a request to create or open the literal object is issued to the operating system (step 1214). For example, a request to create or open a named object named "Object_1" will result in the creation of an actual object named "Object_1". In one embodiment, this is accomplished by calling the original version of the hooked function and passing the formed literal name to the function as an argument.

If the rule determined by accessing the rules engine is not to ignore the request, but indicates instead that the request should be redirected (step 1208), the literal object name is determined from the virtual name as specified by the redirection rule (step 1210) and a create or open request for the literal object is issued to the operating system (step 1214). For example, a request to create or open a named object named "Object_1" may result in the creation of an actual object named "Different_Object_1". In one embodiment, this is accomplished by calling the original version of the hooked function and passing the formed literal name to the function as an argument.

If the rule does not indicate that the request should be redirected (step 1208), but instead indicates that the request should be isolated, then the literal object name is determined from the virtual name as specified by the isolation rule (step 1212) and a create or open command for the literal object is issued to the operating system (step 1214). For example, a request to create or open a named object named "Object_1" may result in the creation of an actual object named "Isolated_Object_1". In one embodiment, this is accomplished by calling the original version of the hooked function and passing the formed literal name to the function as an argument.

The literal name formed in order to isolate a requested system object may be based on the virtual name received and a scope-specific identifier. The scope-specific identifier may be an identifier associated with an application isolation scope, a user isolation scope, a session isolation scope, or some combination of the three. The scope-specific identifier is used to "mangle" the virtual name received in the request. For example, if the request for the named object "Object_1" is isolated for the application-isolation scope whose associated identifier is "SA1", the literal name may be "Isolated_AppScope_SA1_Object_1". The following table identifies the effect of mangling the name of an object with session isolation scope, or user isolation scope, and an application isolation scope. Mangling with combinations of scopes combines the restrictions listed in the table.

|  | Session-specific identifier | User-specific identifier | Application-specific identifier |
| --- | --- | --- | --- |
| Global object | Object available to all isolated applications executing in the context of the user session | Object available to all isolated applications executing on behalf of the user | Object available to all isolated applications executing in application isolation scope |
| Session object | Object available to all isolated applications executing in the context of the user session | Object available to all isolated applications executing in the session on behalf of the user | Object available to all isolated applications executing in the application isolation scope within the session |

For embodiments in which the operating system is one of the WINDOWS family of operating systems, object scope may be modified by toggling the global/local name prefix associated with the object, which, for isolated applications, has the same effect as mangling the object name with a session-specific identifier. However, toggling the global/local name prefix also affects the object scope for non-isolated applications.

The handle of the literal object returned by the operating system in response to the command issued in step 1214 to create or open the named object is returned to the program requesting creation or opening of the virtual object (step 1216).

4.4 Window Name Virtualization

Figure 13:
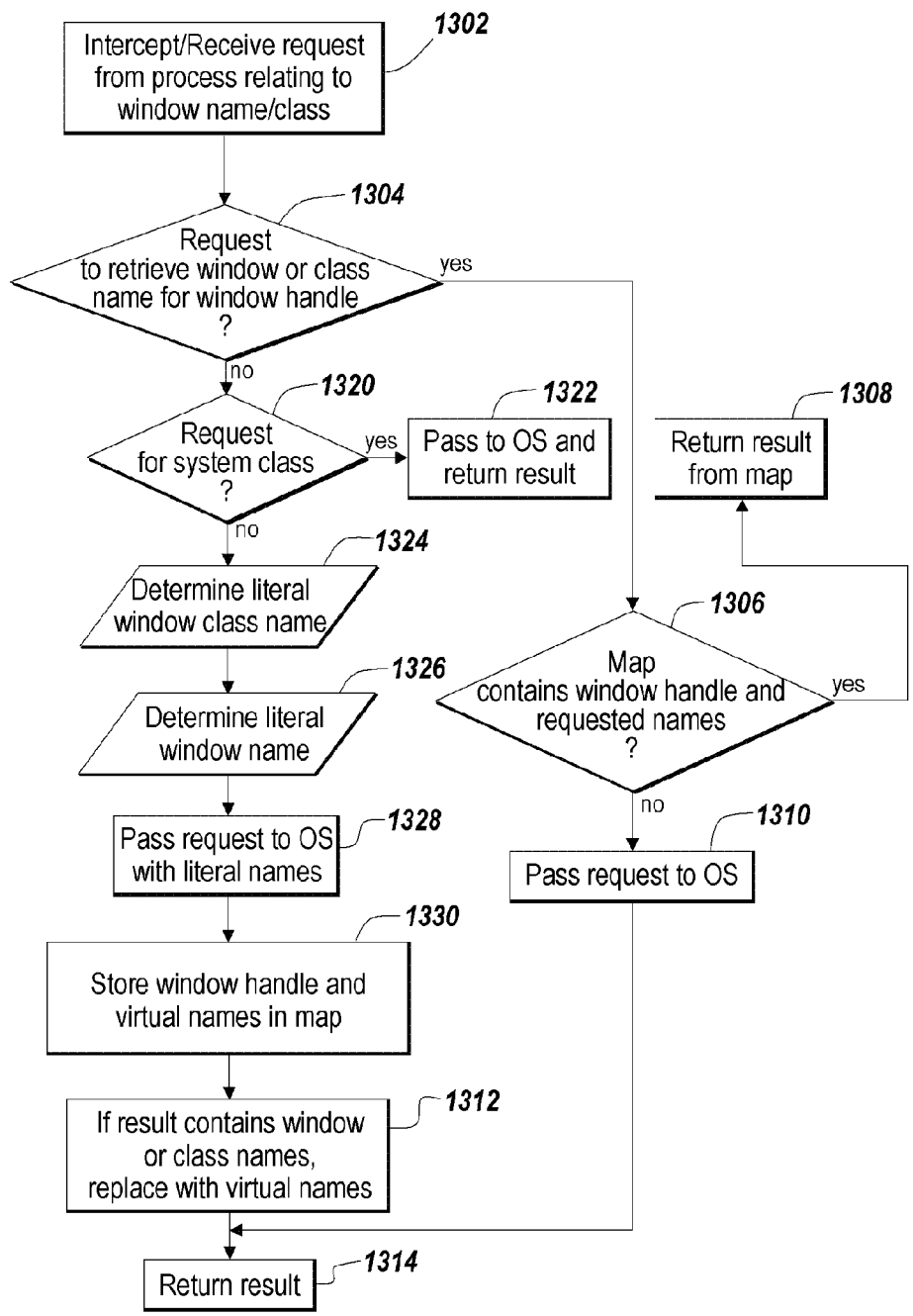
FIG. 13 is a flowchart depicting one embodiment of the steps taken to virtualize window names and window classes in the described environment.

Other classes of system-scoped resources that may be virtualized using the techniques described above are window names and window class names. Graphical software applications use the name of a window or its window class as a way of identifying if an application program is already running and for other forms of synchronization. Referring now to FIG. 13, and in brief overview, a request concerning a window name or window class is received or intercepted (step 1302). A request can be in the form of a Win32 API call or in the form of a Window message. Both types of requests are handled. Those requests contain, or request retrieval of, window names and/or window class names that are treated as virtual names by the isolation environment. If the request is to retrieve a window name or window class for a window identified by a handle (step 1304), a window mapping table is consulted to determine if the handle and the requested information concerning the window is known (step 1306). If so, the requested information from the window mapping table is returned to the requestor (step 1308). If not, the request is passed to the operating system (step 1310), and the result returned to the requestor (step 1314). If, in step 1304, the request provides a window name or window class, the request is checked to determine if it specifies one of a class of windows defined by the operating system (step 1320). If it does, the request is issued to the operating system and the result returned from the operating system is returned to the requestor (step 1322). If the request does not specify one of a class of windows defined by the operating system, the literal class name is determined based on the virtual class name and the rules (step 1324) and the literal window name is determined based on the virtual window name and the rules (step 1326). The request is then passed to the operating system using the literal window and literal class names (step 1328). If either the literal window name or literal window class name determined in steps 1324 and 1326 differ from the corresponding virtual name, then the window mapping table entry for the window handle is updated to record the virtual window name or virtual class name provided in the request (step 1330). If the response from the operating system includes native window names or native identifications of classes, those are replaced with the virtual window name or virtual class name provided in the request (step 1312) and the result is returned to the requestor (step 1314).

Still referring to FIG. 13, and in more detail a request concerning a window name or window class is received or intercepted (step 1302). Those requests contain or request retrieval of window names and/or window class names that are treated as virtual names by the isolation environment.

If the request is to retrieve a window name or window class for a window identified by a handle (step 1304), a window mapping table is consulted to determine if the handle and the requested information concerning the window is known (step 1306). In some embodiments, instead of a mapping table, additional data is stored for each window and window class using facilities provided by the operating system.

If so, the requested information from the window mapping table is returned to the requestor (step 1308). If not, the request is passed to the operating system (step 1310), and the result returned to the requestor (step 1314).

If, in step 1304, the request provides a window name or window class, the request is checked to determine if it specifies one of a class of windows defined by the operating system (step 1320). If it does, the request is passed to the operating system and the result returned from the operating system is returned to the requestor (step 1322).

If the request does not specify one of a class of windows defined by the operating system, the literal class name is determined based on the virtual class name and the rules (step 1324) and the literal window name is determined based on the virtual window name and the rules (step 1326). The request is then passed to the operating system using the literal window and literal class names (step 1328). In some embodiments the window names and window class names may be atoms, rather than character string literals. Typically an application places a string in an atom table and receives a 16-bit integer, called an atom, that can be used to access the string.

If either the literal window name or literal window class name determined in steps 1324 and 1326 differ from the corresponding virtual name, then the window mapping table entry for the window handle is updated to record the virtual window name or virtual class name provided in the request (step 1330).

If the response from the operating system includes native window names or native identifications of classes, those are replaced with the virtual window name or virtual class name provided in the request (step 1312) and the result is returned to the requestor (step 1314).

Figure 13A:
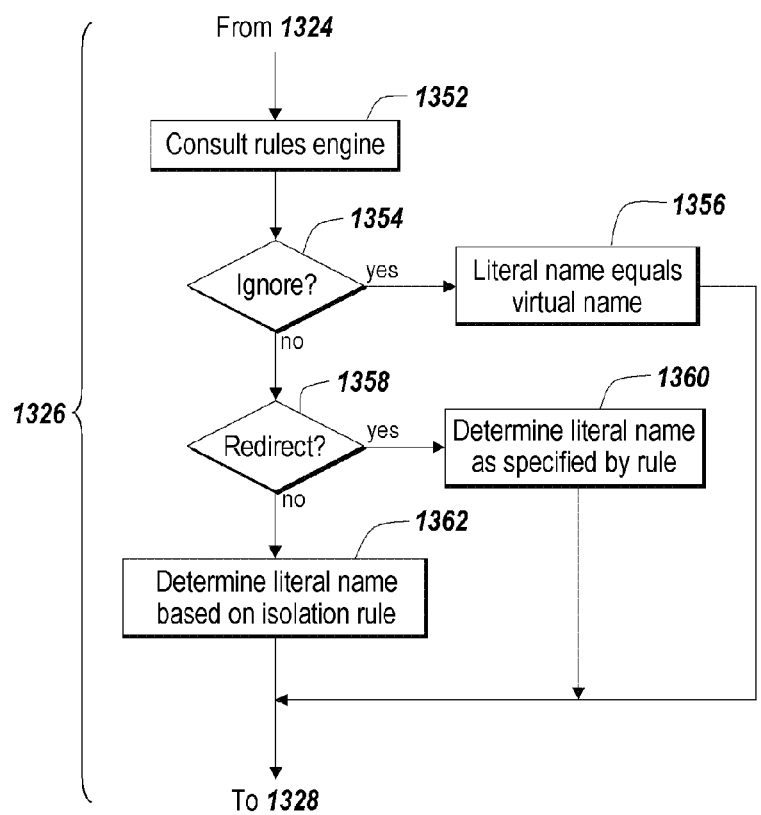
FIG. 13A is a flowchart depicting one embodiment of the steps taken to determine literal window names and window class names.

Referring now to FIG. 13A, the literal window name or window class name is determined as shown there. The rules engine is consulted to determine the rule that applies to the request (step 1352). If the rule action is "ignore" (step 1354), then the literal name equals the virtual name (step 1356). If, however, the rule action is not "ignore" but is "redirect" (step 1358), then the literal name is determined from the virtual name as specified by the redirect rule (step 1360). If, however, the rule action is not "redirect" but is "isolate", then the literal name is determined from the virtual name using a scope-specific identifier (step 1362).

In some embodiments, the particular scope-specific identifier is specified in the rule. In other embodiments, the scope-specific identifier used is the one associated with the application isolation scope with which the requesting process is associated. This allows the window or window class to be used by any other applications associated with the same application isolation scope. In operating systems such as many of the Microsoft WINDOWS family of operating systems where window names and classes are already isolated within a session, this means that only applications executing in the same session that are associated with the same application isolation scope can use the window name or class.

In some of the family of Microsoft WINDOWS operating systems, the window name is used as the title of the window in the title bar. It is desirable to handle non-client area paint window message to ensure that the window title displayed in the window title bar reflects the virtual names and not the literal name for a particular window. When a non-client area paint message is intercepted, the virtual name associated with the window, if any, is retrieved from the mapping table. If a virtual name is retrieved, the non-client area is painted using the virtual name as the window title and it is indicated that the request message has been handled. If no virtual name is retrieved, the request is indicated as not handled, which passes the request on to the original function that paints the title bar, using the literal name of the window.

4.5 Out-of-Process COM Server Virtualization

Software component technologies such as COM, CORBA, .NET and others allow software components to be developed, deployed, registered, discovered, activated or instantiated and utilized as discrete units. In most component models, components may execute in either the process of the caller or in a separate process on the same computer or on a separate computer entirely, although some components may only support a subset of these cases.

One or more unique identifiers identify these components. Typically the component infrastructure provides a service or daemon that brokers activation requests. A software process that wishes to begin using a component passes a request to the broker to activate the component specified by the component identifier. The broker activates the requested component, if possible, and returns a reference to the activated instance. In some of these component infrastructures, multiple versions of the same component may not co-exist because the component identifier remains the same from version to version.

Some of the members of the WINDOWS family of operating systems provide a component infrastructure called COM. COM components ("COM servers") are identified by a GUID called a Class Identifier (CLSID), and each component provides one or more interfaces each of which has its own unique interface identifier (UIID). The COM Service Control Manager (CSCM) is the broker for out-of-process activation requests and it provides interfaces that allow the caller to request activation of a COM server via CLSID. Although the following description will be phrased in terms of COM servers and COM clients, it will be understood by one of ordinary skill in the art that it applies to CORBA, .NET, and other software architectures that provide for dynamic activation of software components.

When COM components are installed onto a computer, they register their CLSIDs in a well-known portion of the registry database, along with the information needed by the CSCM to launch a new instance of the COM server. For out of process COM servers, this may include the path and command line parameters to the executable to run. Multiple versions of the same COM server share the same CLSID, hence only one version can be installed onto a computer at a time.

In certain embodiments, an application (acting as a COM client) instantiates a COM server by calling a COM API (for example, CoCreateInstance( ) or CoCreateInstanceEx( )). A parameter to this call specifies the desired activation context: in-process; out-of-process on the same computer; out-of-process on a remote computer; or allow the COM subsystem to determine which of these three cases to use. If it is determined that an out-of-process activation is required, the request including the CLSID is passed to the CSCM. The CSCM uses the registry database to locate the path and parameters needed to launch the executable that hosts the COM server. When that executable is launched, it registers all of the CLSIDs of all of the COM servers that it supports with the CSCM using the COM API CoRegisterClassObject( ). If the requested CLSID is registered, the CSCM returns a reference to that COM server to the caller. All subsequent interaction between the COM client and the COM server takes place independently of the CSCM.

The isolation environment 200 previously described allows multiple instances of COM servers with the same CLSID to be installed on a computer, each in a different isolation scope (no more than one of which may be the system scope). However, this alone will not make those COM servers available to COM clients.

Figure 14:
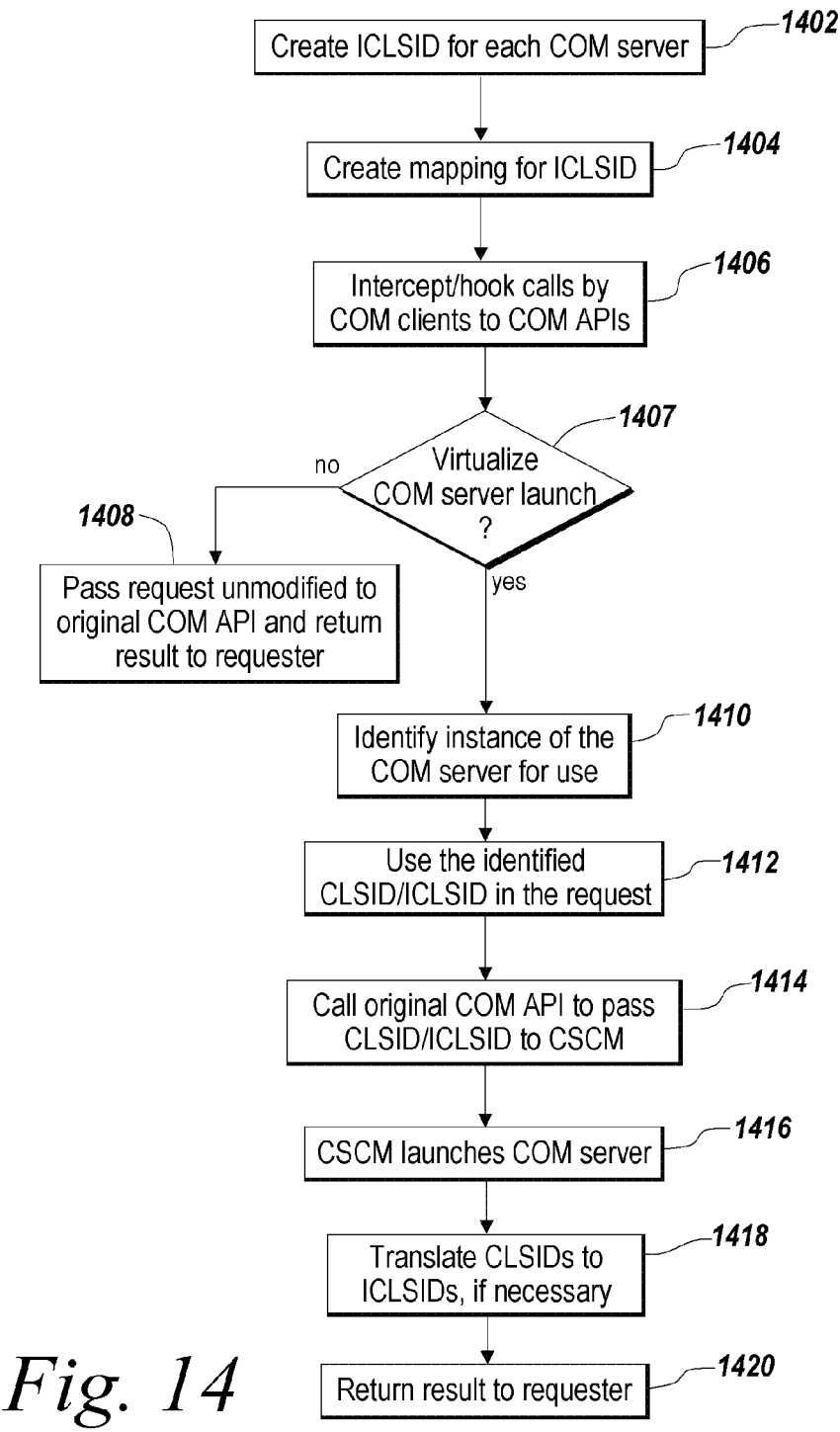
FIG. 14 is a flowchart depicting one embodiment of the steps taken to invoke an out-of-process COM server in the described virtualized environment.

FIG. 14 depicts one embodiment of the steps to be taken to virtualize access to COM servers. In brief overview, a new CLSID, hereinafter called the Isolated CLSID (or ICLSID) is created for each out-of-process COM server that is launched into an isolation scope (step 1402). By definition this is a CLSID, and thus must be unique amongst all other CLSIDs, in other words it must have the properties of a GUID. A mapping table is created that maps the pair (CLSID, application isolation scope) to ICLSID. A COM server registry entry is created for the ICLSID which describes how to launch the COM server, with launch parameters that start the COM server executable in the appropriate application isolation scope (step 1404). Calls by COM clients to COM APIs such as CoCreateInstance( ) and CoCreateInstanceEx( ) are hooked or intercepted (step 1406). If it is determined that (a) the request can be satisfied by an in-process COM server or (b) both the COM client and COM server are not associated with any isolation scope, then the request is passed unmodified to the original COM API and the result returned to the caller (step 1408). The appropriate instance of the COM server to use is identified (step 1410). If the selected COM server instance is in an application isolation environment its ICLSID is determined using the data structures outlined above. Otherwise, the CLSID in the request is used (step 1412). The original CoCreateInstance( ) or CoCreateInstanceEx( ) function is called, with the ICLSID if one was identified in step 1412. This passes the request to the CSCM (step 1414). The CSCM finds and launches the COM server executable in the normal fashion, by looking up the requested CLSID in the registry to determine launch parameters. If an ICLSID is requested, the ICLSID system scope registry entry as described in step 1404 is found and the COM server is launched in the appropriate application isolation scope (step 1416). The launched COM executable calls the hooked CoRegisterClassObject( ) API with the CLSIDs of the COM servers it supports and these are translated to the appropriate ICLSIDs which are passed to the original CoRegisterClassObject( ) API (step 1418). When the CSCM receives a response from a CoRegisterClassObject( ) call with the expected ICLSID, it returns a reference to that COM server instance to the caller (step 1420).

Still referring to FIG. 14, and in more detail, an ICLSID is created for each out-of-process COM server that is launched into an isolation scope (step 1402). In some embodiments, the ICLSID is created during installation of the COM server. In other embodiments, the ICLSID is created immediately after installation. In still other embodiments, the ICLSID is created before the COM server is launched into the isolation scope. In all of these embodiments, the ICLSID may be created by hooking or intercepting the system calls that create or query the CLSID entry in the registry database. Alternatively, the ICLSID may be created by hooking or intercepting the COM API calls such as CoCreateInstance( ) and CoCreateInstanceEx( ) that create COM server instances. Alternatively, changes to the CLSID-specific portion of the registry database may be observed after an installation has taken place.

A mapping table is created that maps the pair (CLSID, application isolation scope) to ICLSID, along with the appropriate registry entries for a COM server with that ICLSID that describe how to launch the COM server, with launch parameters that start the COM server executable in the appropriate application isolation scope (step 1404). In many embodiments, this table is stored in a persistent memory element, such as a hard disk drive or a solid-state memory element. In other embodiments, the table may be stored in the registry, in a flat file, in a database or in a volatile memory element. In still other embodiments, the table may be distributed throughout the COM-specific portions of the registry database, for example by adding a new subkey specific to this purpose to each appropriate COM server entry identified by CLSID. Entries in this table may be created during or immediately after installation, by hooking or intercepting the calls that create the CLSID entry in the registry database, or by observing changes to the CLSID-specific portion of the registry database after an installation has taken place, or by hooking or intercepting the COM API calls such as CoCreateInstance( ) and CoCreateInstanceEx( ) that create COM server instances. Installation of a COM server into a specific isolation scope may be persistently recorded. Alternatively, the mapping of a particular COM server and isolation scope to ICLSID may be dynamically created and stored as an entry in a non-persistent database, or in the registry database.

Calls by COM clients to COM APIs, such as CoCreateInstance( ) and CoCreateInstanceEx( ), are hooked or intercepted (step 1406). If it is determined that (a) the request can be satisfied by an in-process COM server or (b) both the COM client and COM server reside in the system scope (step 1407), then the request is passed unmodified to the original COM API and the result returned to the caller (step 1408).

If the request cannot be satisfied by an in-process COM server and either the COM client or the COM server do not reside in the system scope (step 1407), then the appropriate instance of the COM server to use is identified (step 1410). For embodiments in which COM clients execute in a particular isolation scope, preference may be given to COM servers installed into the same application isolation scope, followed by those installed into the system scope (possibly executing in the client's application isolation scope), followed by COM servers installed into other application isolation scopes. In some of these embodiments, COM servers installed into the system scope may execute in the same application isolation scope as the COM client. This may be controlled by the rules engine and administrative settings to allow this to happen for COM servers that execute correctly in this mode, and prevent it for COM servers that do not. For embodiments in which the COM client executes in the system scope, preference may be given to system scope COM servers followed by COM servers in isolation scopes. The COM client may specify a COM server to use in the call creating an instance of the COM server. Alternatively, a configuration store may store information identifying the COM server to be instantiated. In some embodiments, the specified COM server is hosted by another computer, which may be a separate, physical machine or a virtual machine. The mapping table described above in connection with step 1404 may be used to find the set of applicable COM servers and (if necessary) compute preference based on rules.

For embodiments in which the applicable COM server exists on another computer, a service or daemon that executes on the remote computer can be queried for the ICLSID to use. The COM client hook, if it determines that a remote COM server is required, first queries the service or daemon to determine the CLSID/ICLSID to use. The service or daemon determines an ICLSID corresponding to the CLSID given in the request. In some embodiments, the ICLSID returned by the service or daemon may be selected or created based on administrator-defined configuration data, rules contained in a rules engine, or built-in hard-coded logic. In other embodiments, the request may specify the isolation scope on the server to be used. In still other embodiments, the requested COM server may be associated with the server's system scope, in which case the CLSID associated with the COM server is returned. In still other embodiments, the requested COM server may be associated with one of the server's isolation scopes, in which case it returns the ICLSID associated with the instance of the COM server and the isolation scope. In some embodiments, a service or daemon as described above may be used to support launching local out-of-process COM servers.

If the selected COM server instance is in an application isolation environment on the local computer, its ICLSID is determined using the data structures described in connection with step 1404. If, instead, the selected COM server instance is in the system scope on the local computer, the CLSID in the request is used (step 1412). In some of these embodiments, an entry for the COM server using the ICLSID may be dynamically created.

If an ICLSID is returned, it is passed to the original COM API in place of the original CLSID. For example, the determined ICLSID may be passed to the original CoCreateInstance( ) or CoCreateInstanceEx( ) function, which passes the request to the CSCM (step 1414). For embodiments in which the COM server is hosted by another computer, the CSCM passes the ICLSID to the computer hosting the COM server, where that computer's CSCM handles the COM server launch.

The CSCM finds and launches the COM server executable in the normal fashion, by looking up the requested CLSID or ICLSID in the registry to determine launch parameters. If an ICLSID is requested, the ICLSID system scope registry entry as described in step 1404 is found and the COM server launched in the appropriate application isolation scope (step 1416).

If the launched COM server instance executes in an application isolation scope (whether installed into that scope or installed into the system scope), the COM API function CoRegisterClassObject( ) of the COM server instance is hooked or intercepted. Each CLSID that is passed to CoRegisterClassObject( ) is mapped to the corresponding ICLSID, using the mapping table as defined in step 1404. The original CoRegisterClassObject( ) API is called with the ICLSID (step 1418).

When the CSCM receives a response from a CoRegisterClassObject( ) call with the expected ICLSID, it returns a reference to that COM server instance to the caller (step 1420).

This technique supports COM server execution when the COM client and COM server execute in any combination of application isolation scopes (including different scopes) and the system scope. The ICLSID is specific to the combination of server (identified by CLSID) and the desired appropriate isolation scope. The client need only determine the correct ICLSID (or the original CLSID if the server is in installed into and executing in the system scope).

4.6 Virtualized File Type Association (FTA)

File type association is a well-known graphical user interface technique for invoking execution of application programs. A user is presented with a graphical icon representing a data file. The user selects the data file using keyboard commands or using a pointing device, such as a mouse, and clicks, or double-clicks, on the icon to indicate that the user would like to open the file. Alternately, in some computing environments, the user enters the path to the file at a command line prompt in place of a command. The file typically has an associated file type indication which is used to determine an application program to use when opening the file. This is generally done using a table that maps the file type indication to a specific application. In many members of the family of Microsoft WINDOWS operating systems, the mapping is typically stored in the registry database in a tuple including the file type indicator and the full pathname identifying the application to be executed, and only one application program may be associated with any particular file type.

In the described isolation environment, multiple versions of an application may be installed and executed on a single computer. Thus, in these environments, the relationship between file type and associated application program is no longer a one-to-one relationship but is, instead, a one-to-many relationship. A similar problem exists for MIME attachment types. In these environments, this problem is solved by replacing the pathname identifying the application program to be launched when a given file type is selected. The pathname is replaced with that of a chooser tool that gives to the user a choice of application programs to launch.

Figure 15:
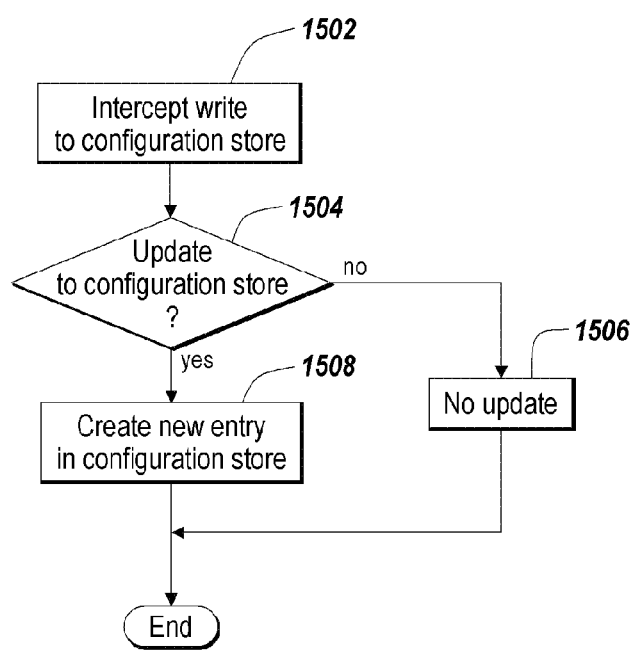
FIG. 15 is a flowchart depicting one embodiment of the steps taken to virtualize application invocation using file-type association.

Referring now to FIG. 15, and in brief overview, a request to write file type association data to a configuration store is intercepted (step 1502). A determination is made whether the request is updating the file type association information in the configuration store (step 1504). If not, i.e., if the entry already exists, no update occurs (step 1506). Otherwise, a new entry is created using the virtualization techniques described above in sections 4.1.4 or 4.2.4, or the existing entry is updated (step 1508). The new or updated entry, which is virtualized for the appropriate isolation scope, maps the file type to a chooser tool which allows the user to select which of multiple application programs to use when viewing or editing the file.

Still referring to FIG. 15, and in more detail, a request to write file-type association data to a configuration store is intercepted (step 1502). In some embodiments, the configuration store is the WINDOWS registry database. The request to write data to the configuration store may be intercepted by a user mode hooking function, a kernel mode hooking function, a file system filter driver, or a mini-driver.

A determination is made whether the request seeks to update file-type-association information in the configuration store (step 1504). In one embodiment this is accomplished by detecting if the intercepted request indicates that it intends to modify the configuration store. In another embodiment, the target of the request is compared to the information included in the request to determine if the request is attempting to modify the configuration store. For embodiments in which the configuration store is a registry database, the request to modify the registry is intercepted, as described above in Section 4.2.

If it is determined that the request is not attempting to update the configuration store, no update occurs (step 1506). In some embodiments, it is determined that no attempt to update the configuration store is made because the intercepted request is a read request. In other embodiments, this determination may made when the target entry in the configuration store and the information included in the intercepted request are identical, or substantially identical.

If, however, it is determined in step 1504 that the request intends to update the configuration store, then a new entry is created in the configuration store, or the existing entry is updated (step 1508). In some embodiments, rules determine which isolation scope the entry is created or updated in. In some embodiments, the new entry is created or the existing entry is updated in the system scope or the application isolation scope. In many embodiments, the new entry is created or the existing entry is updated in the appropriate user isolation scope. If a new entry is created, then it, rather than identifying the application program identified in the intercepted request, lists a chooser application as the application to be used when a file of a particular type is accessed. In some embodiments, the chooser tool is updated automatically when a new version of an application program is installed, or when another application that handles the same file type is installed, or when an application registers or deregisters itself to handle files of that particular type. In some embodiments, the chooser tool can incorporate into its list of suitable applications any applications registered to handle the same file type in the portion of the configuration store maintained in other scopes, such as the system scope, and the application scope if the chooser tool executes in the user scope. If an existing entry is updated, and the existing entry already lists the chooser application as the application to be used when a file of that particular file type is used, then the list of applications presented by the chooser for that file type may be updated to include the updating application. If the existing entry is updated, but it does not list the chooser application, then the updated entry is made to list the chooser application as the application to be used when a file of that particular file type is used. In these embodiments, the information relating to the associated applications may be stored in an associated configuration file or, in some embodiments, as an entry in the registry database.

The chooser application may present to the user a list of applications associated with the selected file type. The application may also allow the user to choose the application program that the user would like to use to process the file. The chooser then launches the application program in the appropriate scope: system scope; application isolation scope; or user isolation scope. In some embodiments, the chooser tool maintains the identity of the default application program associated with a file type. In these embodiments, the default application may be used by processes that do not have access to the desktop or are configured to use the default handler without presenting the user with a choice.

4.7 Dynamic Movement of Processes Between Isolation Environments

An additional aspect of the invention is the facility to move a running process between different virtual scopes. In other words, the aggregated view of native resources presented to the application instance by the isolation environment 200 may be changed to a different aggregated view while the application is executing. This allows processes that have been isolated within a particular isolation scope to be "moved" to another isolation scope while the process is running. This is particularly useful for system services or processes of which only one instance may execute at a time, such as the MSI service in WINDOWS operating systems. This aspect of the invention may also be used to allow a user to work in several isolation scopes sequentially.

Figure 16:
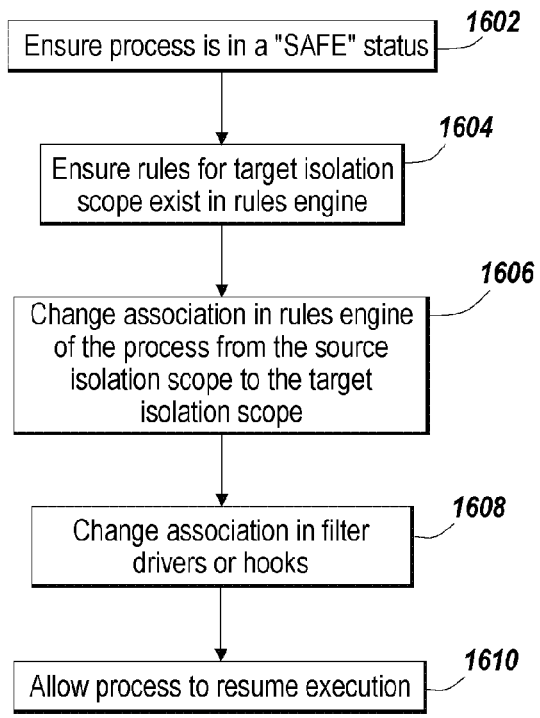
FIG. 16 is a flowchart depicting one embodiment of the steps taken to move a process from a source isolation scope to a target isolation scope

Referring to FIG. 16, and in brief overview, one embodiment of a process for moving processes between one isolation scope and a second isolation scope, or between the system scope and an isolation scope, is shown. As used in this description, the term "target isolation scope" will be used to refer to the isolation scope, including the system scope, to which the processes is being moved and the term "source isolation scope" will be used to refer to the isolation scope, including the system scope, from which the process is being moved. As shown in FIG. 16, and in brief overview, a method for moving a process to a target isolation scope includes the steps of: ensuring that the process is in a safe state (step 1602); changing the association of the process from its source isolation scope to the target isolation scope in the rules engine (step 1604); changing the association of the process from the source isolation scope to the target isolation scope for any filter driver or hooks (step 1606); and allowing the process to resume execution (step 1608).

Still referring to FIG. 16, and in more detail, the process should be in a "safe" state while being moved to a different isolation scope (step 1602). In some embodiments, the process is monitored to determine when it is not processing requests. In these embodiments, the process is considered to be in a "safe" state for moving when no requests are processed by the process. In some of these embodiments, once the process is considered to be in a "safe" state, new requests to the process are delayed until the process is moved. In other embodiments, such as in connection with diagnostic applications, a user interface may be provided to trigger the change in isolation scope. In these embodiments, the user interface may run code that puts the process to be moved into a "safe" state. In still other embodiments, an administration program may force the process into a "safe" state by delaying all incoming requests to the process and waiting for the process to complete execution of any active requests.

The rules associated with the target isolation scope are loaded into the rules engine if they do not already exist in the rules engine (step 1603).

The association of the process with a source isolation scope is changed in the rules engine (step 1604). As described above, a process can be associated with any isolation scope. That association is used by the rules engine on every request for a virtual native resource to determine the rule to apply to the request. The application instance can be associated with a target isolation scope by changing the appropriate data structures in the rules engine. In some embodiments, a new database entry is written associating the process with a new isolation scope. In other embodiments, a tree node storing an identifier for the isolation scope with which the process is associated is overwritten to identify the new isolation scope. In still other embodiments, an operating system request can made to allocate additional storage for a process to store the rules associated with the target isolation scope or, in some embodiments, an identifier of the rules.

The association of the process with the source isolation scope is changed wherever the association or the rules are stored outside of the rules engine, such as filter drivers, kernel mode hooks, or user mode hooks (step 1606). For embodiments in which the association between a process and isolation scope rules is maintained based on PID, the association between the processes PID and the rule set is changed. For embodiments in which a PID is not used to maintain the association between a process and the applicable set of isolation rules, the user mode hooking function may be altered to access the rule set associated with the target isolation scope. For embodiments in which process associations with rule sets for isolation scopes are maintained in a rule engine, it is sufficient to change the association stored in the rule engine in step 1604 above.

The process is allowed to resume execution in the new isolation scope (step 1610). For embodiments in which new requests were delayed or prohibited from being made, those requests are issued to the process and new requests are allowed.

In one particularly useful aspect, the method described above may be used to virtualize MSI, an installation packaging and installation technology produced by Microsoft and available in some of the Microsoft WINDOWS family of operating systems. An application packaged by this technology for installation is called an MSI package. Operating systems which support this technology have a WINDOWS service called the MSI service which assists in installing MSI packages. There is a single instance of this service on the system. Processes that wish to install MSI packages run an MSI process in their session which makes COM calls to the MSI service.

MSI installations can be virtualized to install MSI packages into an application isolation environment. Conceptually, this can be achieved by hooking or intercepting the calls made to the MSI API in the installation session to the MSI service. A mutex can be used to ensure that only one installation takes place at a time. When a call to the MSI API requesting to start a new installation is received or intercepted, and the calling process is associated with a particular application isolation scope, the MSI service is placed into the context of that isolation scope before the call is allowed to proceed. The installation proceeds as the MSI service performs its normal installation actions, although native resource requests by the MSI service are virtualized according to the applicable isolation scope. When the end of the installation process is detected, the association between the MSI service and the isolation scope is removed. Although described above with respect to MSI, the technique described is applicable to other installation technologies.

EQUIVALENTS

The present invention may be provided as one or more computer-readable programs embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, LISP, PERL, C, C++, PROLOG, or any byte code language such as JAVA. The software programs may be stored on or in one or more articles of manufacture as object code.

Having described certain embodiments of the invention, it will now become apparent to one of skill in the art that other embodiments incorporating the concepts of the invention may be used. Therefore, the invention should not be limited to certain embodiments, but rather should be limited only by the spirit and scope of the following claims

What is claimed as new and desired to be protected by Letters Patent of the United States is:

1. A method for virtualizing access to windows, the method comprising:
   receiving a request relating to a window from a process executing within the context of a user isolation scope, the request including a virtual window name, and wherein the user isolation scope is provided by an isolation environment comprising a user isolation layer and an application isolation layer;
   selecting, by a rules engine, a rule action associated with the request, the selection responsive to the request received from the process executing within the context of a user isolation scope, and determining that a rule action from a group consisting of ignore, redirect and isolate, is associated with the request;
   determining a literal name for the window, in response to the selected rule action, using a scope-specific identifier associated with at least one of a particular user isolation scope and an application isolation scope;
   issuing to the operating system a request including the determined literal window name; and
   associating a window handle with the virtual window name.

2. The method of claim 1 wherein receiving a request further comprises intercepting a request relating to a window from a process executing in the context of a user isolation scope, the request including a virtual window name.

3. The method of claim 1 wherein receiving a request further comprises receiving a request to find a window from a process executing in the context of a user isolation scope, the request including a virtual window name.

4. The method of claim 1 wherein receiving a request further comprises receiving a request to create a window from a process executing in the context of a user isolation scope, the request including a virtual window name.

5. The method of claim 1 wherein determining a literal name further comprises:
determining a rule associated with the virtual window name included in the request; and
determining a literal name for the window responsive to the determined rule.

6. The method of claim 1 wherein determining a literal name further comprises determining a literal window name using a scope-specific identifier associated with an application isolation scope with which the process making the request is associated.

7. The method of claim 1 wherein associating a window handle further comprises storing the virtual window name in a mapping table associated with a window handle.

8. The method of claim 1 further comprising receiving from the operating system a response to the issued request.

9. The method of claim 8 further comprising replacing the literal window name in the response with a virtual window name.

10. The method of claim 1 further comprising:
receiving a request to identify one of a virtual window name and a virtual window class identifier, the request received from a process executing within the context of a user isolation scope and including a window handle, and wherein the user isolation scope is provided by an isolation environment comprising a user isolation layer and an application isolation layer;
determining that the window handle is associated with the requested one of the virtual window name and the virtual window class identifier; and
returning to the requesting process the determined window information.

11. The method of claim 10 wherein determining that the window handle is associated with the requested window name further comprises determining whether an association between the window handle and the requested one of the virtual window name and the virtual window class identifier exists.

12. The method of claim 11 further comprising determining the window handle associated with the requested one of the virtual window name and the virtual window class identifier from a mapping table, responsive to determining an association exists in the mapping table.

13. The method of claim 11 further comprising returning to the requesting process a response received from an operating system, responsive to determining no association exists in the mapping table.

14. The method of claim 1 further comprising:
intercepting a request, from a requestor executing within the context of an isolation scope, to paint a title bar for a window, the title bar including the window name, the request including a window handle, the isolation scope provided by an isolation environment comprising a user isolation layer and an application isolation layer;
determining that the window handle is associated with the virtual window name;
painting the title bar of the window using the virtual window name; and
indicating to the requestor that the title bar has been painted.

15. An apparatus for virtualizing access to windows comprising:
a hooking mechanism, executing on a computing device, receiving a request relating to a window from a process executing within the context of a user isolation scope, the request including one of a virtual window name and a virtual window class identifier, and wherein the user isolation scope is provided by an isolation environment comprising a user isolation layer and an application isolation layer;
a rules engine selecting a rule action associated with a request, the selection responsive to a request received from a process executing within the context of a user isolation scope, and determining that a rule action from a group consisting of ignore, redirect and isolate, is associated with the request;
a window name virtualization engine, executing on the computing device, forming one of a literal name for the window and a literal window class identifier, in response to the selected rule action, using the one of the virtual window name and the virtual window class identifier received in the request, and a scope specific identifier associated with a particular isolation scope; and
an operating system interface, executing on the computing device, issuing a request relating to a window, the request including the one of the formed literal name and the formed literal window class identifier for the window.

16. The apparatus of claim 15 wherein the hooking mechanism intercepts a request selected from a group consisting of finding a window, creating a window, enumerating a window, destroying a window, setting a window name, retrieving a window name, retrieving a window class identifier associated with the window, registering a window class, retrieving information about a window class and unregistering a window class.

17. The apparatus of claim 15 further comprising a mapping table storing an association between a window handle and one of the virtual window name and the virtual window class identifier.

18. The apparatus of claim 17 wherein the mapping table is associated with the process.

19. The apparatus of claim 18 further comprising a second mapping table associated with a second process.

20. A method for virtualizing access to windows, the method comprising:
receiving a request, relating to a window class, from a process executing within the context of a user isolation scope, the request including a virtual window class identifier, and the user isolation scope provided by an isolation environment comprising a user isolation layer and an application isolation layer;
selecting, by a rules engine, a rule action associated with the request, the selection responsive to the request received from the process executing within the context of a user isolation scope, and determining that a rule action from a group consisting of ignore, redirect and isolate, is associated with the request;
determining a literal window class identifier, in response to the selected rule action, using a scope-specific identifier associated with a particular isolation scope;
issuing to an operating system a request including the determined literal window class identifier; and
associating a window handle with the determined literal window class identifier.

21. The method of claim 20 wherein receiving a request further comprises intercepting a request relating to a window class from a process executing in the context of a user isolation scope, the request including a virtual window class identifier.

22. The method of claim 20 wherein receiving a request further comprises receiving a request to find a window from a process executing in the context of a user isolation scope, the request including a virtual window class identifier.

23. The method of claim 20 wherein receiving a request further comprises receiving a request to create a window from a process executing in the context of a user isolation scope, the request including a virtual window class identifier.

24. The method of claim 20 wherein determining further comprises:
   determining a rule associated with the virtual window class identifier included in the request; and
   determining a literal window class identifier responsive to the determined rule.

25. The method of claim 20 wherein determining further comprises determining a literal window class name using a scope-specific identifier associated with an application isolation scope with which the process making the request is associated.

26. The method of claim 20 wherein associating a window handle further comprises storing the virtual window class identifier in a mapping table associated with a window handle.

27. The method of claim 20 further comprising receiving from the operating system a response to the issued request.

28. The method of claim 27 further comprising replacing the determined literal window class identifier in the response with a virtual window class identifier.

* * * * *